(12) United States Patent  (10) Patent No.: US 8,131,098 B2
Watanabe et al.  (45) Date of Patent: Mar. 6, 2012

(54) IMAGE PROCESSING DEVICE, IMAGE PROCESSING METHOD, IMAGE PROCESSING SYSTEM, PROGRAM, STORAGE MEDIUM, AND INTEGRATED CIRCUIT

(75) Inventors: Tatsumi Watanabe, Osaka (JP); Shuichi Ojima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 915 days.

(21) Appl. No.: 12/167,607

(22) Filed: Jul. 3, 2008

(65) Prior Publication Data

US 2009/0022396 A1 Jan. 22, 2009

(30) Foreign Application Priority Data

Jul. 6, 2007 (JP) ................................. 2007-178803
Jul. 1, 2008 (JP) ................................. 2008-172225

(51) Int. Cl.
*G06K 9/00* (2006.01)
*G06K 9/46* (2006.01)
*G06T 15/20* (2006.01)

(52) U.S. Cl. ........ 382/254; 382/106; 382/154; 382/168; 382/171; 382/255; 382/266; 382/281; 345/422; 345/545

(58) Field of Classification Search ............... 382/254, 382/106, 154, 171, 168, 181, 255, 266, 281; 345/422, 545

See application file for complete search history.

(56) References Cited

U.S. PATENT DOCUMENTS

| | | | | |
|---|---|---|---|---|
| 4,819,169 A | * | 4/1989 | Saitoh et al. | 701/28 |
| 6,111,993 A | * | 8/2000 | Matsunaga | 382/281 |
| 6,124,859 A | * | 9/2000 | Horii et al. | 345/427 |
| 6,157,733 A | * | 12/2000 | Swain | 382/154 |
| 6,252,982 B1 | * | 6/2001 | Haisma et al. | 382/154 |
| 6,738,197 B2 | * | 5/2004 | Fujii | 359/698 |
| 6,778,699 B1 | * | 8/2004 | Gallagher | 382/165 |
| 7,657,080 B2 | * | 2/2010 | Allman et al. | 382/154 |
| 2003/0103650 A1 | * | 6/2003 | Otsuka et al. | 382/104 |
| 2005/0254702 A1 | * | 11/2005 | Era | 382/154 |

(Continued)

FOREIGN PATENT DOCUMENTS

JP 9-185712 7/1997

(Continued)

OTHER PUBLICATIONS

Valencia, et al. "Synthesizing Stereo 3D Views from Focus Cues in Monoscopic 2D images." SPIE Stereoscopic Displays and Virtual Reality Systems X. 5006. (2003): 377-388. Print.*

(Continued)

*Primary Examiner* — Michael A Newman
(74) *Attorney, Agent, or Firm* — Wenderoth, Lind & Ponack, L.L.P.

(57) ABSTRACT

The present invention executes color correction that improves the feeling of depth of a 2D image with ease and by using a preexisting device. Input image data is first converted into brightness information by a brightness information calculation portion. The interest level within the image is then estimated by an interest level estimation portion based on that information. The vanishing point is then estimated by a vanishing point estimation portion. Next, a depth estimation portion estimates the degree of depth based on the distance from the vanishing point to a pixel i and the interest level of the pixel i, and calculates a depth correction gain value. A corrected image, obtained by controlling a depth correction image process based on the depth correction gain value, is converted to a predetermined image format and outputted by an output portion.

19 Claims, 47 Drawing Sheets

U.S. PATENT DOCUMENTS

| | | | |
|---|---|---|---|
| 2006/0061569 A1* | 3/2006 | Yamada | 345/422 |
| 2008/0170067 A1* | 7/2008 | Kim et al. | 345/419 |
| 2010/0080448 A1* | 4/2010 | Tam et al. | 382/154 |

FOREIGN PATENT DOCUMENTS

| | | |
|---|---|---|
| JP | 10-126708 | 5/1998 |
| JP | 2004-159148 | 6/2004 |
| JP | 2005-151534 | 6/2005 |

OTHER PUBLICATIONS

Battiato, et al. "3D Stereoscopic Image Pairs by Depth-Map Generation." Proceedings of the 2nd International Symposium on 3D Data Processing, Visualization, and Transmission. (2004): 1-8. Print.*

Lutton, et al. "Contribution to the Determination of Vanishing Points Using Hough Transform." IEEE Transactions on Pattern Analysis and Machine Intelligence. 16.4 (1994): 430-438. Print.*

Zhang, et al. "Stereoscopic Image Generation Based on Depth Images." 2004 International Conference on Image Processing. (2004): 2993-2996. Print.*

Tam, et al. "Stereoscopic Image Rendering-Based on Depth Maps Created from Blur and Edge Information." SPIE Stereoscopic Displays and Virtual Reality Systems. 5664. (2005): 104-115. Print.*

Asada, et al. "Edge and Depth from Focus." International Journal of Computer vision. 26.2 (1998): 153-163. Print.*

Tam, et al. "Depth Image Based Rendering for Multiview Stereoscopic Displays: Role of Information at Object Boundaries." SPIE Three-Dimensional TV, Video and Display IV. 6016. (2005): 1-11. Print.*

Cantoni, et al. "Vanishing Point Detection: Representation Analysis and New Approaches." Proc. IEEE 11th International Conference on Image Analysis and Processing. (2001): 1-5. Print.*

Palmer, et al. "An Optimised Vanishing Point Detector." Proceedings of the British Machine Vision Conference. (1993): 529-538. Print.*

Simond, et al. "Homography from a Vanishing Point in Urban Scenes." Proceedings of the IEEE Intl. Conf. on Intelligent Robots and Systems. 1. (2003): 1005-1010. Print.*

Youichi Horry et al., "Tour into the Picture: Using a Spidery Mesh Interface to Make Animation from a Single Image", SIGGRAPH '97 Proceedings, pp. 225-232 (1997).

* cited by examiner

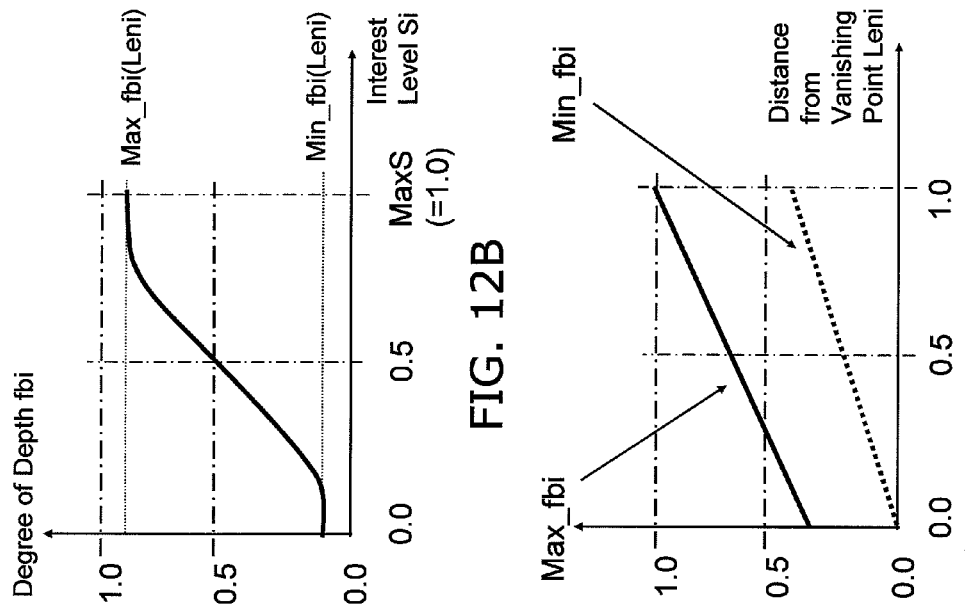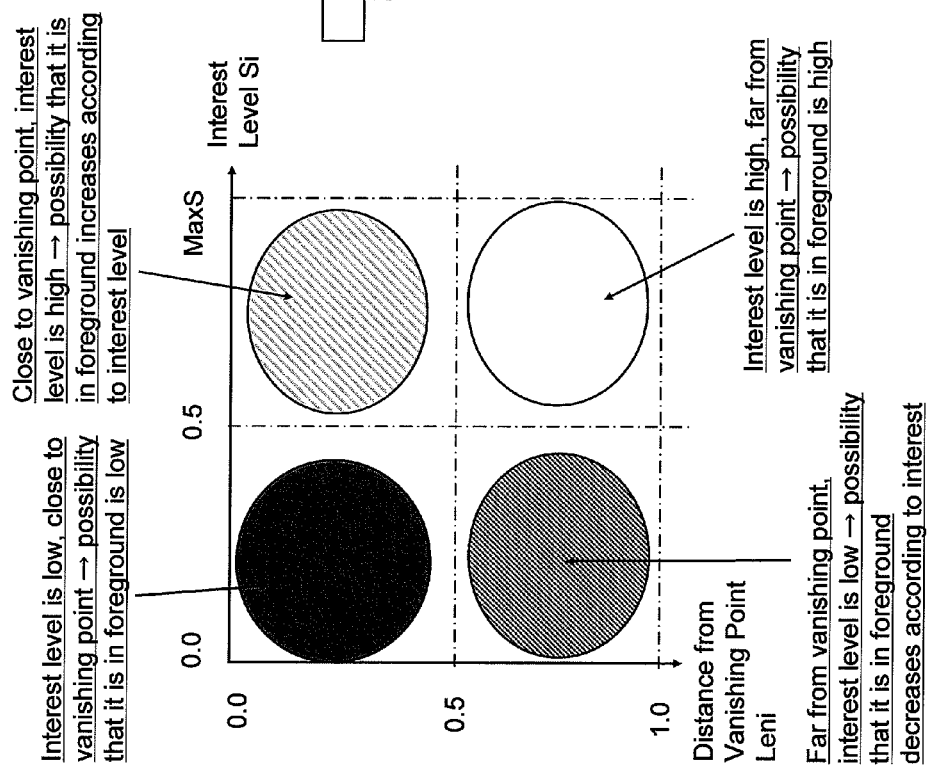

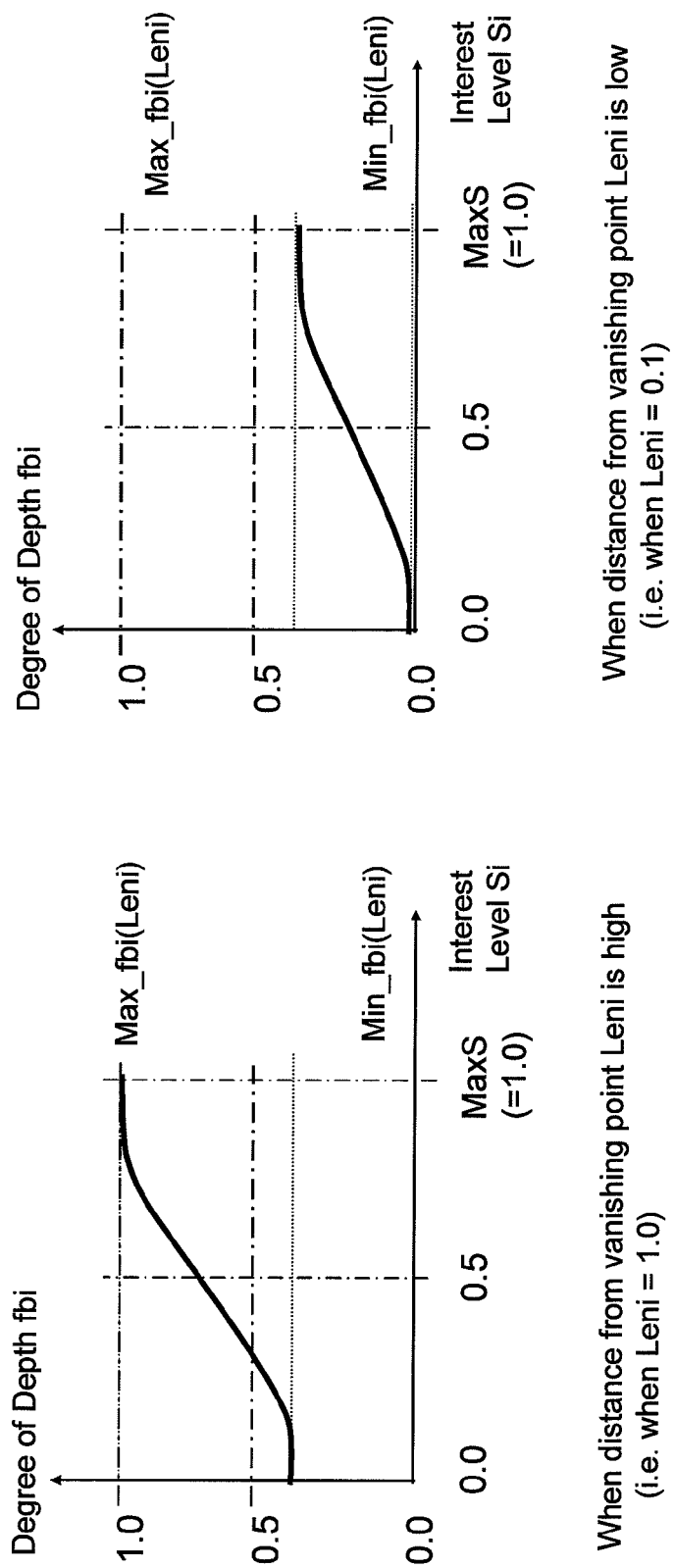

IMAGE PROCESSING DEVICE, IMAGE PROCESSING METHOD, IMAGE PROCESSING SYSTEM, PROGRAM, STORAGE MEDIUM, AND INTEGRATED CIRCUIT

BACKGROUND OF THE INVENTION

1. Field of the Invention

The present invention relates to image processing methods, image processing devices, image processing programs, and integrated circuits including the stated image processing devices for enhancing the feeling of depth and the three-dimensional effect of a two-dimensional image based on the foreground and background regions of the image.

2. Description of the Related Art

There has been a strong call by users for technology that increases the "feeling of depth" and the "three-dimensional effect" of displayed images in order to display more natural images on the screen of, for example, a large-screen FPD (flat panel display) device. Three-dimensional televisions and the like that utilize the binocular parallax of humans have been proposed in response to this demand, but it has been pointed out that special dedicated glasses are often required, that there is a large degree of dependence on the image, and that the special devices that are required increase costs. At the present time, one of the selling points of large screen display devices is their technology that achieves a three-dimensional effect in the displayed image (video) by smoothing the gradation characteristics or the color characteristics in the displayed image.

It is clear that humans utilize not only binocular parallax but also monocular information, such as color information, saturation (color saturation), brightness, contrast (color information contrast and brightness information contrast), shadows (gradations), gradient of texture, and relative size, in order to perceive depth and three dimensions in two-dimensional images. How to estimate depth information for a two-dimensional image is a key point in improving the "feeling of depth" and "three-dimensional effect" in a displayed image.

Patent Document 1 (JP H10-126708A) can be given as an example of a conventional technique that extracts and processes depth information in order to use such monocular information to increase the senses of depth/distance. In Patent Document 1, a region in which the level of a first order differential signal or a second order differential signal in an image signal is high is taken as the foreground region of the image, whereas a region in which the level of the stated signal is low is taken as the background region of the image, and a sense of distance is imparted on the image by altering the degree to which borders are enhanced.

FIG. 47 is a block diagram that shows the configuration of this conventional image processing device (three-dimensional device) 9100.

The image processing device 9100 enhances borders in an image formed by an inputted image signal by adding edges in the image, where the inputted image signal is a Y luminance signal. The image processing device 9100 is configured of the following: a differential circuit 9101 that performs a differential process on the inputted image signal (input image signal); a distance detection portion 9102 that detects near and far regions of the image based on a first order differential value and a second order differential value of the input image signal; a coefficient weighting portion 9103 that multiplies the second order differential signal by a coefficient value based on the results of the detection performed by the distance detection portion 9102; an adding portion 9105 that adds an input image signal Y' that has been delayed by a delay portion 9104 with a differential signal EG that has undergone the coefficient weighting performed by the coefficient weighting portion 9103; and the delay portion 9104 for adjusting the timing at which the input image signal is processed.

The distance detection portion 9102 determines whether a target pixel (that is, a pixel corresponding to the input image signal) belongs to the foreground region or the background region based on the signal levels of a signal S3, in which a first order differential signal DY1 has been quantized, and a signal S5, in which a second order differential signal DY2 has been quantized. The distance detection portion 9102 compares the signal level of the signal S3 with a setting value that determines whether or not the pixel belongs to a border portion region, sets a signal S4 to "1" if the signal level of the signal S3 is greater than or equal to the setting value, and sets the signal S4 to "0" if the signal level of the signal S3 is not greater than or equal to the setting value. In regions in which the signal S4 is "1", the distance detection portion 9102 determines whether or not pixels in border portions are in the foreground or in the background based on whether or not the signal level of the signal S5 (the signal obtained by quantizing the absolute value of the second order differential signal DY2) is greater than a threshold TH. The distance detection portion 9102 determines that the target pixel belongs to the foreground in the case where the signal level of the signal S5 is greater than TH. The distance detection portion 9102 then specifies a value K1, which is a value greater than a default value KS, as a coefficient KM to be multiplied by the second order differential signal DY2, and outputs the specified value to the coefficient weighting portion 9103. Meanwhile, if TH is less than S5, the distance detection portion 9102 determines that the target pixel belongs to the background region. The distance detection portion 9102 then specifies a value K2, which is a value lower than the default value KS, as the coefficient KM to be multiplied by the second order differential signal DY2, and outputs the specified value to the coefficient weighting portion 9103.

In this manner, the image processing device 9100 determines whether a pixel thought to be located on a border portion is present in the foreground or the background regions by determining the level of the second order differential signal DY2 of the pixel relative to a threshold. The image processing device 9100 increases the sense of distance in the vicinity of border portions by increasing or decreasing the coefficient for weighting the second order differential signal DY2, increasing the coefficient when the determination results indicate that the pixel is in the foreground and decreasing the coefficient when the determination results indicate that the pixel is in the background, thereby carrying out a border portion enhancement process.

Various approaches are also being considered for implementing image synthesis and virtual viewpoint movement processes by estimating three-dimensional constructions in two-dimensional images and utilizing the results of the estimation. Among these, there are techniques that calculate a vanishing point in a perspective and implement image synthesis and virtual viewpoint movement processes based on the calculated vanishing point (for example, see Non-Patent Document 1 (Y. Horry, K. Anjyo, and K. Arai: "Tour Into the Picture: Using a Spidery Mesh Interface to Make Animation from a Single Image", SIGGRAPH '97 Proceedings, pp. 225-232 (1997)) and Patent Document 2 (JP H9-185712A)).

"Tour Into the Picture", which is discussed in Non-Patent Document 1, makes it possible to remove foreground objects from a photographed image, estimate a vanishing point within the perspective, and, based on the estimated viewpoint, generate a rough construction of a scene for carrying out viewpoint movement. In contrast to "Tour Into the Picture", in which the depth structure has a tube-like shape whose cross section is a rectangle, the method of Patent Document 2 uses a perspective-based approach, in which the depth structure is a tube whose cross section is a border line according to the depth. The method described in Patent Document 2 creates a pseudo three-dimensional image by treating the camera as the center point (that is, the vanishing point). To be more specific, border line distance information is added to mesh image data to produce three-dimensional polygon object data. Color image data obtained from a photographic image is applied to the three-dimensional polygon object data, and the three-dimensional polygon object constructed by the three-dimensional polygon object data is rendered so that the color image data is pasted on the inside of the three-dimensional polygon object, through which three-dimensional image data is obtained.

With the stated conventional image processing methods, the foreground/background determination is carried out only on border portions that have relatively large differential values, and thus the foreground/background determination is not carried out on, for example, the weak border portions found in texture patterns, border portions that cannot be appropriately extracted due to photographic conditions such as ambient light, and so on. In other words, there is a high probability that border portion extraction based on the first order differential signal will be affected by how accurately the threshold is determined. Furthermore, the foreground/background determination for a pixel thought to be in a border portion is carried out after a thresholding process is first performed on the second order differential signal of that pixel, and thus the depth information determination is also easily affected by how accurately the threshold is determined. Therefore, even if, for example, the border portions belong to the same object and the object is at the same distance as other objects, there is nevertheless a danger that areas where edge enhancement is stronger and weaker will arise, as well as a danger that areas of discontinuous luminance will arise due to only strong and weak edge emphasis being carried out on border portions.

It also cannot be determined whether a low second order differential luminance signal is caused by issues such as blurriness caused by the photographic conditions (focus point shifting or movement and so on) of the image, interpolation executed during a simple upconversion from a low-resolution image into a high-resolution image, and so on, or if it is caused by the pixel actually being in the background region. For this reason, when, for example, an image encoded using a lossy encoding scheme is decoded and distortion within the decoded image is eliminated using a low-pass filter or the like, there is a danger of the entire image being determined as being the background, due to the settings used for determining the value of the threshold of the second order differential signal, which can result in an inability to appropriately carry out the original edge enhancement process.

Furthermore, with pseudo three-dimensional image forming devices and pseudo three-dimensional image forming methods such as those described in Non-Patent Document 1 and Patent Document 2, it is difficult to automatically determine vanishing points for various different types of images. It is quite difficult to automatically determine the vanishing point using the method disclosed in Patent Document 2, which finds the center point (the vanishing point) based on the point at which the sloping edge lines of the subject intersect with one another, a perspective-based method, and so on. Furthermore, there is a significant chance that a perspective-based structure, based on a vanishing point, cannot create a three-dimensional image that appears natural to the human eye for all inputted scenes.

SUMMARY OF THE INVENTION

Having been conceived as a solution to the stated problems with the conventional art, the present invention achieves an improvement in the feeling of depth/three-dimensional effect of an image, and it is an object thereof to provide an image processing device, image processing method, image processing system, program, storage medium, and integrated circuit capable of realizing a more natural feeling of depth in processed images by linking correction gain control based on the distance from a vanishing point with the interest level/level of attention directed within the image by a human, and without using differential signal-based border extraction as per the conventional art.

A first aspect of the present invention is an image processing device that includes a brightness information calculation portion, an interest level estimation portion, a vanishing point estimation portion, a depth estimation portion, and a depth correction portion. The brightness information calculation portion calculates brightness information of an image signal that can form an image made up of pixels, the calculation being performed per pixel or per pixel region made up of a plurality of pixels. The interest level estimation portion estimates an interest level indicating the degree to which the pixel or the pixel region is visually focused on in the image, based on the brightness information. The vanishing point estimation portion estimates vanishing point information of the image, based on the brightness information. The depth estimation portion estimates a degree of depth based on the interest level and the vanishing point information and calculates a correction gain for performing a depth correction process on the image signal based on the degree of depth. The depth correction portion performs the depth correction process on the image signal based on the correction gain.

With this image processing device, the depth correction process is carried out on the image signal based on the vanishing point information estimated by the vanishing point estimation portion and the interest level estimated by the interest level estimation portion; it is therefore possible to link correction gain control based on the distance from the vanishing point with the interest level/level of attention directed within the image by a human, thereby making it possible to achieve a more natural feeling of depth in image processing.

Furthermore, in cases such as where a vanishing point (vanishing point information) is not present in the image, a suitable vanishing point cannot be extracted, or there are many candidates for vanishing points, effective depth correction processing cannot be performed when that processing is carried out based solely on the vanishing point (vanishing point information) (for example, a process based solely on the distance from the vanishing point); however, with this image processing device, the depth correction process is carried out based on not only the vanishing point information but also the interest level, making it possible to carry out an effective depth correction process even in such cases as mentioned here.

Note that here, the "interest level" is an indexed degree of to what degree a human focuses on a pixel to be processed (a pixel of interest) or a pixel region made up of a plurality of pixels (a pixel of interest region) when that human views an image that includes that pixel of interest (or pixel of interest region) (in other words, a degree indicating the degree of interest of the human). It is therefore preferable for the "interest level" to be an index that takes into consideration the visual characteristics of humans.

Furthermore, the "vanishing point information" refers to information of a vanishing point defined as the point in a two-dimensional image, the two-dimensional being obtained by converting a three-dimensional space into a two-dimensional image, where plural parallel lines in the three-dimensional space that extend into infinity intersect.

The "degree of depth", meanwhile, is a value set per pixel or per pixel region, and when, for example, a space that is actually three-dimensional is captured by a camera as a two-dimensional image, the "degree of depth" indicates the distance between a position in the actual three-dimensional space corresponding to the pixel (or pixel region) in the two-dimensional image and the location of the camera in the three-dimensional space that captured the two-dimensional image. For example, a degree of depth fbi is defined as follows: a greater value for the degree of depth fbi indicates that a pixel i (pixel of interest i) corresponding to the degree of depth fbi is present in a foreground region of the image, whereas a lesser value for the degree of depth fbi indicates that a pixel i corresponding to the degree of depth fbi is present in a background region.

Furthermore, the "depth correction process" refers to a process for improving the feeling of depth in a processed image; for example, the more likely the pixel of interest i is, in terms of its visual characteristics, to be focused on by a human, the "depth correction process" corresponds to a process that improves the feeling of depth (sense of distance) in the processed image by correcting the pixel of interest i so that it is, in terms of its visual characteristics, even more likely to be focused on. The following can be given as examples of such a correction process:

(1) gradation (tone level) correction processing using a γ curve (gamma characteristics);
(2) gradation (tone level) correction processing taking into consideration the effects of brightness contrast;
(3) a simple saturation/hue correction process;
(4) a saturation/hue correction process taking into consideration the effects of color contrast;
(5) an edge enhancement process;
(6) a smoothing process;
(7) a shadow addition/light addition process;
(8) a memory color correction process; and
(9) a D-range (dynamic range) expansion process.

A second aspect of the present invention is the first aspect of the present invention, including an interest level estimation portion, a surrounding brightness information calculation portion, a brightness contrast amount calculation portion, and an interest level conversion portion. The surrounding brightness information calculation portion calculates surrounding brightness information AKi based on the brightness information of pixels surrounding a pixel of interest, the pixel of interest being the pixel in the image signal that is to be processed. The brightness contrast amount calculation portion calculates a brightness contrast amount RKi based on the surrounding brightness information AKi and brightness information of interest Ki, the brightness information of interest Ki being the brightness information of the pixel of interest. The interest level conversion portion finds the interest level based on the brightness contrast amount RKi.

Through this, the interest level can be accurately found using the brightness contrast amount RKi. Note that the surrounding pixel brightness information AKi can be found from, for example, a mean value of the surrounding pixel values, a weighted mean value of the surrounding pixel values (that is, a mean value that uses weighting performed using a Gaussian function or the like), and so on.

A third aspect of the present invention is the second aspect of the present invention, in which the brightness contrast amount calculation portion calculates the brightness contrast amount RKi using the formula (brightness contrast amount RKi)=(brightness information of interest Ki)/(surrounding brightness information AKi); and the interest level conversion portion sets the interest level to a greater value as the value of the brightness contrast amount RKi increases.

Through this, the brightness contrast amount RKi can be calculated with ease, and it is also possible to find an interest level that is suited to the visual characteristics of humans.

A fourth aspect of the present invention is one of the first through the third aspects of the present invention, including a vanishing point estimation portion, a border calculation portion, a Hough transform portion, a distribution calculation portion, and a vanishing point extraction portion. The border calculation portion calculates border information based on the brightness information and extracts characteristic points in the border portions within the image based on the border information. The Hough transform portion converts straight lines in the image that connect the characteristic points into points within a Hough space by performing a Hough transform. The distribution calculation portion calculates a histogram distribution for the points within the Hough space. The vanishing point extraction portion extracts the vanishing point information of the image based on the histogram distribution for the points in the Hough space.

Through this, the appropriate vanishing point information within the image can be extracted with ease.

A fifth aspect of the present invention is the fourth aspect of the present invention, in which the vanishing point extraction portion divides the image into a plurality of blocks; and calculates, using the histogram distribution calculated by the distribution calculation portion, the number of straight lines within a block, the number being the number of times a straight line in the image corresponding to the points in the Hough space having a frequency value greater than a first threshold passes through the block, and uses the central point of the block as the vanishing point information of the image in the case where the number of straight lines within a block is greater than a predetermined value.

Through this, a suitable vanishing point (vanishing point information) can be extracted even in the case where there are many vanishing point candidates in the image.

A sixth aspect of the present invention is one of the second through the fifth aspects of the present invention, in which the depth estimation portion: sets a degree of depth minimum value Min_fbi, which is the minimum value of the degree of depth, and a degree of depth maximum value Max_fbi ($\geq$Min_fbi), which is the maximum value of the degree of depth, to values in a relationship in which they monotonically increase with respect to the distance between the pixel of interest and the vanishing point information in the image; sets the degree of depth (fbi) to a value, within the range between the degree of depth minimum value Min_fbi and the degree of depth maximum value Max_fbi, in a relationship that monotonically increases with respect to the interest level; and sets the correction gain to a value in a relationship that monotonically increases with respect to the degree of depth (fbi). The depth correction portion performs the depth correction process on the image signal so that the greater the value of the correction gain becomes, the greater the degree to which the pixel of interest is visually focused on becomes.

With this image processing device, the degree of depth minimum value Min_fbi and the degree of depth maximum value Max_fbi (≧Min_fbi), which increase monotonically relative to the distance Leni from the vanishing point, are found through, for example, the characteristics illustrated in FIG. 12C, and the degree of depth fbi can be determined through, for example, the characteristics illustrated in FIG. 12B, based on the Max_fbi and Min_fbi determined based on the distance Leni from the vanishing point.

In particular, with this image processing device, the degree of depth fbi can be set to a higher value for a pixel i for which the distance Leni from the vanishing point is low and the interest level is high; therefore, the pixel i, which is likely to be focused on in terms of the visual characteristics of humans, is close to the vanishing point in the image, and has a high interest level, can be corrected to be even more likely to be focused on in terms of the visual characteristics, making it possible to effectively improve the feeling of depth (sense of distance) in the processed image.

Note that here, if the correction gain is Gi, the relationship between the degree of depth fbi and the correction gain Gi may be taken as, for example, Gi=fbi or Gi=k×fbi (where k is a positive constant). Furthermore, the relationship between Gi and fbi may be a relationship in which the correction gain Gi monotonically increases relative to the degree of depth fbi, or a different non-linear relationship may be used.

A seventh aspect of the present invention is the first aspect of the present invention, including a color information calculation portion that calculates color information per pixel or per pixel region in the image signal. The interest level estimation portion estimates the interest level based on the brightness information and the color information.

With this image processing device, the interest level is estimated taking into account the color information, making it possible to more accurately estimate the interest level of a pixel (or a pixel region) in the image more likely to be focused on by a human.

Note that the interest level Si takes on a value that is in the range of, for example "0" to "1", and a greater value for the interest level Si indicates that the degree to which a human focuses on the pixel i is higher; in the case where the interest level $S1i$, estimated based on the brightness information, and the interest level $S2i$, estimated based on the color information, are also compliant with the above definition, the image processing device can estimate the interest level Si based on, for example, the formula "interest level $Si=S1i \times S2i$".

An eighth aspect of the present invention is one of the first through the seventh aspects of the present invention, further including a frequency information calculation portion that calculates frequency information per block made up of plural pixels or plural pixel regions in the image signal. The interest level estimation portion estimates the interest level based on the frequency information in addition to the bright contrast information and color contrast information.

With this image processing device, the interest level is estimated taking into account the frequency information, making it possible to even more accurately estimate the interest level of a pixel (or a pixel region) in the image more likely to be focused on by a human.

Note that, similar as described above (the descriptions regarding the seventh aspect of the present invention), in the case where the interest level Si is defined and the interest level $S3i$, estimated based on the frequency information, is also compliant with the above definition, the image processing device can estimate the interest level Si based on, for example, the formula "interest level $Si=S1i \times S2i \times S3i$".

A ninth aspect of the present invention is the eighth aspect of the present invention, in which the interest level estimation portion finds, per block, a high-frequency component sum sumHFreq, which is the sum of frequency components greater than or equal to a predetermined frequency, finds a ratio RBi of the high-frequency component sum sumHFreq to an all-frequency component sum sumAllFreq of the block (=sumHFreq/sumAllFreq), and estimates the interest level based on the ratio RBi.

Through this, a suitable interest level can be estimated through a ratio RBi, which is information based on the frequency information, with ease. The ratio RBi is the ratio of high-frequency components in a block, and thus the higher this value is, the higher the degree to which a human focuses on the pixel i becomes. Accordingly, with this image processing device, a more highly-accurate depth correction process can be carried out by calculating the ratio RBi and finding the interest level taking into consideration the ratio RBi as well.

A tenth aspect of the present invention is one of the first through the ninth aspects of the present invention, further including a storage portion, a vanishing point estimation judgment portion, and a vanishing point selection portion. The storage portion stores past frame images, which are the image in p number of frame units from one frame previous to the current frame up to p frames previous to the current frame (where p is a natural number), and the vanishing point information in the past frame images. The vanishing point estimation judgment portion finds a past frame image characteristic amount, which is an image characteristic amount of each of the p past frame images stored in the storage portion, finds a current frame image characteristic amount, which is an image characteristic amount of the current frame image, the current frame image being the image in frame units at the current time, identifies the past frame image for which the difference between the current frame image characteristic amount and the past frame image characteristic amount is minimum as a minimum error past frame image, and outputs vanishing point replacement determination information in the case where the difference between the past frame image characteristic amount of the minimum error past frame image and the current frame image characteristic amount is less than a predetermined value. The vanishing point selection portion sets the vanishing point information of the minimum error past frame image as the vanishing point information of the current frame image in the case where the vanishing point determination information has been outputted by the vanishing point estimation judgment portion. The depth estimation portion estimates the degree of depth based on the vanishing point information set by the vanishing point selection portion and the interest level.

With this image processing device, the mean brightness information within blocks into which the image has been divided is taken as a characteristic amount of that image, the image characteristic amount of the current frame image is compared with the image characteristic amount of previous frame images, and the vanishing point information used in a frame image that has a similar image characteristic amount is taken as the vanishing point information of the current frame, whereby a suitable depth correction process compliant with moving images is carried out. Accordingly, by employing the vanishing point (vanishing point information) of a frame processed in the past and that has an image characteristic amount similar to the image characteristic amount of the current frame as the vanishing point of the current frame, the occurrence of contradictions in the sense of distance caused by scene changes (abnormalities felt due to the correction of the sense of distance) can be resolved (suppressed).

An eleventh aspect of the present invention is the tenth aspect of the present invention, in which the vanishing point estimation portion does not execute the process for estimating the vanishing point information based on the current frame image in the case where the vanishing point determination information has been outputted by the vanishing point estimation judgment portion.

With this image processing device, a process for estimating the vanishing point information based on the current frame image is not carried out, thereby making it possible to reduce the amount of processing.

A twelfth aspect of the present invention is the tenth aspect of the present invention, in which the vanishing point selection portion sets smoothed vanishing point information, in which the vanishing point information of the p past frame images has been smoothed, as the vanishing point information of the current frame image, in the case where the vanishing point determination information has not been outputted by the vanishing point estimation judgment portion. The vanishing point estimation portion does not execute the process for estimating the vanishing point information based on the current frame image.

Accordingly, with this image processing device, a suitable depth correction process compliant with moving images can be carried out while also reducing the amount of processing, even in the case where a past frame image having a similar image characteristic amount to the current frame image cannot be detected.

A thirteenth aspect of the present invention is one of the tenth through the twelfth aspects of the present invention, in which the vanishing point estimation judgment portion identifies the past frame image for which square error between the current frame image characteristic amount and the past frame image characteristic amount is minimum as the minimum error past frame image, and outputs vanishing point replacement determination information in the case where the square error between the past frame image characteristic amount of the minimum error past frame image and the current frame image characteristic amount is less than a predetermined value.

Through this, the minimum error past frame image can be more accurately identified.

A fourteenth aspect of the present invention is the thirteenth aspect of the present invention, in which the image characteristic amount is calculated based on at least one of a brightness contrast amount, a color contrast amount, and an amount based on frequency information calculated per block made up of a plurality of pixels or a plurality of pixel regions.

A fifteenth aspect of the present invention is the fourteenth aspect of the present invention, in which the amount based on the frequency information is a ratio $RB_i$ of the high-frequency component sum sumHFreq, which is the sum of frequency components greater than or equal to a predetermined frequency found per block, to an all-frequency component sum sumAllFreq of the block (=sumHFreq/sumAllFreq).

A sixteenth aspect of the present invention is one of the first through the fifteenth aspects of the present invention, in which the depth correction portion performs at least one of a brightness information correction process, a color information correction process, a border enhancement process, and a smoothing process as the depth correction process.

A seventeenth aspect of the present invention is an image processing system including the image processing device according to one of the first through the sixteenth aspects of the present invention, a user mode selection portion that selects a processing mode in accordance with an instruction from a user, and a display portion that displays the output from the image processing device as an image.

Accordingly, with this image processing system, it is possible for the user to select a processing mode. In particular, the user can select a processing mode while viewing the processed image that is displayed on the display portion, and thus with this image processing system it is possible to achieve image processing that is based on the users desired image processing characteristic.

An eighteenth aspect of the present invention is the seventeenth aspect of the present invention, in which the user mode selection portion selects the processing mode that includes at least information regarding the strength of the depth correction process executed by the image processing device.

Accordingly, with this image processing system, it is possible for the user to select a mode based on information regarding the strength of the depth correction process, and change the strength of the depth correction process performed by the image processing device. For example, with this image processing device, a "high mode", a "mid mode", and a "low mode" are provided as processing modes by which the strength of the depth correction process is set, and the strength of the depth correction process desired by the user is achieved by the user selecting one of those modes.

A nineteenth aspect of the present invention is the seventeenth or eighteenth aspect of the present invention, in which the display portion displays vanishing point information estimated by the image processing device along with an image processed by the image processing device. The user mode selection portion corrects the vanishing point information estimated by the image processing device in accordance with an instruction from the user.

Accordingly, with this image processing system, the user can confirm the vanishing point (vanishing point information) estimated by the image processing device in the processed image displayed in the display portion, and correct that estimated vanishing point to his/her own desired vanishing point.

A twentieth aspect of the present invention is an image processing method that includes a brightness information calculation step, an interest level estimation step, a vanishing point estimation step, and a depth estimation step. In the brightness information calculation step, brightness information of an image signal that can form an image made up of pixels is calculated, the calculation being performed per pixel or per pixel region made up of a plurality of pixels. In the interest level estimation step, an interest level indicating the degree to which the pixel or the pixel region is visually focused on in the image is estimated, based on the brightness information. In the vanishing point estimation step, vanishing point information of the image is estimated, based on the brightness information. In the depth estimation step, a degree of depth is estimated based on the interest level and the vanishing point information and a correction gain for performing a depth correction process on the image signal is calculated based on the degree of depth. In the depth correction step, the depth correction process is performed on the image signal based on the correction gain.

Through this, it is possible to achieve an image processing method that achieves the same effects as the first aspect of the present invention.

A twenty-first aspect of the present invention is a computer-readable storage medium on which is stored a program for causing a computer to function as a brightness information calculation portion, an interest level estimation portion, a vanishing point estimation portion, a depth estimation portion, and a depth correction portion. The brightness information calculation portion calculates brightness information of an image signal that can form an image made up of pixels, the calculation being performed per pixel or per pixel region made up of a plurality of pixels. The interest level estimation portion estimates an interest level indicating the degree to which the pixel or the pixel region is visually focused on in the image, based on the brightness information. The vanishing point estimation portion estimates vanishing point information of the image, based on the brightness information. The depth estimation portion estimates a degree of depth based on the interest level and the vanishing point information and calculates a correction gain for performing a depth correction process on the image signal based on the degree of depth. The depth correction portion performs the depth correction process on the image signal based on the correction gain.

Through this, it is possible to achieve a computer-readable storage medium that achieves the same effects as the first aspect of the present invention.

A twenty-second aspect of the present invention is an integrated circuit that includes a brightness information calculation portion, an interest level estimation portion, a vanishing point estimation portion, a depth estimation portion, and a depth correction portion. The brightness information calculation portion calculates brightness information of an image signal that can form an image made up of pixels, the calculation being performed per pixel or per pixel region made up of a plurality of pixels. The interest level estimation portion estimates an interest level indicating the degree to which the pixel or the pixel region is visually focused on in the image, based on the brightness information. The vanishing point estimation portion estimates vanishing point information of the image, based on the brightness information. The depth estimation portion estimates a degree of depth based on the interest level and the vanishing point information and calculates a correction gain for performing a depth correction process on the image signal based on the degree of depth. The depth correction portion performs the depth correction process on the image signal based on the correction gain.

Through this, it is possible to achieve an integrated circuit that achieves the same effects as the first aspect of the present invention.

According to the present invention, it is possible to achieve an image processing device, image processing method, image processing system, program, storage medium, and integrated circuit capable of realizing a more natural feeling of depth in processed images by linking correction gain control based on the distance from a vanishing point with the interest level/level of attention directed within the image by a human, and without using differential signal-based border extraction as per the conventional art.

BRIEF DESCRIPTION OF THE DRAWINGS

FIG. 12A through 12C are diagrams illustrating an example of calculating the degree of depth based on the distance from the vanishing point and the interest level.

FIG. 13 is a diagram illustrating a relationship between an interest level Si and a degree of depth fbi when the distance from the vanishing point Leni is small (when Leni=0.1) and large (when Leni=1.0).

DETAILED DESCRIPTION OF THE INVENTION

Figure 1:
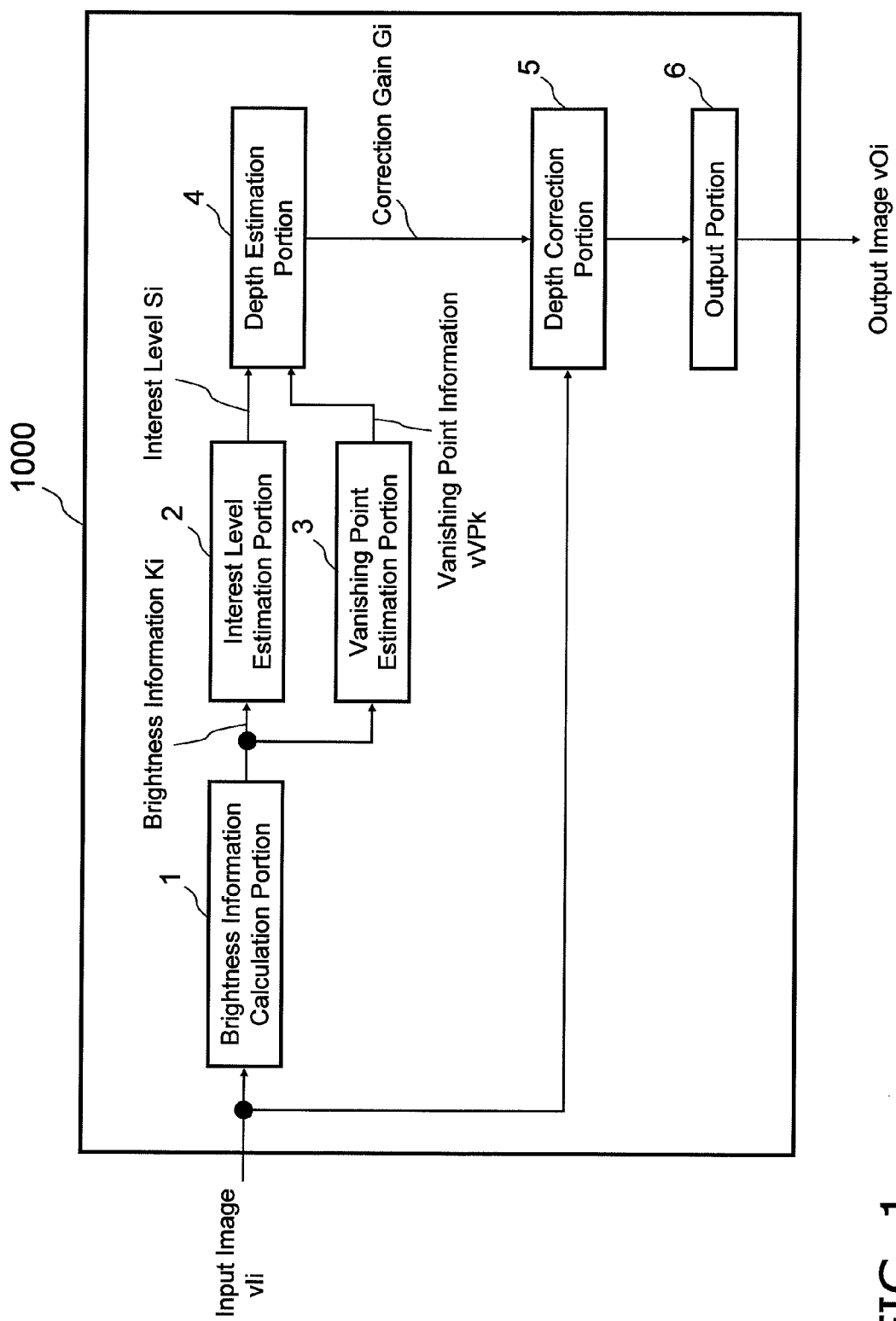
FIG. 1 is a block diagram illustrating the configuration of an image processing device according to a first embodiment of the present invention.

Preferred embodiments one through ten of the present invention shall be described hereinafter.

The first embodiment describes an image processing device and an image processing method that correct pixel values in a target region of an image in accordance with an interest level calculated using the amount of brightness contrast, which is a visual property related to brightness, and with a degree of depth calculated based on the distance from an estimated vanishing point.

The second embodiment describes an image processing device and an image processing method that correct pixel values in a target region of an image in accordance with a degree of depth calculated based on the distance from an estimated vanishing point using the amount of brightness contrast, which is a visual property related to brightness, and the amount of color contrast, which is a visual property related to color.

The third embodiment describes an image processing device and an image processing method that correct pixel values in a target region of an image in accordance with a degree of depth calculated based on the distance from an estimated vanishing point using the amount of brightness contrast, which is a visual property related to brightness, the amount of color contrast, which is a visual property related to color, and a sharpness amount based on frequency information.

The fourth embodiment describes an image processing device and an image processing method that combine the calculation of the interest level based on the brightness contrast amount, as carried out in the first embodiment, with a functional portion that compares a characteristic amount of the image in the current frame with characteristic amounts of an images from p frames previous to one frame previous, determines whether or not to estimate a vanishing point based on an evaluation value defined by the difference found through the stated comparison, and selects the vanishing point of the past frame that has the optimal evaluation value in the case where the vanishing point estimation is not to be carried out.

The fifth embodiment describes an image processing device and an image processing method that combine the calculation of the interest level based on the brightness contrast amount and the color contrast amount, as carried out in the second embodiment, with the functional portion of the fourth embodiment, which compares a characteristic amount of the image in the current frame with characteristic amounts of an images from p frames previous to one frame previous, determines whether or not to estimate a vanishing point based on an evaluation value defined by the difference found through the stated comparison, and selects the vanishing point of the past frame that has the optimal evaluation value in the case where the vanishing point estimation is not to be carried out.

The sixth embodiment describes an image processing device and an image processing method that combine the calculation of the interest level based on the brightness contrast amount, color contrast amount, and sharpness amount based on the frequency, as carried out in the third embodiment, with the functional portion of the fourth embodiment, which compares a characteristic amount of the image in the current frame with characteristic amounts of an images from p frames previous to one frame previous, determines whether or not to estimate a vanishing point based on an evaluation value defined by the difference found through the stated comparison, and selects the vanishing point of the past frame that has the optimal evaluation value in the case where the vanishing point estimation is not to be carried out.

The seventh embodiment describes an image processing device and an image processing method that combine the calculation of the interest level based on the brightness contrast amount, as carried out in the first embodiment, with a functional portion that smoothes the vanishing points of several previous frames.

The eighth embodiment describes an image processing device and an image processing method that combine the calculation of the interest level based on the brightness contrast amount and the color contrast amount, as carried out in the second embodiment, with a functional portion that smoothes the vanishing points of several previous frames together.

The ninth embodiment describes an image processing device and an image processing method that combine the calculation of the interest level based on the brightness contrast amount, color contrast amount, and sharpness amount based on the frequency, as carried out in the third embodiment, with a functional portion that smoothes the vanishing points of several previous frames.

Finally, the tenth embodiment describes an image processing device and an image processing method in which a user can select a processing mode for, for example, the correction level, using an image processing device according to the first through ninth embodiments as an image processing portion.

First Embodiment

An image processing method and an image processing device, which estimate a degree of depth based on an interest level and the distance from a vanishing point and carry out pixel value correction, shall be described as a first embodiment of the present invention, with reference to FIGS. 1 through 12.

<1.1: Configuration of the Image Processing Device>

FIG. 1 is a block diagram illustrating the configuration of an image processing device 1000 according to the first embodiment of the present invention.

The image processing device 1000 includes: a brightness information calculation portion 1 that calculates brightness information Ki based on an input image signal vIi; an interest level estimation portion 2 that estimates an interest level Si based on the brightness information Ki; and a vanishing point estimation portion 3 that estimates vanishing point information vVPk based on the brightness information Ki. The image processing device 1000 further includes: a depth estimation portion 4 that estimates a degree of depth based on the interest level Si and the vanishing point information vVPk and calculates a correction gain Gi; a depth correction portion 5 that performs depth correction on the input image signal vIi based on the correction gain Gi; and an output portion 6 that outputs the depth-corrected image signal in a predetermined format as an output image signal vOi.

The brightness information calculation portion 1 calculates the brightness information (luminance) Ki based on the input image signal vIi, and outputs the calculated brightness information Ki to the interest level estimation portion 2 and the vanishing point estimation portion 3.

Here, vector data (group data made of a plurality of data), which have a small letter modifier of "v", such as the image signal vIi(x,y), indicate that a target pixel i(x,y) has a plurality of types of information (data). For example, it is possible for the image signal vIi(x,y) to be information that has a total of three types of information (data), these being luminance data Y and chroma data Cb and Cr, for a pixel i(x,y) to be processed (pixel of interest i), and it may also be information that expresses a RGB color space for the pixel i that has a total of three types of information (data), these being information (data) on the R component, information (data) on the G component, and information (data) on the B component, or information (data) that expresses a different color space such as the information (data) of a plurality of components based on that color space.

Figure 2:
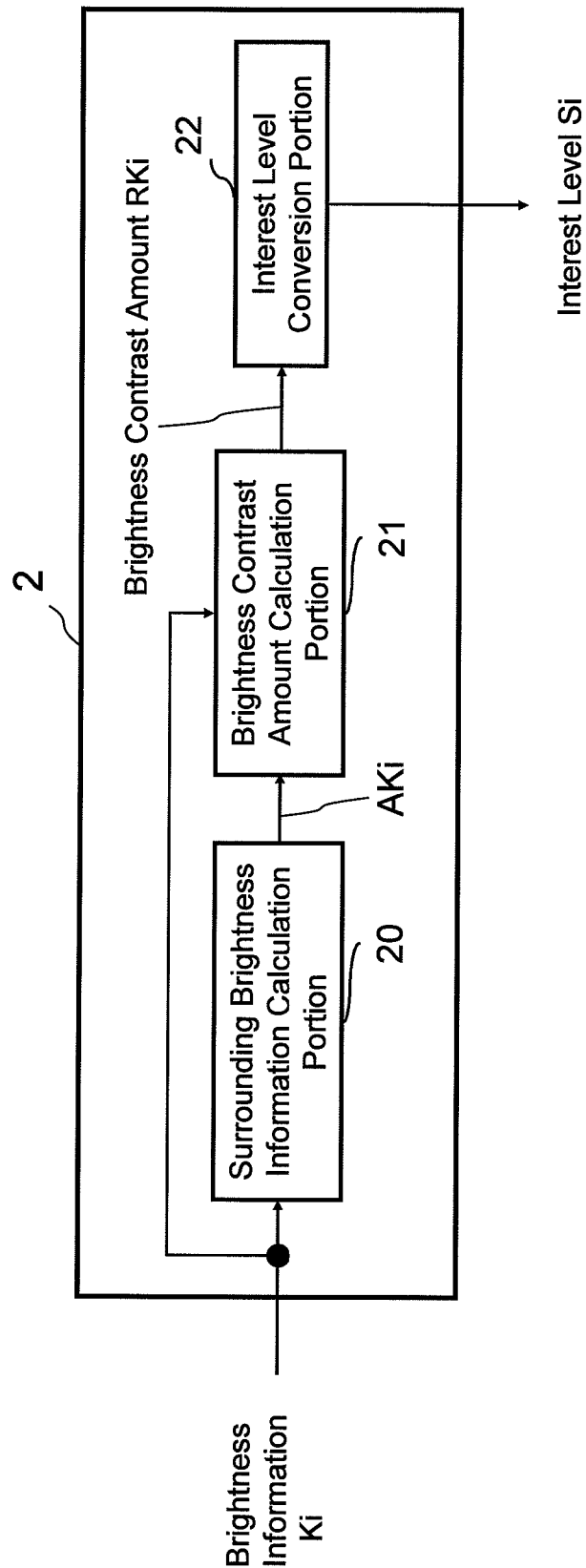
FIG. 2 is a block diagram illustrating the configuration of an interest level estimation portion within the image processing device according to the first embodiment of the present invention.

The interest level estimation portion 2 includes, as illustrated in FIG. 2, a surrounding brightness information calculation portion 20, a brightness contrast amount calculation portion 21, and an interest level conversion portion 22.

The surrounding brightness information calculation portion 20 takes the brightness information Ki as its input, calculates representative brightness information AKi(x,y) representing the periphery of the pixel that is to be processed (processing target pixel) i(x,y) in the input image signal vIi, and outputs the representative brightness information AKi(x,y) to the brightness contrast amount calculation portion 21.

The brightness contrast amount calculation portion 21 takes, as its input, the brightness information Ki and the representative brightness information AKi calculated by the surrounding brightness information calculation portion 20, calculates a brightness contrast amount RKi based on the brightness information Ki and the representative brightness information AKi, and outputs the brightness contrast amount RKi to the interest level conversion portion 22.

The interest level conversion portion 22 calculates the interest level Si based on the brightness contrast amount RKi, and outputs the calculated interest level Si to the depth estimation portion 4.

Figure 3:
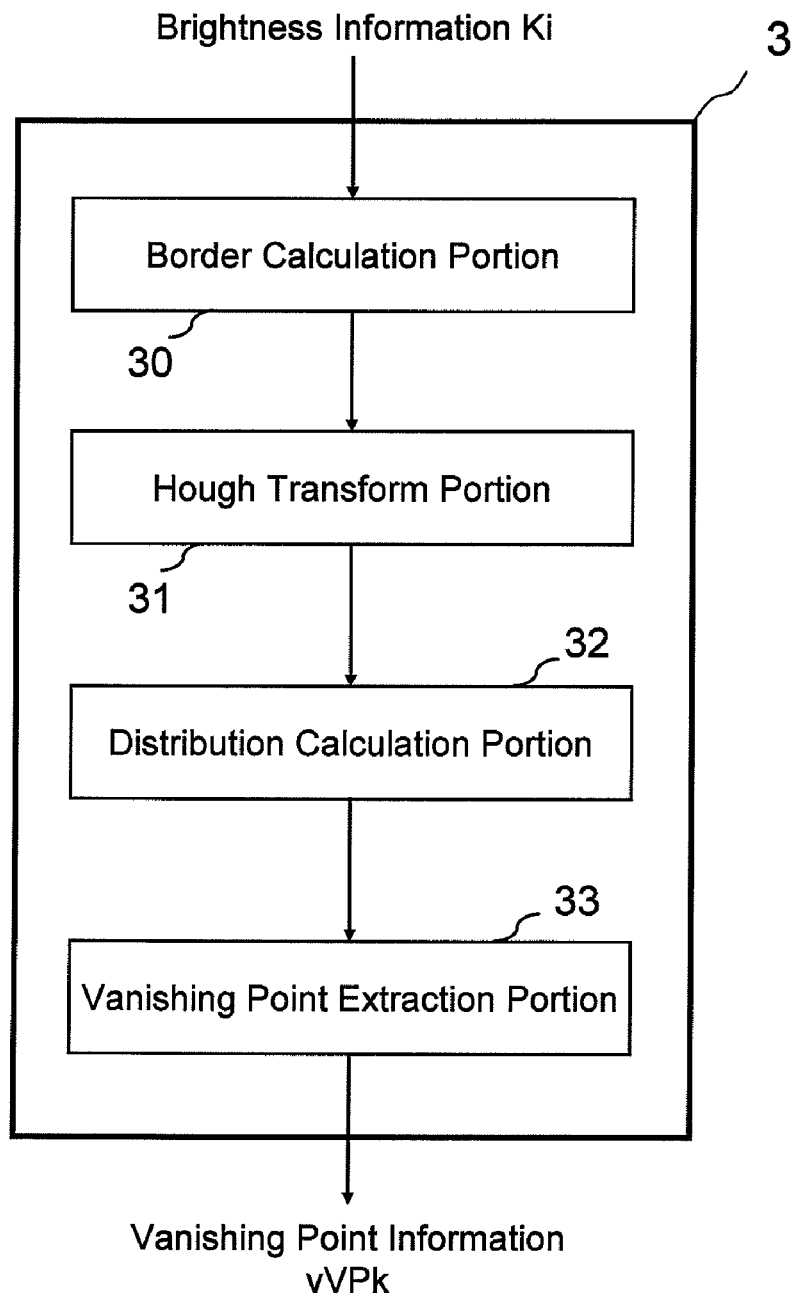
FIG. 3 is a block diagram illustrating the configuration of a vanishing point estimation portion within the image processing device according to the first embodiment of the present invention.

The vanishing point estimation portion 3 includes, as illustrated in FIG. 3, a border calculation portion 30, a Hough transform portion 31, a distribution calculation portion 32, and a vanishing point extraction portion 33.

The border calculation portion 30 takes, as its input, the brightness information Ki calculated by the brightness information calculation portion 1, calculates border information (edge information) based on the brightness information Ki, extracts characteristic points RPk(x,y) located on a border portion in the image, and outputs the characteristic points RPk(x,y) to the Hough transform portion 31. It is preferable for the border calculation portion 30 to extract a border information image through binarization and extract the characteristic points RPk(x,y) therefrom.

The Hough transform portion 31 performs a Hough transform on the straight lines that connect the characteristic points RPk(x,y) to one another, thereby converting straight lines within the image space into points (ρ,θ) within a Hough space (details of this process shall be given later).

The distribution calculation portion 32 calculates a histogram for the points (ρ,θ) within the Hough space obtained by converting the straight lines within the image space, and outputs the histogram to the vanishing point extraction portion 33.

The vanishing point extraction portion 33 extracts a vanishing point vVPk(x,y) within the image space based on the histogram calculated by the distribution calculation portion 32. The vanishing point extraction portion 33 outputs the extracted vanishing point vVPk(x,y) to the depth estimation portion 4.

The depth estimation portion 4 takes the interest level Si estimated by the interest level estimation portion 2 and the vanishing point information vVPk estimated by the vanishing point estimation portion 3 as its input, estimates the degree of depth based on the interest level Si and the vanishing point information vVPk, and calculates the correction gain Gi based on the estimated degree of depth. The depth estimation portion 4 then outputs the calculated correction gain Gi to the depth correction portion 5.

The depth correction portion 5 takes the correction gain Gi and the input image signal vIi as its input, performs depth correction on the input image signal vIi based on the correction gain Gi, and outputs the depth-corrected image signal to the output portion 6.

The output portion 6 takes the image signal on which the depth correction portion 5 performed depth correction as its input, and outputs the depth-corrected image signal in a predetermined format as the output image signal vOi.

<1.2: Operation of the Image Processing Device>

Operations of the image processing device 1000 configured as described thus far shall be described hereinafter.

Figure 4:
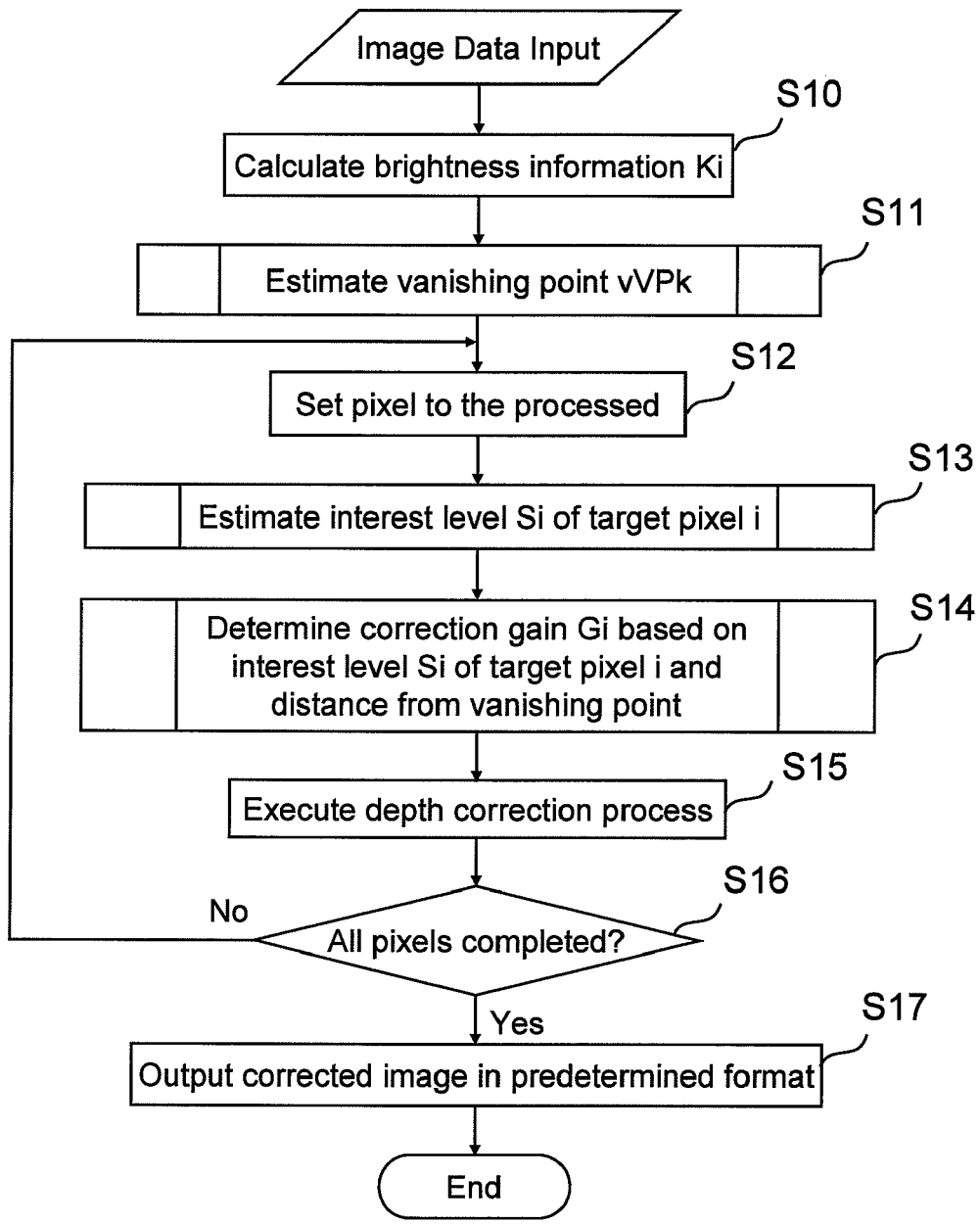
FIG. 4 is a flowchart illustrating the entirety of an image processing method according to the first embodiment of the present invention.
Figure 5:
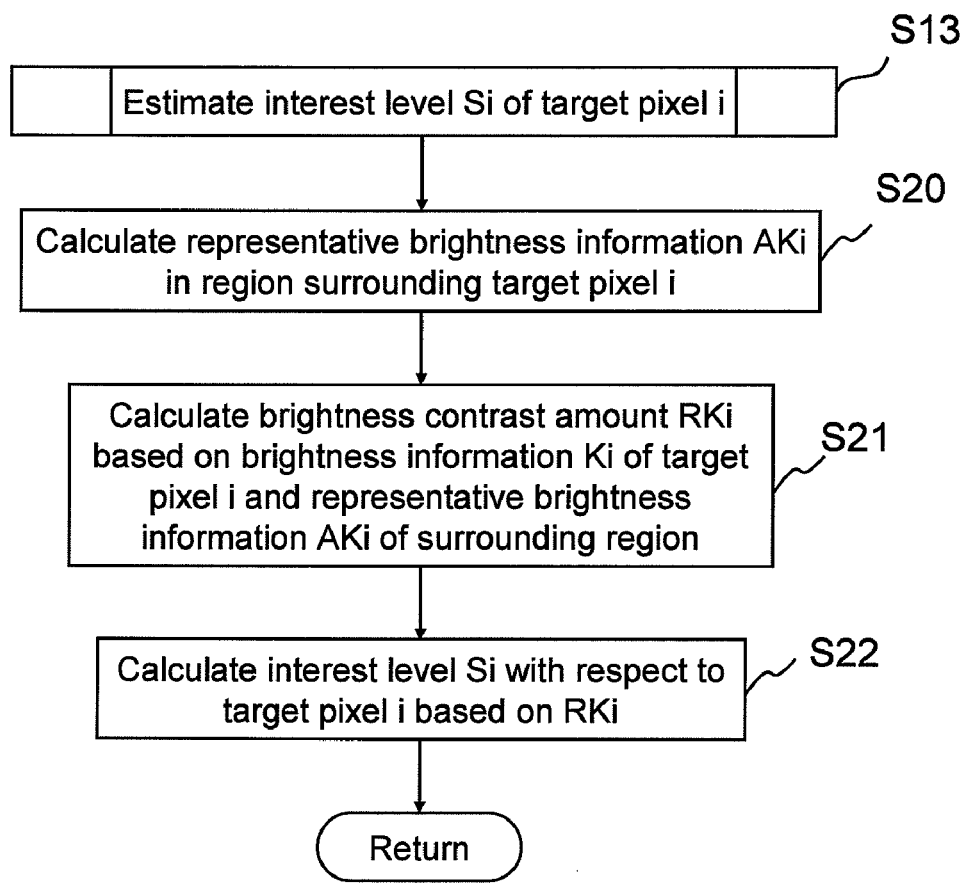
FIG. 5 is a flowchart illustrating an interest level estimation process within the image processing method according to the first embodiment of the present invention.
Figure 6:
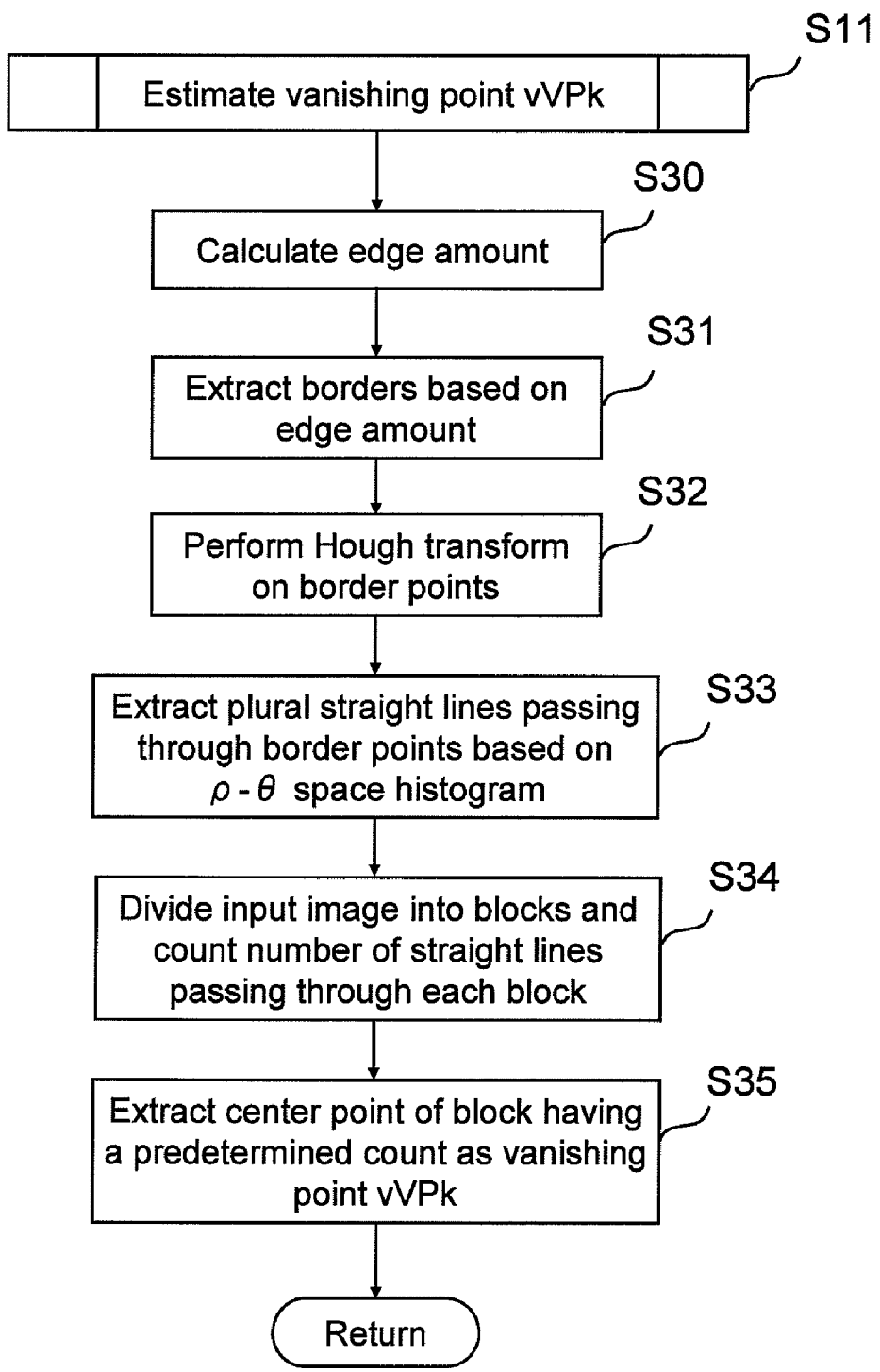
FIG. 6 is a flowchart illustrating a vanishing point estimation process within the image processing method according to the first embodiment of the present invention.

FIG. 4 is a flowchart illustrating processes performed in the image processing method according to the first embodiment; FIG. 5 is a flowchart illustrating an interest level estimation process; and FIG. 6 is a flowchart illustrating a vanishing point estimation process.

The image processing device 1000 according to the present invention is a device that estimates the degree of depth of each pixel (or each region made up of a plurality of pixels) in an image by processing image data (an image signal) and performs a depth correction process on the image signal by controlling the correction gain value of a predetermined image process carried out on the image signal. The image processing device 1000 can therefore be installed in, for example, image capturing devices such as digital still cameras and digital video cameras, image editing devices for editing digital images that have been obtained with such image capturing devices, portable telephones, car mobile devices, and PDAs that are used in mobile environments, and large-scale video display devices that are used in various environments.

The processes performed by the image processing device 1000 shall be described using FIGS. 1 through 6.

When image data (an image signal) having pixels i with a pixel value vIi is inputted into the image processing device 1000, the data of each pixel i(x,y) that make up the image data (image signal) vIi is converted into predetermined brightness information Ki by the brightness information calculation portion 1. Here, the inputted image data is converted into a value V found in the HSV color space, which is made up of a hue component H, a saturation component S, and a value component V, or luminance Y found in the YCbCr color space, which is made up of a luminance component Y and chroma components Cb and Cr, or a lightness dimension L found in the La*b* color space, which is made up of the lightness dimension L and color dimensions a* and b*, all of which are easy to handle as color information. It shall be assumed in the present embodiment that the luminance component Y in the YCbCr color space is used as the brightness information Ki.

The interest level estimation portion 2 first calculates the brightness contrast amount RKi with respect to the brightness information Ki obtained by the brightness information calculation portion 1.

Figure 7:
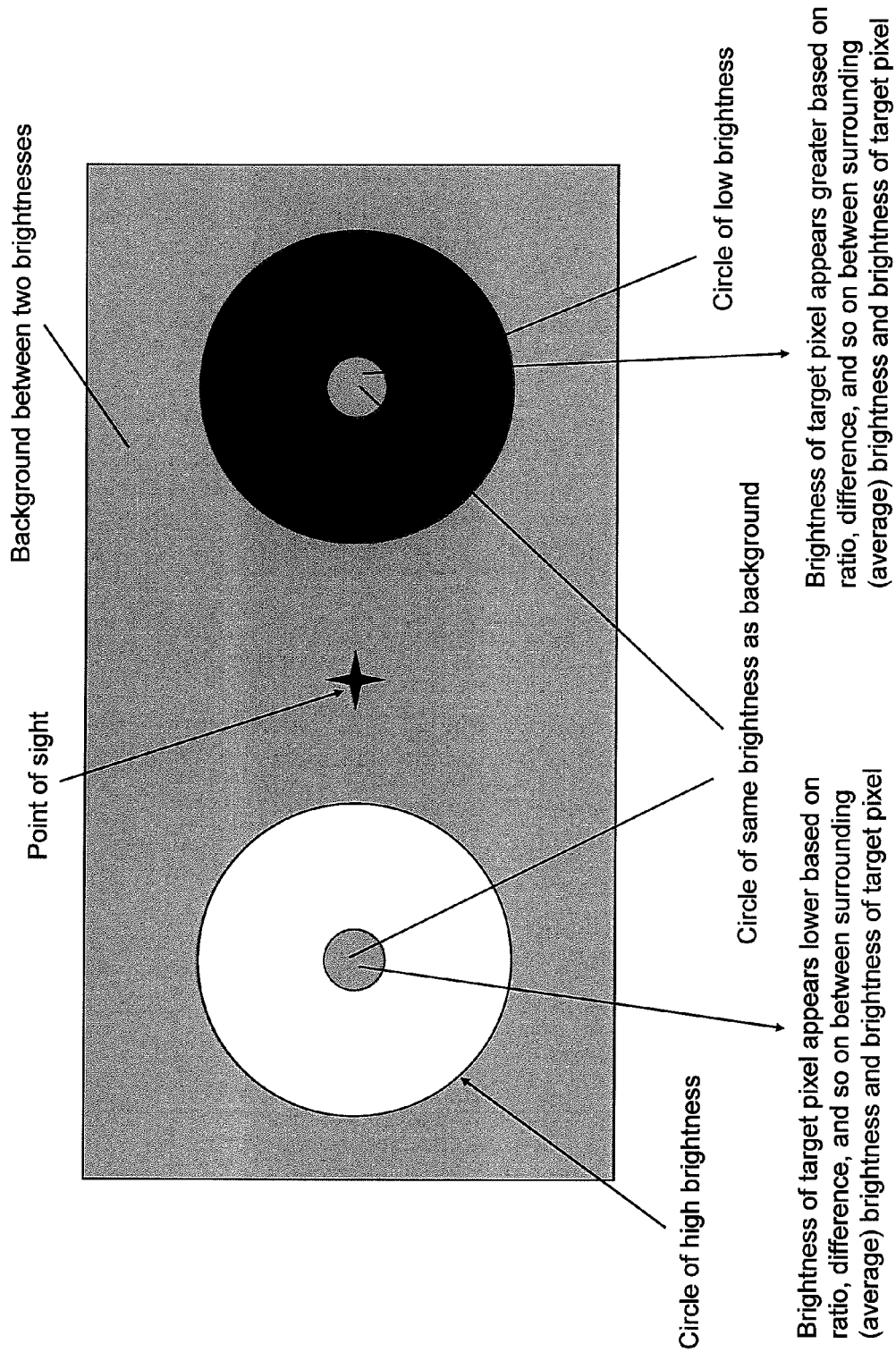
FIG. 7 is a diagram illustrating an outline of brightness contrast used in the interest level estimation in the image processing method according to the first embodiment of the present invention.

This brightness contrast amount corresponds to a piece of information indicating a brightness characteristic that corresponds to a visual characteristic for the brightness information Ki, and is a characteristic amount suited to the implementation of interest level estimation that is closer to human vision. FIG. 7 is a diagram for illustrating this characteristic. For example, consider an example of large circle with low brightness that in its center has a small center circle with a higher brightness than its surroundings. In this case, it is evident from the psychology of vision that humans tend to perceive the center portion of the large circle as brighter than its actual brightness. This phenomenon occurs due to the brightness contrast characteristic, and occurs when a target object is surrounded by a different brightness and the brightness of that object is affected by the brightness of its surroundings.

In other words, when an object is surrounded by a brightness that is higher than its own, the brightness of the object is felt to be lower. Conversely, when an object is surrounded by a brightness that is lower than its own, the brightness of the object is felt to be higher.

Figure 8:
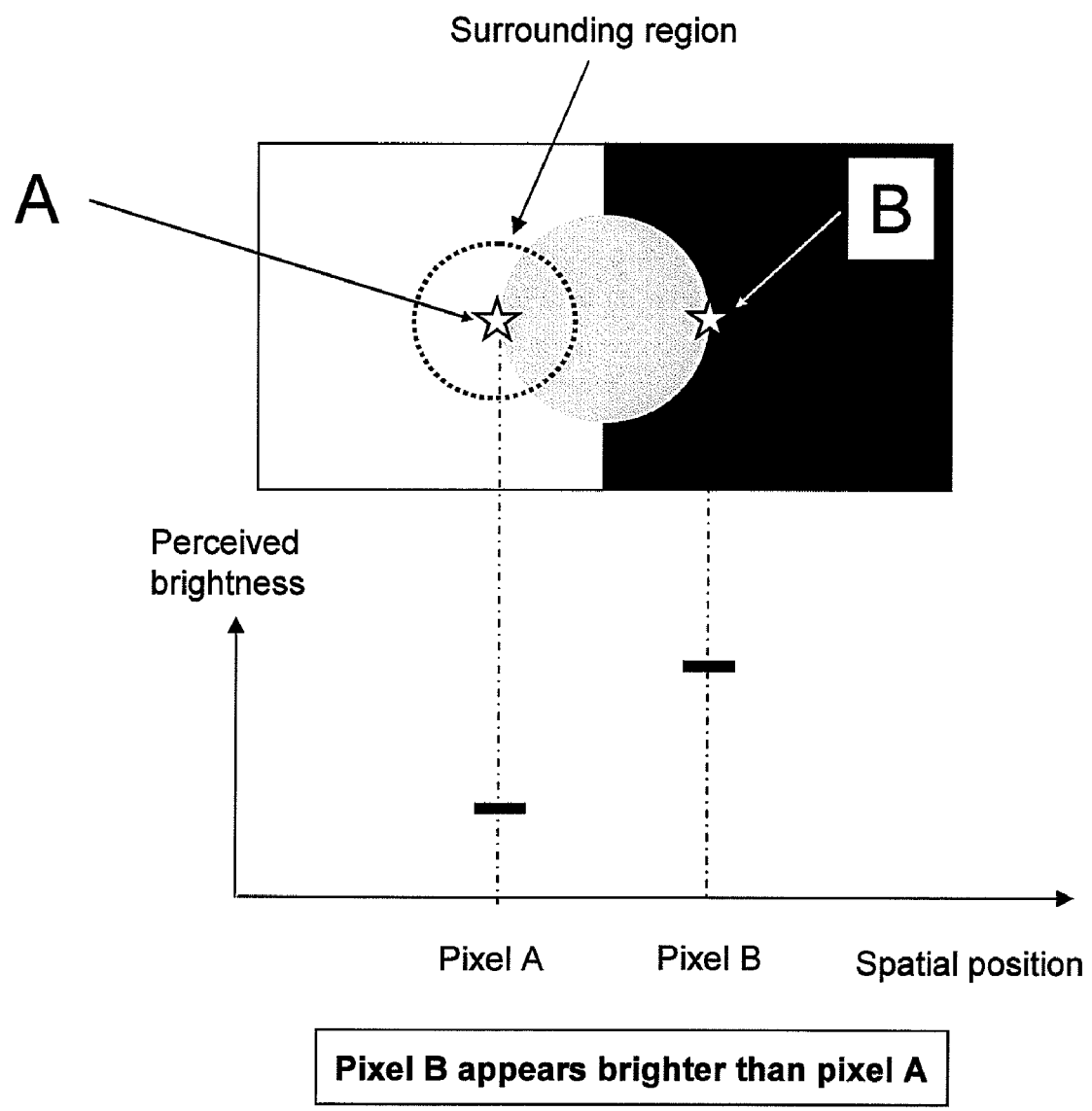
FIG. 8 is another diagram illustrating an outline of brightness contrast used in the interest level estimation in the image processing method according to the first embodiment of the present invention.

The brightness contrast shall also be illustrated using FIG. 8. FIG. 8 is a descriptive diagram that considers the same brightness contrast with respect to boundaries of a single circle.

The circle in the center has uniform brightness information. On the other hand, the left side of the rectangle is slightly brighter than the center circle, and the right side of the rectangle is much less bright (much darker) than the center circle. The brightness of the pixel A and the brightness of the pixel B located at the two stars on the border of the center circle in this case are confirmed. Pixel A and pixel B originally have the same brightness. However, pixel B is much brighter than the region around it, and thus the result of this contrast effect is that pixel B tends to be perceived as much brighter than its actual brightness. In contrast, pixel A is slightly less bright than the region around it, and thus due to the contrast effect the pixel A tends to be perceived as slightly darker than its actual brightness. This results in the phenomenon that the user perceives pixel B as brighter than pixel A.

In the present invention, the brightness contrast amount $RK_i(x,y)$ is found by the brightness contrast amount calculation portion 21. Here, it is assumed that a pixel range (region) approximately ⅙ to ⅓ the size of the overall image region (the pixel region corresponding to the visual region of a human) is used as the surrounding region when executing a process to find the brightness contrast amount RKi. As the representative brightness information $AK_i(x,y)$ of the surrounding region, it is preferable for the weighted mean brightness within a pixel region $\Omega_i$, which has a predetermined width that corresponds to the visual region of humans, to serve as the representative brightness information $AK_i(x,y)$ of the pixels surrounding the target pixel $i(x,y)$, for example, but in addition to this, with the pixels within the visual region serving as the target, it is also possible to find a histogram for the brightness (luminance) of pixels in that region (luminance histogram), and then take the luminance value that appears most frequently in that histogram, the representative luminance that is obtained by clustering based on the statistical distribution within the visual region, or the mean luminance within the visual region, as the representative brightness AYi.

The brightness contrast amount RKi of the pixel i(x,y) can also be defined as:

(a) the ratio of the brightness information Ki to the brightness information AKi that represents the surroundings; or (b) a value found by subtracting the brightness information AKi that represents the surroundings from the brightness information Ki.

It should be noted that many other definitions are possible, but here, in order to more clearly express the contrast, (a), or the ratio of the brightness information Ki to the brightness information AKi that represents the surroundings, has been used.

(Formula 1)

$$RK_i = K_i / AK_i \tag{1}$$

The surrounding brightness information calculation portion 20 finds the representative brightness information AKi of the surroundings, and the brightness contrast amount calculation portion 21 finds the brightness contrast amount RKi using Formula 1.

Next, the brightness contrast amount RKi(x,y) and the interest level Si(x,y) of the pixel i(x,y) are associated with one another. This process is carried out by the interest level conversion portion 22.

The interest level Si within the image is estimated using the brightness contrast amount RKi.

Figure 9:
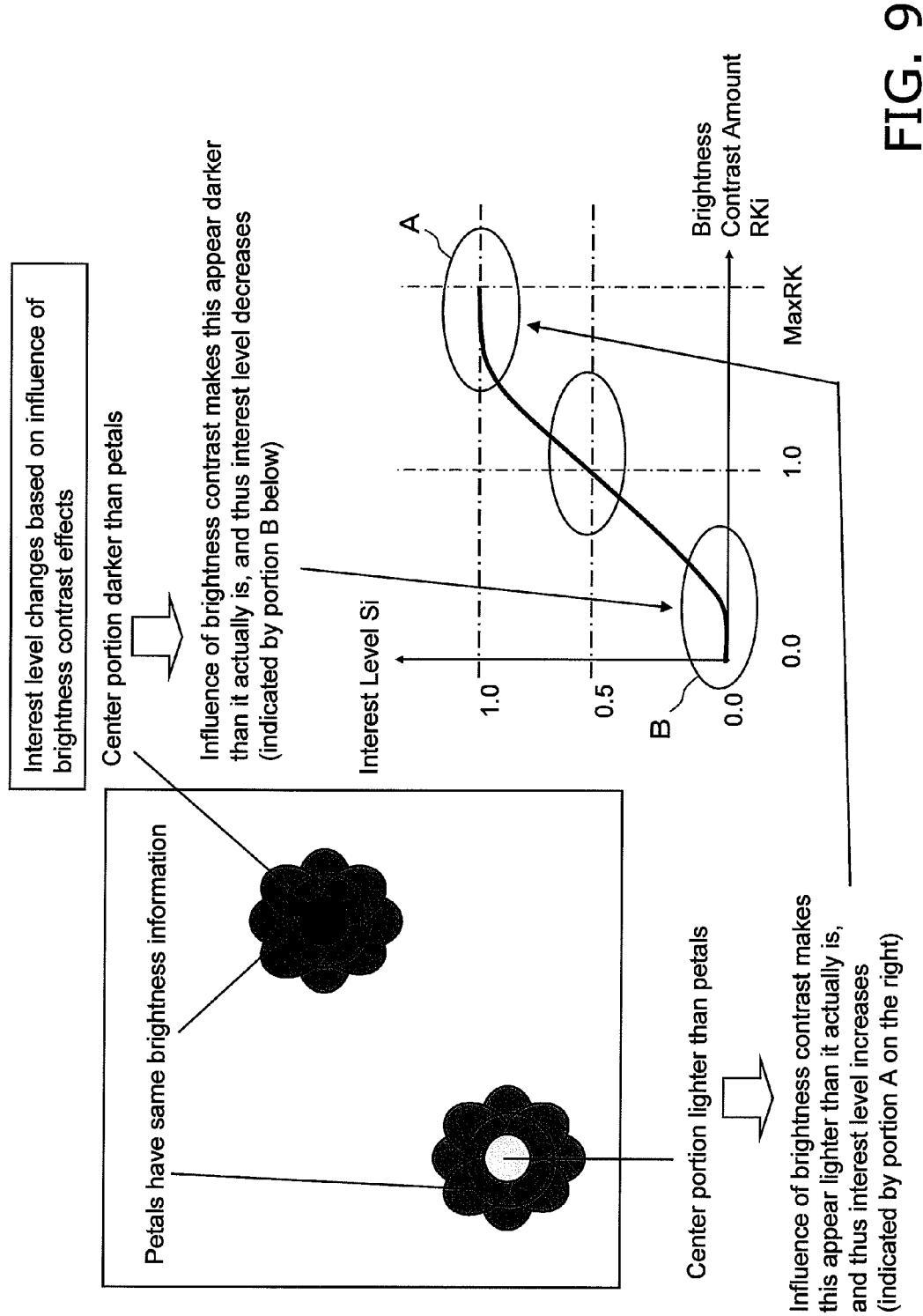
FIG. 9 is a diagram schematically illustrating an example of the relationship between the brightness contrast amount and the interest level.

FIG. 9 schematically illustrates this principle. Two flowers are present in the left side of FIG. 9. The petals of these two flowers all have the same brightness information. In contrast to this, the center of the flower on the left is assumed to have a higher brightness than the surrounding petals, while the center of the flower on the right is assumed to have a lower brightness than the surrounding petals. In this case, comparing the brightness contrast amount RKPc obtained from the pixels Pc in the center of the flower on the left with the brightness contrast amount RKQc obtained from the pixels Qc in the center of the flower on the right results in the inequality RKPc>RKQc. As a result of the effects of this brightness contrast, the center of the flower on the left appears brighter than the actual brightness KPc, while the center of the flower on the right appears darker than the actual brightness KQc, in terms of the visual characteristics. For this reason, the center of the flower on the left has a higher interest level for humans. As opposed to this, the center of the flower on the right has a lower (decreased) interest level for humans.

Based on the abovementioned circumstances, in the present invention, pixels with a high brightness contrast amount RKi for the target pixel i(x,y) are taken as pixels that include a region of high interest, and thus the interest level Si of those pixels is set to a high value. Note that the interest level Si is defined as satisfying $0.0 \leq Si \leq 1.0$, where $Si=1.0$ indicates the highest interest level and $Si=0.0$ indicates the lowest interest level. The right side of FIG. 8 illustrates the relationship between the brightness contrast amount RKi and the interest level Si. Pixels having a brightness contrast amount RKi of 1.0 are considered as having a normal interest level, and the interest level Si is therefore set to "0.5". The brightness contrast amount RKi increases as it progresses toward a predetermined maximum brightness contrast amount MaxRK. In accordance with this, the interest level Si is also monotonically increased toward "1.0", as it is assumed that the chances of the interest level increasing grow greater in accordance with the increase in the brightness contrast amount RKi. Conversely, as the brightness contrast amount RKi decreases toward "0.0", the interest level Si is also monotonically decreased toward "0.0", as it is assumed that the chances of the interest level decreasing grow greater in accordance with the decrease in the brightness contrast amount RKi. The interest level Si is defined for each pixel i in this manner. (Formula 2) indicates an example of this, where skeisu is a predetermined positive constant. The greater the value of skeisu, the greater the rate of change in the interest level Si near the area where RKi=1.0.

(Formula 2)

$$S_i = 1.0/(1.0 + \exp(-skeisu \times (RK_i - 1))) \quad (2)$$

Meanwhile, the vanishing point estimation portion 3 estimates the vanishing point information vVPk within the image. An outline of the processes performed by the vanishing point estimation portion 3 shall be described with reference to FIGS. 6 and 10.

First, the "vanishing point", often used in the expression of perspective in a picture, shall be explained. When lines extending from two parallel lines within a three-dimensional space are projected onto a plane, those lines will necessarily converge at a single point. That point is called a "vanishing point". Accordingly, plural straight lines are first detected within the image, and the points at which those straight lines frequently intersect are taken as the vanishing point information vVPk(x,y)=(VPkx,VPky). While the number of vanishing points NVP may be plural, the following descriptions of the vanishing point estimation process performed by the vanishing point estimation portion 3 shall assume, for the sake of simplicity, that only a single vanishing point is present.

The border calculation portion 30 calculates border information, as preprocessing for extracting the straight lines within the image. Although various known conventional methods can be used as a method for this, here, an edge amount EDGEi(x,y) of the pixel i(x,y) is found using an edge extraction filter (for example, a three-pixel by three-pixel size Sobel filter), the value of which is then compared to a predetermined threshold THEDGE, where the pixel i(x,y) is taken as a characteristic point RPk(x,y) located on a border if the edge amount EDGEi$\geq$THEDGE. (Formula 3) indicates an example of Sobel filter coefficients. vSobelx is a matrix for detecting an edge component in the x direction, whereas vSobely is a matrix for detecting an edge component in the y direction. THEDGE is a predetermined positive constant, and may be determined based on the maximum edge amount in the image.

(Formula 3)

$$vSobelx = \begin{bmatrix} 1 & 0 & -1 \\ 2 & 0 & -2 \\ 1 & 0 & -1 \end{bmatrix}, \quad (3)$$

$$vSobely = \begin{bmatrix} 1 & 2 & 1 \\ 0 & 0 & 0 \\ -1 & -2 & -1 \end{bmatrix}$$

When NRP number of characteristic points RPk(x,y) located on borders have been obtained through this process, it is necessary to carry out the straight line detection on all the characteristic points RPk(x,y). Straight line detection using a Hough transform is well-known as a method used for such a straight line detection process.

Figure 10:
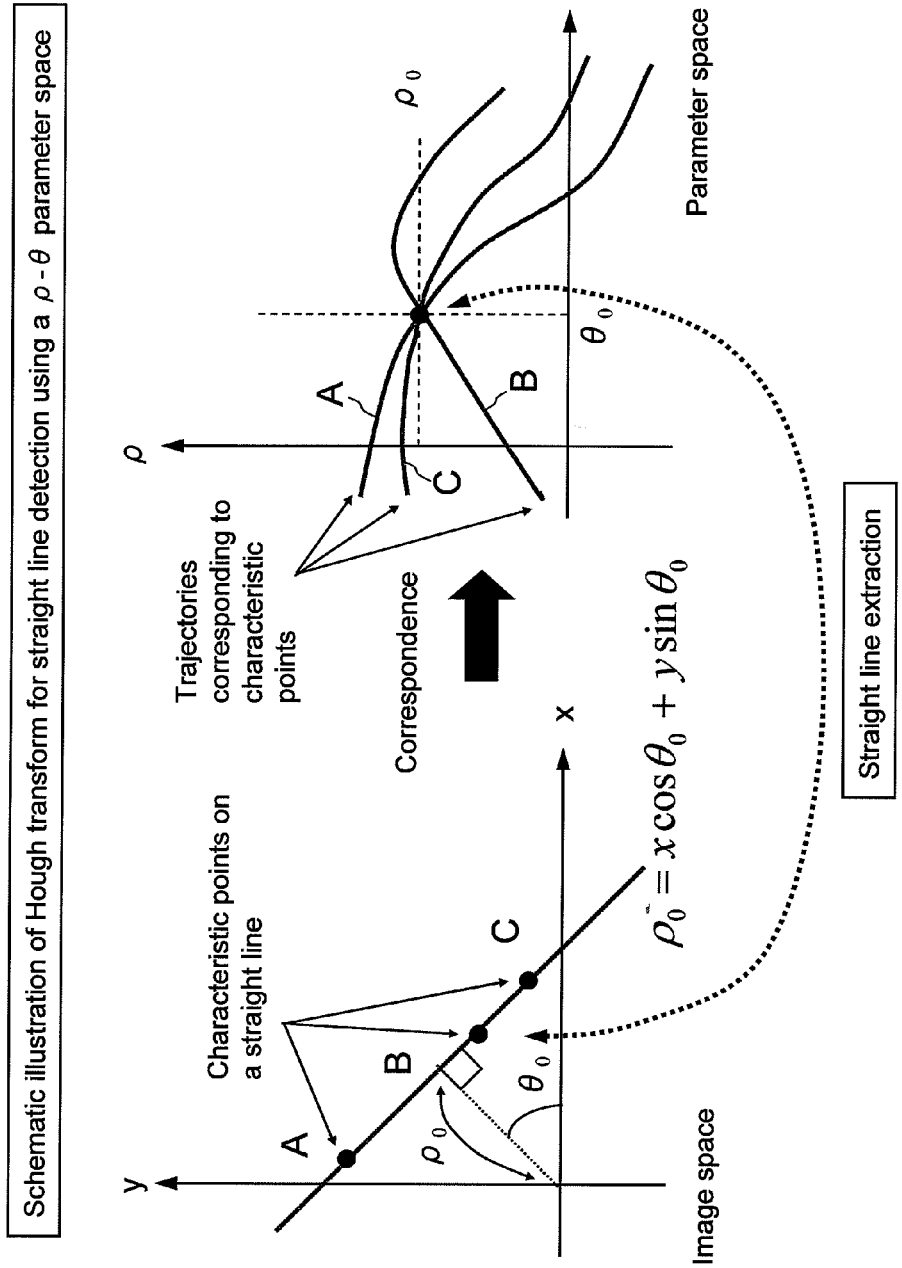
FIG. 10 is a diagram schematically illustrating straight line detection in the vanishing point estimation using a Hough transform.

The straight line detection process using a Hough transform shall be described using FIG. 10. With a Hough transform, a straight line L is first expressed using polar coordinates ($\rho$, $\theta$), as illustrated in the left side of FIG. 10. When perpendicular line is drawn from the origin to the straight line, $\rho$ indicates the length from the origin to the intersection of the perpendicular line and the straight line, whereas $\theta$ indicates the angle formed by the perpendicular line and the x-axis. However, if the perpendicular line is in the region where y<0, then $\rho$<0. The range of $\theta$ is $0 \leq \theta \leq \pi$.

Expression of a straight line L0 that passes through the characteristic points A, B, and C, as illustrated in the left side of FIG. 10, is defined as ($\rho$0,$\theta$0). (Formula 4) expresses the formula of the straight line L0.

(Formula 4)

$$\rho_0 = x \cos \theta_0 + y \sin \theta_0 \quad (4)$$

In general, there is an infinite number of straight line groups that pass through a single characteristic point RPk(x,y) in an (x,y) space, and ($\rho$,$\theta$) is uniquely found for each straight line belonging to the straight line groups; a single curve applies (is determined) for each characteristic point $RPk(x,y)$ in a $\theta-\rho$ parameter space (a Hough space) (see the right side of FIG. 10). Accordingly, the three characteristic points A, B, and C located on the straight line L as expressed by (Formula 4) have three curves in the $\theta-\rho$ parameter space (Hough space), as shown in the right side of FIG. 10, and the intersection $(\rho 0, \theta 0)$ thereof expresses the straight line L (the straight line L in the left side of FIG. 10), within the image space, that passes through the three characteristic points A, B, and C in common. The vanishing point estimation portion 3 uses this principle to perform the straight line detection process.

The following is an outline of the algorithm for the process performed by the vanishing point estimation portion 3.

<Straight Line Detection Using a Hough Transform>

(1) The Hough transform portion 31 discretizes the $(\theta-\rho)$ space, and prepares a two-dimensional space $PP(\theta,\rho)$ for $\theta, \rho$. When the size of the original image (in an x-y space) is defined as w pixels×w pixels, the range that $\rho$ can take on is [−sqrt(2)*w/2, sqrt(2)*w/2] ("sqrt(x)" denotes the square root of x; same hereinafter), and thus the range that $\rho$ can take on is the range [0, sqrt(2)*w], in which the stated range has been shifted by sqrt(2)*w/2. In this case, when the discretization interval for $\theta, \rho$ is $\Delta\theta=1$ degree, $\Delta\rho=1$, the size of the two-dimensional space $PP(\theta,\rho)$ is 180×sqrt(2)*w.

(2) A border information image obtained by the border calculation portion 30 extracting borders from the brightness information Ki is binarized by the border calculation portion 30. The Hough transform portion 31 then scans the binarized border information image, and a Hough transform is executed on pixels i(x,y) having a pixel value of "1" using (Formula 4), thereby calculating $\rho$ at a $\Delta\theta$ interval. The distribution calculation portion 32 integerizes the calculated $\rho$ and adds "1" to the value of $PP(\theta,\rho)$. In other words, a frequency distribution Hist $(\theta,\rho)$ (a two-dimensional histogram) is found for the value of $(\theta,\rho)$.

(3) When all the pixels have been scanned, a maximum value of $PP(\theta,\rho)$ MaxCount is compared with a predetermined threshold ThCount, and in the case where MaxCount is smaller than ThCount, it is assumed that no vanishing point is present; $vVPk(x,y)$ is set to $(-1,-1)$, and the extraction process ends.

(4) When it is not determined that no vanishing point is present in (3), a value of $PP(\theta,\rho)$ that is greater than a predetermined amount (that is, a value of an array element in $PP(\theta,\rho)$) from upper count number values is retrieved (extracted). Each instance of $(\theta,\rho)$ in a Hough space extracted in this manner corresponds to a straight line L in the image space. In addition to the method of extracting a value of $PP(\theta,\rho)$ that is greater than a predetermined amount from upper count number values as described here, a method that executes a process for finding a local maximum value greater than a predetermined count using the histogram $PP(\theta,\rho)$ may also be used to extract the straight lines. For example, if the number of straight lines is taken as NL, the stated process results in points $(\theta s, \rho s)$ in a Hough space, corresponding to straight lines Ls (where s=1, . . . , NL) in the image space, being extracted.

(5) The number of straight lines Ls that pass through a block Bmn within the image space is counted by comparing the straight lines Ls within the image space corresponding to each of the extracted polar coordinates $(\theta s, \rho s)$ (where s=1, . . . , NL) with the vertex coordinates of the subdivided block Bmn of the image (x,y) (the image in a x-y space) (where m=1, . . . , NBx, and n=1, . . . , NBy). The center of a black BMaxmn, in which the number of straight lines Ls is maximum, is taken as the coordinates of the vanishing point vVP(x,y). Here, vVP(x,y) is taken as (VPkx,VPky). In other words, the center of the block in which the number of straight lines Ls that pass through that block is maximum is taken as the vanishing point vVP(x,y). It should be noted that the vanishing point is not always a single point, and it may also be a plurality of points. In such a case, the center of the block in which the number of straight lines Ls that pass through the block is greater than or equal to a predetermined threshold is taken as the vanishing point vVPk(x,y) (where k=0, 1, . . . ).

(6) In the case where the vanishing point vVPk(x,y) extracted in (5) is present in a region within a predetermined number of pixels LimitX from the right and left sides of the image or in a region within a predetermined number of pixels LimitY from the top and bottom sides of the image, the extracted vanishing point is discarded, and vVPk(x,y) is taken as (−1,−1). Here, for example, the value of LimitX may be set to 1/10 the number of pixels in the x direction, and the value of LimitY may be set to 1/10 the number of pixels in the y direction. It goes without saying, of course, that the values of LimitX and LimitY are not intended to be limited to these values.

The depth estimation portion 4 finds the degree of depth fbi of the target pixel i based on the vanishing point information vVPk(x,y) and the interest level Si(x,y) obtained in this manner. This principle is illustrated in FIGS. 11A and B.

Figure 11B:
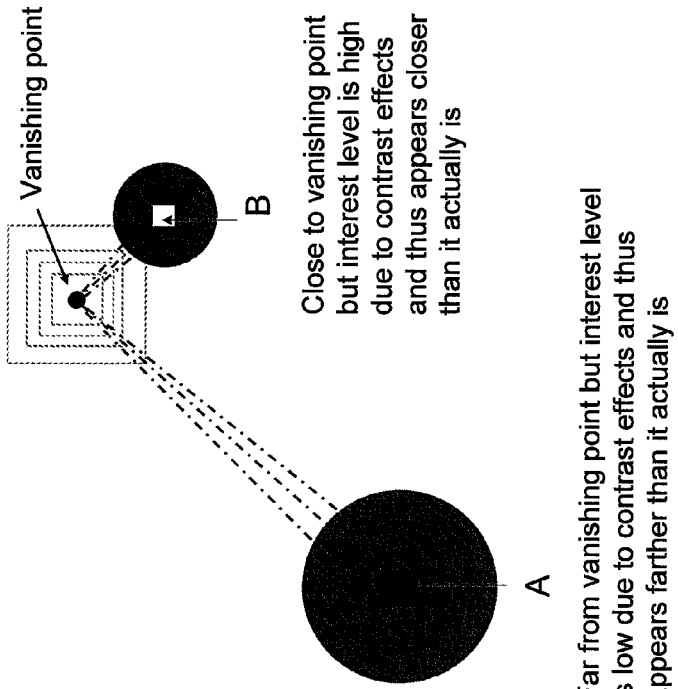
FIGS. 11A and 11B are diagrams schematically illustrating a relationship between the distance from a vanishing point and the degree of depth based on the interest level.
Figure 11A:
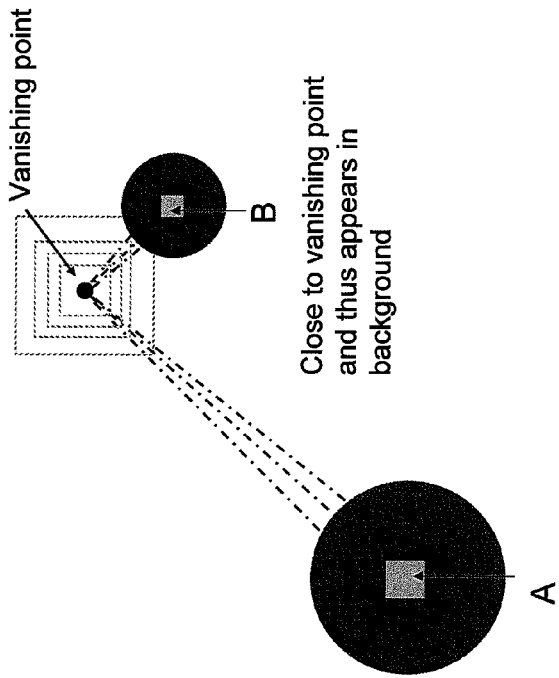

FIG. 11A illustrates a case where the brightness of a central region B in a circle near the vanishing point is the same as the brightness of a central region A in a circle far from the vanishing point. In this case, the size of the circle decreases the closer the circle is to the vanishing point, when the three-dimensional space is projected onto a two-dimensional plane. The dotted-line quadrangles in the vicinity of the vanishing point schematically illustrate regions that impart approximately the same sense of distance with respect to the distance from the vanishing point. In FIG. 11A, the region A is further from the vanishing point, and thus tends to appear to be in the foreground when the three-dimensional space is projected into a two-dimensional plane, whereas the region B is closer to the vanishing point, and thus tends to appear to be in the background when the three-dimensional space is projected into a two-dimensional plane.

Meanwhile, FIG. 11B schematically illustrates a case where the brightness of the region B is higher than brightness of the region A. In this case, the region B is in a location that is comparatively closer to the vanishing point, but due to the effects of brightness contrast, the region B has visual characteristics that draw the interest of humans, and thus the region B tends to appear closer than it actually is. Meanwhile, while the region A is originally farther in distance from the vanishing point and thus appears closer, more interest is drawn by the region B, and thus the region A tends to appear slightly further away than it actually is.

The present invention uses this principle in estimating the degree of depth fbi. Here, the degree of depth fbi is defined as follows: a greater value for the degree of depth fbi indicates that a pixel i corresponding to the degree of depth fbi is present in a foreground region, whereas a lesser value for the degree of depth fbi indicates that a pixel i corresponding to the degree of depth fbi is present in a background region.

FIG. 12A is a diagram that schematically illustrates the above relationship. FIG. 12A is a graph in which the interest level Si is assigned to the horizontal axis, the distance from the vanishing point Leni is assigned to the vertical axis, and the visual appearance (i.e. do the pixels appear to be in the foreground region or in the background region) of the pixels present in each coordinate region (in FIG. 12A, the graphs is divided into four coordinate regions) is schematically illustrated. Note that here, the interest level Si represents the interest level of a pixel i, and the maximum value thereof is taken as MaxS. The value of MaxS can normally be set to "1.0". Leni indicates the distance from the vanishing point vVPk(x,y), or (VPkx,VPky), to the pixel i, and is assumed to be normalized as 0≦Leni≦1.0.

The depth estimation portion 4 finds a maximum value Max_fbi and a minimum value Min_fbi of the degree of depth fbi based on the distance Leni of the pixel i from the vanishing point, using, for example, the graph illustrated in FIG. 12C. Then, the degree of depth fbi is found, using, for example, the graph illustrated in FIG. 12B, based on the interest level Si of the pixel i(x,y), and Max_fbi (Max_fbi is a value that changes based on the value of Leni, and is therefore sometimes written as Max_fbi(Leni), which also applies hereinafter) and Min_fbi (Min_fbi is a value that changes based on the value of Leni, and is therefore sometimes written as Min_fbi(Leni), which also applies hereinafter) as found through the graph in FIG. 12C.

Note that when there are plural vanishing points, a degree of depth fbki is found for each vanishing point using the functions of FIGS. 12B and 12C, and the degree of depth fbi is ultimately found from the sum thereof. Alternatively, the degree of depth may be found by converting the degree of depth fbki for each vanishing point vVPk using a predetermined conversion function and using the converted values.

As indicated in FIG. 12A, when the interest level Si of the pixel i is low and the distance Leni between the pixel i and the target vanishing point vVPk is small, it can be assumed that the possibility of the pixel i being present in a foreground region is quite low, and thus the degree of depth fbi is set to a low value. Conversely, when the interest level Si of the pixel i is high and the distance Leni between the pixel i and the target vanishing point vVPk is great, it can be assumed that the likelihood of the pixel i being present in a foreground region is quite high, and thus the degree of depth fbi is set to a high value. As opposed to this, when the distance Leni between the pixel i and the target vanishing point vVPk is small but the interest level Si of the pixel i is high, the closeness (that is, the degree to which the target pixel i visually appears to humans to be in the foreground) increases in accordance with the increase in the interest level Si, as illustrated in FIG. 11; the degree of depth fbi also increases proportionally therewith. However, when the distance Leni between the pixel i and the target vanishing point vVPk is great but the interest level Si of the pixel i is low, the closeness decreases in accordance with the decrease in the interest level Si, as illustrated in FIG. 11; similarly, the degree of depth fbi also decreases.

An example of this phenomenon expressed as a function is shown in FIG. 12A. FIG. 12B illustrates a state of change in the degree of depth fbi based on the interest level Si in a particular Leni. Furthermore, FIG. 12C illustrates the transition of the maximum value Max_fbi(Leni) and minimum value Min_fbi(Leni) that the degree of depth fbi of FIG. 12B can take on relative to the distance Leni from the target vanishing point. In other words, with respect to the degree of depth fbi, control based on the interest level Si is placed at the forefront, and the control function used at that time is controlled by the distance Leni from the vanishing point (in other words, the range that the degree of depth fbi can take on is determined by the value of Leni). Estimating the degree of depth fbi in this manner depends on taking into consideration the great effect that the interest and focus of humans has on the sense of distance, as described using FIGS. 11A and 11B. Then, as shown in FIG. 12C, the Max_fbi and Min_fbi are determined using a function that monotonically and linearly increases the values of the maximum value Max_fbi and the minimum value Min_fbi of the degree of depth fbi shown in FIG. 12B to a high value, such that the greater the distance Leni from the vanishing point is, the greater the closeness (i.e. the greater the value of the degree of depth fbi) becomes. Note that the relationship between Leni and Max_fbi, Min_fbi is not intended to be limited to the properties shown in FIG. 12C. For example, the properties thereof may be determined by a non-linear function similar to the properties shown in FIG. 12C.

As an example, FIG. 13A illustrates the relationship between the interest level Si and the degree of depth fbi in the case where the distance Leni from the vanishing point is great (i.e. the case where Leni=1.0), and FIG. 13B illustrates the relationship between the interest level Si and the degree of depth fbi in the case where the distance Leni from the vanishing point is low (i.e. the case where Leni=0.1).

Furthermore, (Formula 5) illustrates a formula corresponding to the properties indicated by FIG. 12B, whereas (Formula 6) and (Formula 7) illustrate formulas corresponding to Max_fbi and Min_fbi in FIG. 12C.

(Formula 5)

$$fb_i = (Max\_fb_i - Min\_fb_i)/(1.0 + \exp(-fkeisu \times (S_i - 0.5))) + Min\_fb_i \quad (5)$$

(Formula 6)

$$Max\_fb_i = Maxoff + Maxkeisu \times Len_i \quad (6)$$

(Formula 7)

$$Min\_fb_i = Minkeisu \times Len_i \quad (7)$$

fkeisu is a predetermined positive constant, and is a coefficient that controls the degree of slope when Si=0.5 (a normal interest level). Furthermore, Maxoff and Maxkeisu are predetermined positive constants, and 0.0<Maxoff≦1.0, whereas 0.0<Maxkeisu≦1.0.

Minkeisu is also a predetermined positive constant, and 0.0<Minkeisu≦1.0.

In addition to the above, a function can be applied as a function for determining the degree of depth fbi as long as it is a function that is controlled by the two variables interest level Si and the distance Leni from the vanishing point vVPk (x,y), or (VPkx,VPky), and is a function that is smooth and continuous.

The depth estimation portion 4 determines the correction gain Gi of the pixel i based on the degree of depth fbi obtained in this manner. Here, Gi may be defined as Gi=fbi, or the correction gain Gi of the pixel i may be defined as shown in (Formula 8).

(Formula 8)

$$Gi = TS \times fbi \quad (8)$$

TS is a predetermined positive constant, and is a value defined as 0.0≦TS≦1.0. This corresponds to strength parameters set by an external memory, a ROM or RAM memory, or the like.

The correction gain Gi calculated by the depth estimation portion 4 is outputted to the depth correction portion 5.

The depth correction portion 5 executes a predetermined depth correction image process on the pixel i(x,y).

The following can be given as examples of the process the depth correction portion 5 executes on the pixel i(x,y).

(1) gradation correction (tone level correction) processing using a γ curve (gamma characteristics);
(2) gradation correction processing taking into consideration the effects of brightness contrast;
(3) a simple saturation/hue correction process;
(4) a saturation/hue correction process taking into consideration the effects of color contrast;
(5) an edge enhancement process;
(6) a smoothing process;
(7) a shadow addition/light addition process;
(8) a memory color correction process; and
(9) a D-range (dynamic range) expansion process.

(Formula 9) shows an example of a color correction amount dCi and corrected color information Ci_new resulting from the depth correction portion 5 performing correction on target color information Ci of the pixel i.

(Formula 9)

$$dCi = Ci \times Gi$$

$$Ci\_new = Ci + dCi \quad (9)$$

The image signal vIi (pixel i(x,y) corrected by the depth correction portion 5 is outputted to the output portion 6.

Finally, the output portion 6 may output the corrected color information values for each pixel i obtained from the depth correction portion 5 and other color information values as-is. Alternatively, the output portion 6 may convert the corrected color information values for each pixel i obtained from the depth correction portion 5 and other color information values into a predetermined image format that can be handled by a device to be used (for example, the JPEG format, the BMP format, the MPEG format, a video format compliant with the NTSC system, and so on), and output the processed image data obtained through the conversion.

As described thus far, the image processing device 1000 can obtain an image signal that achieves a feeling of depth that appears more natural to the human eye by controlling the value of correction gain for pixel values in accordance with depth information (that is, whether the pixel is present in a foreground region or in a background region) and correcting the pixel values using that correction gain. In other words, the image processing device 1000 can easily impart a feeling of depth/sense of distance in an image (an image signal) using three-dimensional perception properties that exploit the monocular information of humans.

Furthermore, according to the first embodiment, a degree of depth is determined by finding the interest level within an image based on the brightness contrast amount and controlling range that interest level can take on based on the distance from the vanishing point; the pixel values (brightness, color, sharpness, smoothing) within the image are corrected based on that degree of depth. Accordingly, depth control can be carried out based not only on the simple distance but also on the interest level and focus level of humans, and thus it is possible to achieve a feeling of depth in a processed image that more closely imitates human sight.

Furthermore, although effective depth control is difficult to carry out using only the distance from the vanishing point, such as in cases where there is no vanishing point within the image, a vanishing point cannot be properly extracted, or there are many candidates for vanishing points, the image processing device 1000 and image processing method used therein according to the first embodiment of the present invention can be applied to such cases as well.

It should be noted that although the above descriptions discuss the case where a single piece of color information, the saturation, is corrected, two pieces of color information, such as the saturation and hue, can also be corrected in combination. In such a case, the value of the correction gain can be individually set for each piece of color information based on the depth information (that is, depth information based on the saturation and depth information based on the hue). The processing may also be carried out using the same correction gain value for the depth information based on saturation and the depth information based on hue. Other processes may also be executed in the same manner as described here.

Furthermore, although the correction gain Gi is set through (Formula 8) to take on a positive value, it is conceivable to suppress the color information more than the actual value Ci in background regions (for example, when the color information Ci indicates saturation, a correction process is executed so that the saturation value of the pixel i to be processed is set to a value lower than the actual saturation value). In such a case, (Formula 8) can also be expressed as follows.

(Formula 10)

$$Gi = TS \times \eta \times (fbi - fb\_off) \quad (10)$$

fb_off represents an offset amount, where $0.0 < fb\_off < 1.0$. η is a strength coefficient taken with TS, and $\eta > 0.0$. In the case where $\eta > 1.0$, the degree to which the correction fluctuates grows. Because there is the possibility that a drop in image quality will occur in the background region of a processed image when $\eta > 1.0$, it is preferable to reduce the drop in the color information Ci as much as possible in the background region.

Furthermore, when executing a color correction process on the color information Ci that is to be corrected, post-correction color information Ci_new may be obtained by altering the color information Ci using a predetermined fluctuation amount DefCi, as illustrated by (Formula 11).

(Formula 11)

$$Ci\_new = Ci + DefCi \times (Gi - 0.5) \times \beta \quad (11)$$

Here, Ci_new is the post-correction value of the color information that is to be corrected. β is a predetermined positive constant.

Color correction processing based on color contrast can also be carried out. In such a case, the color correction process can be carried out through, for example, (Formula 12) and (Formula 13).

(Formula 12)

$$Ci\_new = Ci + Gi \times Ci \times \beta \times GF(RCi - 1.0)) \quad (12)$$

(Formula 13)

$$GF(x) = \begin{cases} G\max & x > TH0 \\ \mu \times x & |x| < TH0 \\ -G\max & x < -TH0 \end{cases} \quad (13)$$

TH0, GMax, and β are predetermined positive constant, whereas μ is a predetermined positive constant that satisfies $0 < \mu < 1$. RCi is a color contrast amount of the pixel i. (Formula 12) illustrates an example of suppressing a saturation phenomenon arising in a processed image due to the occurrence of sudden changes in the color information Ci that is to be processed, the suppression being achieved by adding a term "correction target Ci" to the amount of correction to be carried out based on the color contrast (multiplying the second term in (Formula 12) by Ci). In other words, with the correction process carried out using (Formula 12), the correction process is executed in accordance with the size of the pre-correction color information Ci; therefore, when, for example, the value of the color information Ci is low, a sudden change in the post-correction color information Ci_new due to changes in the color contrast amount RCi can be suppressed. It is thus possible to achieve an even more natural correction process.

It goes without saying that the above-mentioned color correction process used in the image processing device 1000 and the image processing method according to the present embodiment to improve the feeling of depth in a processed image is merely a single example, and that many other methods can be used.

Furthermore, the image processing device 1000 may carry out a color correction process having calculated a color correction amount dCi for the color information Ci using (Formula 14) and (Formula 15). With (Formula 14) and (Formula 15), the correction gain Gi found based on the depth information fbi is amended using a value obtained by applying the color contrast amount (Ci/ACi) as a variable to a GF function, and the color correction amount dCi based on the color contrast is found. Note that in (Formula 14) and (Formula 15), ACi is representative color information that represents the region surrounding the target pixel i.

(Formula 14)

$$dCi = Gi \times \alpha \times GF(Ci/ACi - 1.0)) \quad (14)$$

(Formula 15)

$$dCi = Gi \times Ci \times \alpha \times GF(Ci/ACi - 1.0)) \quad (15)$$

Second Embodiment

An image processing method and an image processing device, which estimate a degree of depth based on an interest level and the distance from a vanishing point and carry out pixel value correction, shall be described as a second embodiment of the present invention, with reference to FIGS. 14 through 21.

<2.1: Configuration of the Image Processing Device>

Figure 14:
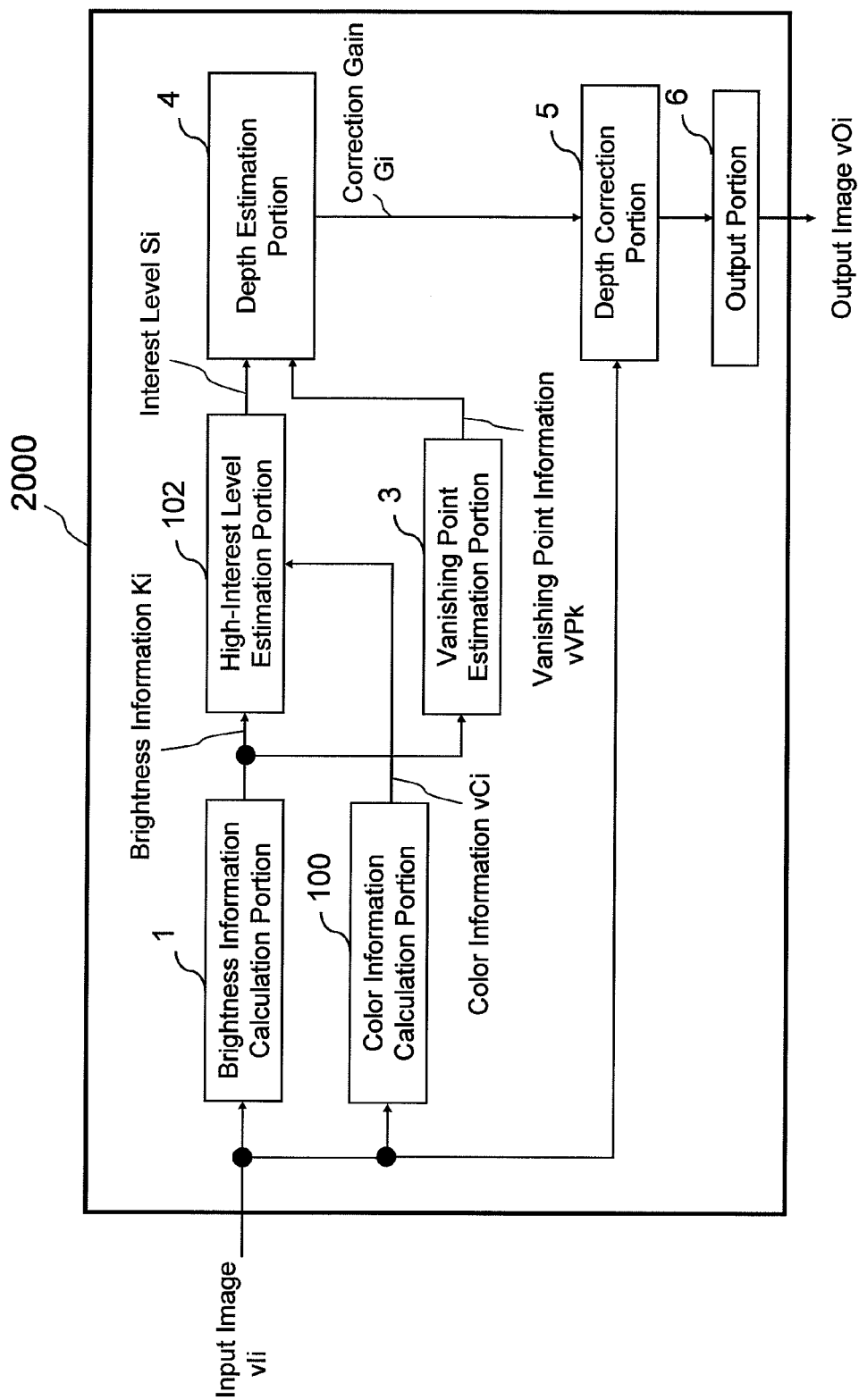
FIG. 14 is a block diagram illustrating the configuration of an image processing device according to a second embodiment of the present invention.

FIG. 14 is a block diagram illustrating the configuration of an image processing device 2000 according to the second embodiment of the present invention. As shown in FIG. 14, the image processing device 2000 according to the second embodiment differs from the image processing device 1000 according to the first embodiment in that a color information calculation portion 100 has been added and the interest level estimation portion 2 has been replaced with a high-interest level estimation portion 102.

It should be noted that with the image processing device 2000 according to the present embodiment, portions that are the same as those of the previous embodiment shall be assigned the same reference numerals, and descriptions thereof shall be omitted.

Figure 15:
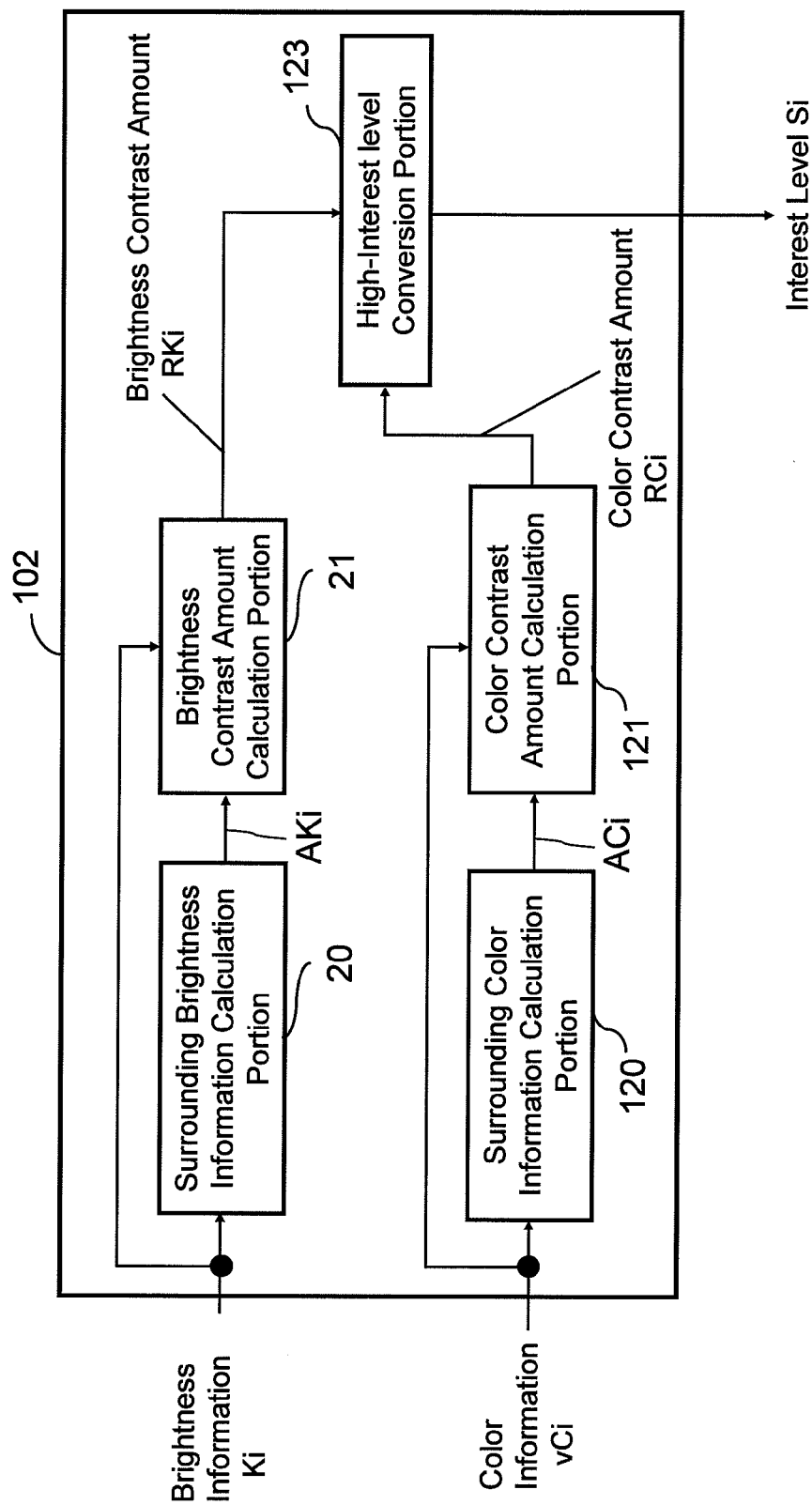
FIG. 15 is a block diagram illustrating the configuration of a high-interest level estimation portion within the image processing device according to the second embodiment of the present invention.

FIG. 15 illustrates the configuration of the high-interest level estimation portion 102. The high-interest level estimation portion 102 differs from the interest level estimation portion 2 of the first embodiment in that it uses the color contrast amount RCi of the pixel i(x,y) in addition to the brightness contrast amount RKi when estimating the interest level Si.

The color information calculation portion 100 calculates the color information Ci based on the input image signal vIi, and outputs the calculated color information Ci to the high-interest level estimation portion 102.

The high-interest level estimation portion 102 takes, as its input, the brightness information Ki outputted from the brightness information calculation portion 1 and the color information Ci outputted from the color information calculation portion 100, calculates (estimates) the interest level Si based on the brightness information Ki and the color information Ci, and outputs the calculated interest level Si to the depth estimation portion 4.

The high-interest level estimation portion 102 includes, as illustrated in FIG. 15, a surrounding brightness information calculation portion 20, a brightness contrast amount calculation portion 21, a surrounding color information calculation portion 120, a color contrast amount calculation portion 121, and a high-interest level conversion portion 123.

The surrounding brightness information calculation portion 20 and the brightness contrast amount calculation portion 21 are the same as those described in the first embodiment, and thus further descriptions thereof shall be omitted.

The surrounding color information calculation portion 120 takes color information vCi as its input, calculates surrounding color information ACi, and outputs the calculated surrounding color information ACi to the color contrast amount calculation portion 121.

The color contrast amount calculation portion 121 takes, as its input, the surrounding color information ACi outputted from the surrounding color information calculation portion 120 and the color information vCi outputted from the color information calculation portion 100, calculates the color contrast amount RCi based on the surrounding color information ACi and the color information vCi, and outputs the calculated color contrast amount RCi to the high-interest level conversion portion 123.

The high-interest level conversion portion 123 takes, as its input, the brightness contrast amount RKi outputted from the brightness contrast amount calculation portion 21 and the color contrast amount RCi outputted from the color contrast amount calculation portion 121, calculates the interest level Si based on the brightness contrast amount RKi and the color contrast amount RCi, and outputs the calculated interest level Si to the depth estimation portion 4.

<2.2: Operation of the Image Processing Device>

Next, the operation of the image processing device 2000 shall be described.

Figure 16:
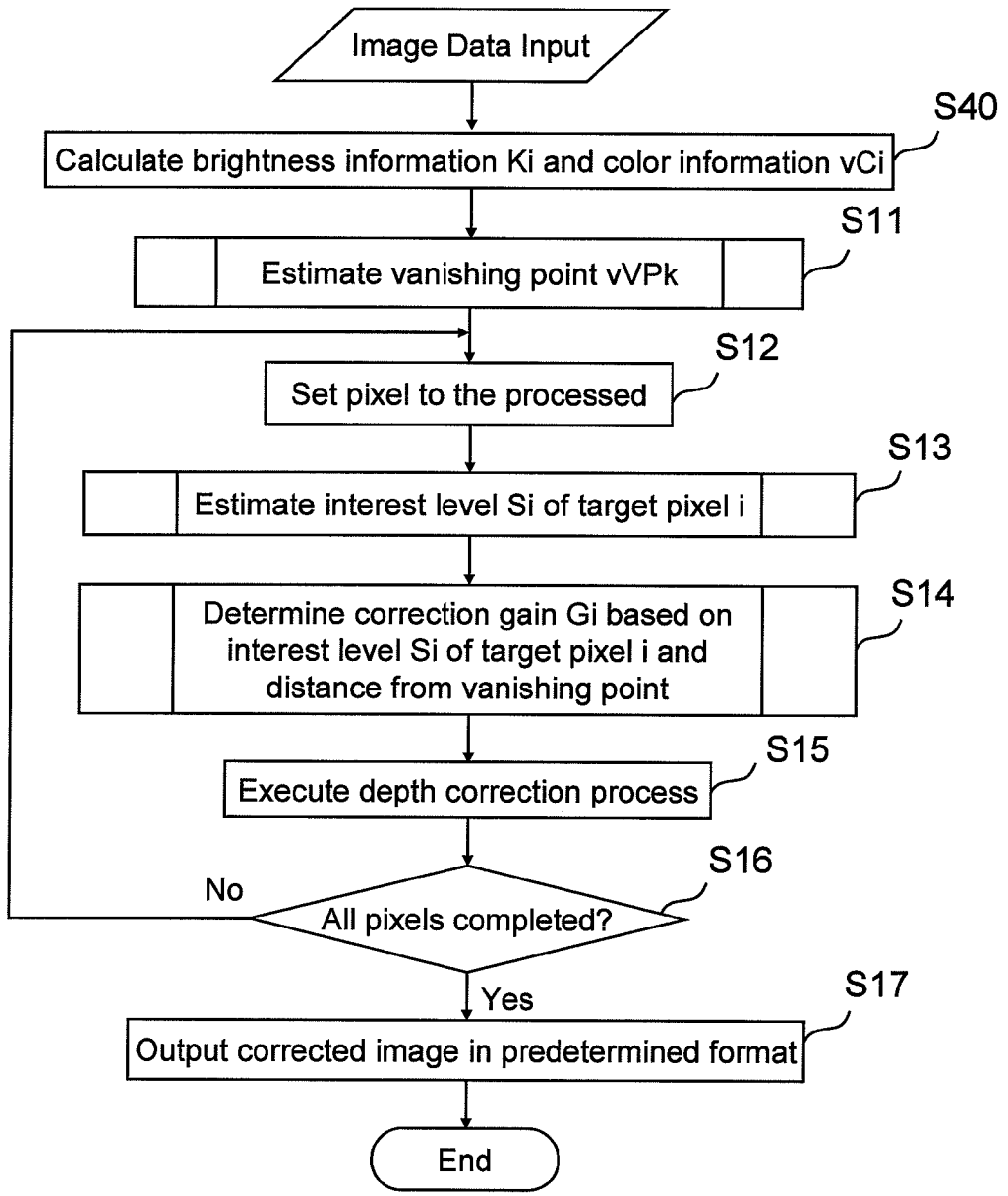
FIG. 16 is a flowchart illustrating the entirety of an image processing method according to the second embodiment of the present invention.
Figure 17:
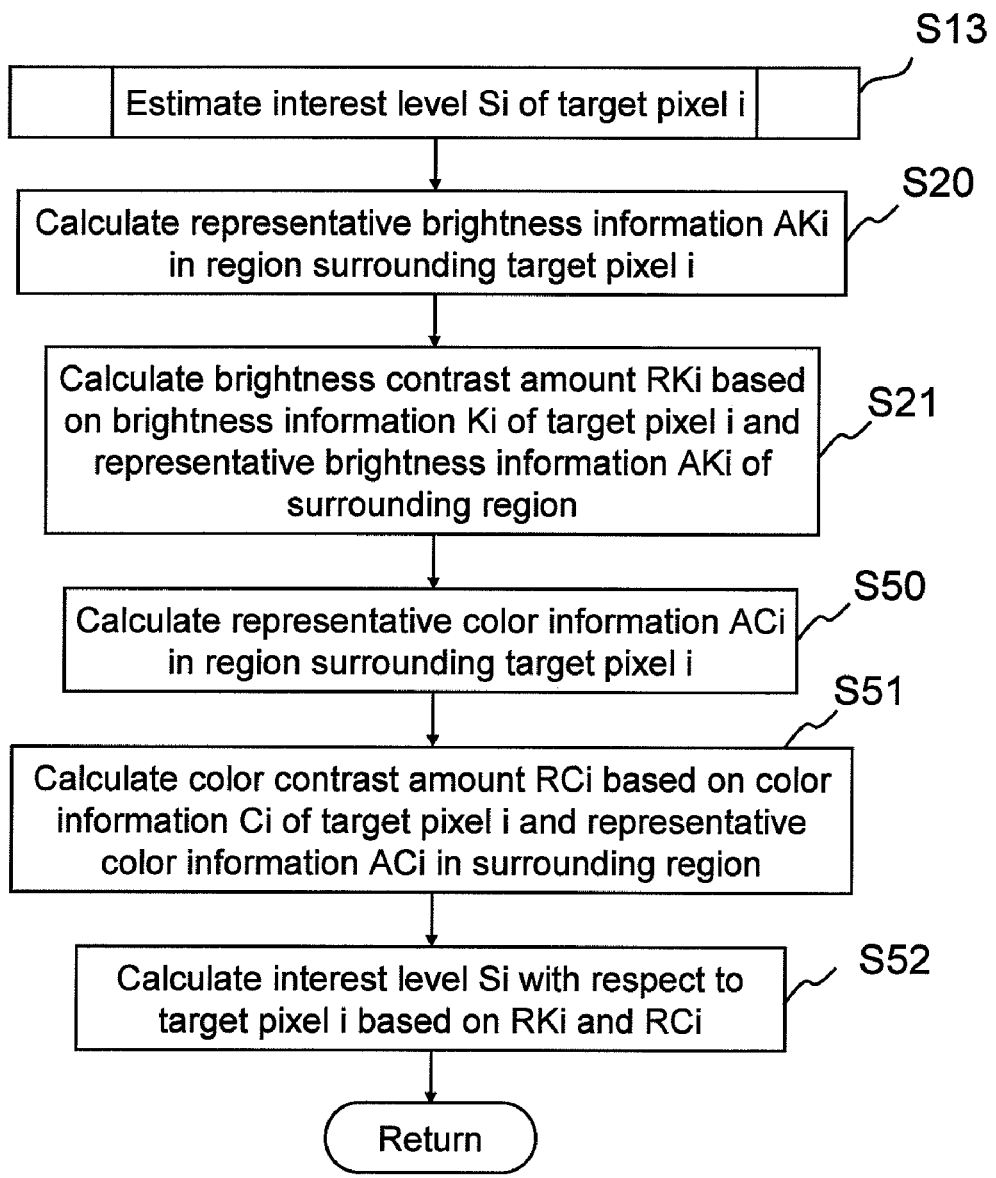
FIG. 17 is a flowchart illustrating a high-interest level estimation process within the image processing method according to the second embodiment of the present invention.

FIG. 16 is a flowchart illustrating processes performed in the image processing method according to the second embodiment (that is, the image processing method executed by the image processing device 2000), and FIG. 17 is a flowchart illustrating a high-interest level estimation process.

The processes performed by the image processing device 2000 shall be described next using FIGS. 14 through 17.

Image data (an image signal) vIi(x,y) is inputted into the image processing device 2000, and in addition to the calculation of predetermined brightness information Ki in the pixel i, the color information vCi of the pixel i is also calculated by the color information calculation portion 100. Here, the inputted image data (input image signal) is converted into HSV color space data, which is made up of a hue component H, a saturation component S, and a value component V, YCbCr color space data, which is made up of a luminance component Y and chroma components Cb and Cr, or La*b* uniform color space data, which is made up of a lightness dimension L and color dimensions a* and b*, all of which are easy to handle as color information. In the case where the inputted image data (input image signal) is RGB-format data (a signal), the input image signal can be handled as-is (that is, directly handled as an R component signal, a G component signal, and a B component signal in the RGB color space).

Next, the high-interest level estimation portion 102 calculates the brightness contrast amount RKi and the color contrast amount RCi, and the interest level Si of the pixel i is estimated based on the calculated values. It should be noted the brightness contrast amount RKi is the same as in the first embodiment and thus shall not be described.

Figure 18:
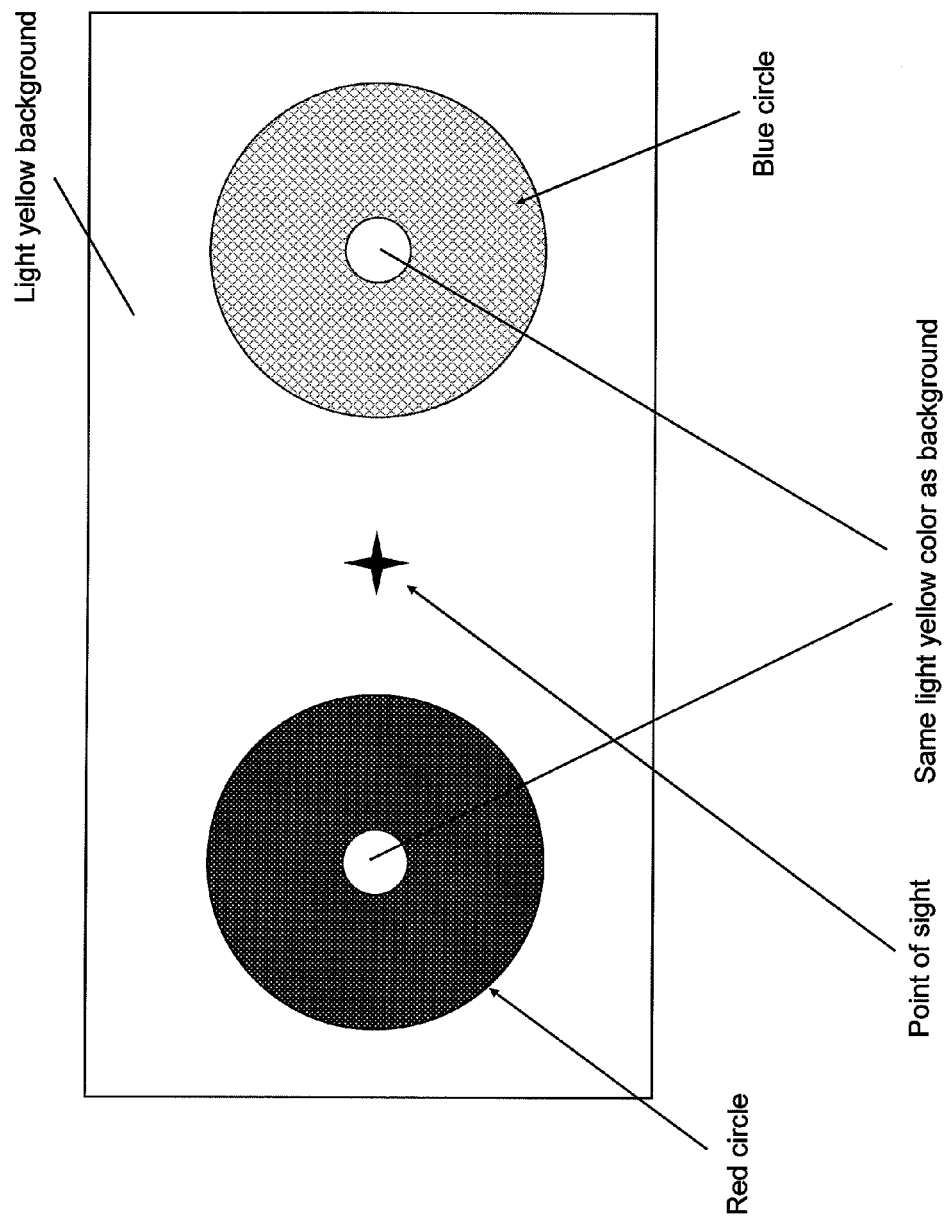
FIG. 18 is a diagram illustrating an outline of color contrast used in the high-interest level estimation in the image processing method according to the second embodiment of the present invention.
Figure 19:
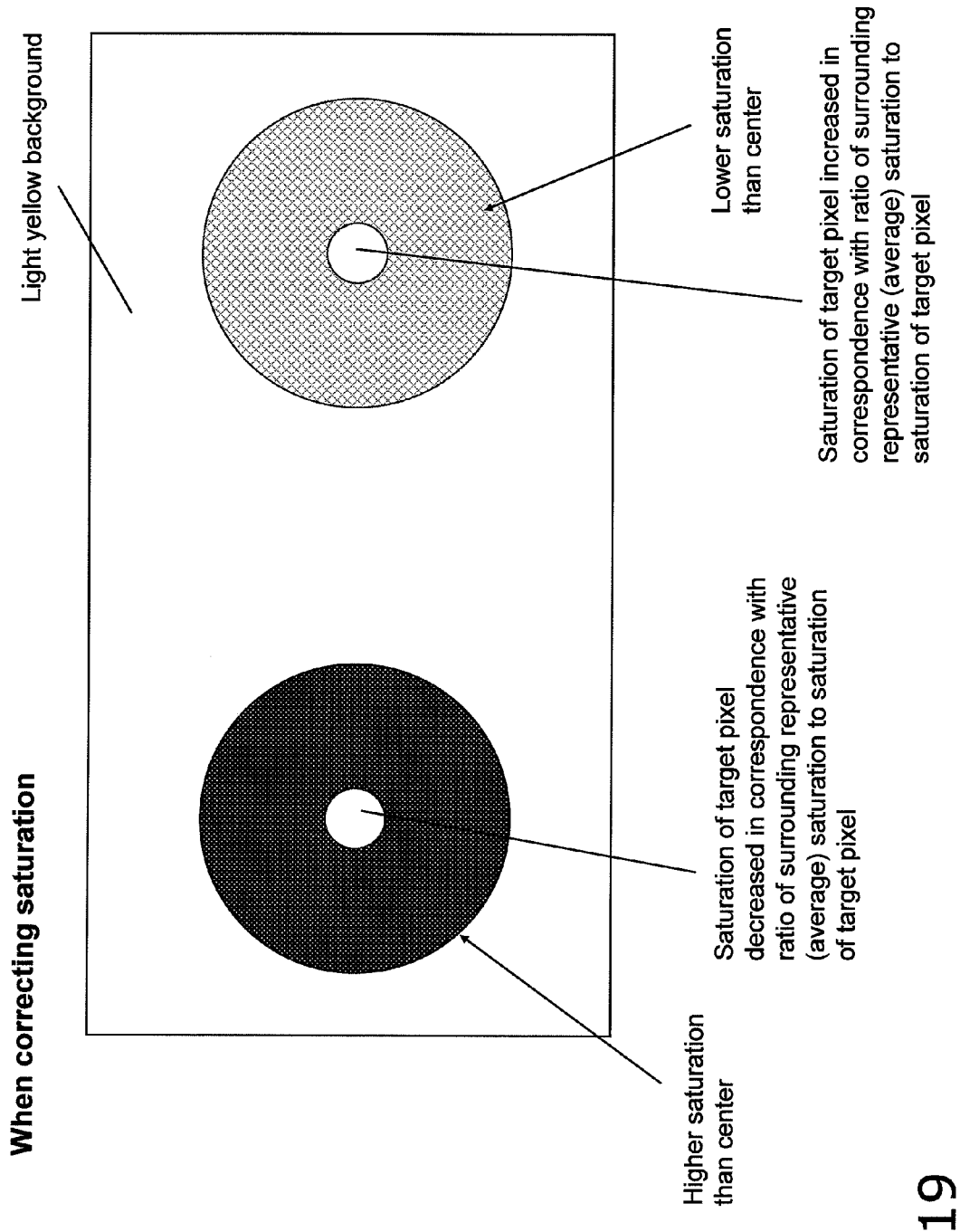
FIG. 19 is a diagram illustrating an exemplary case where saturation correction, which is an example of color contrast, is used.
Figure 20:
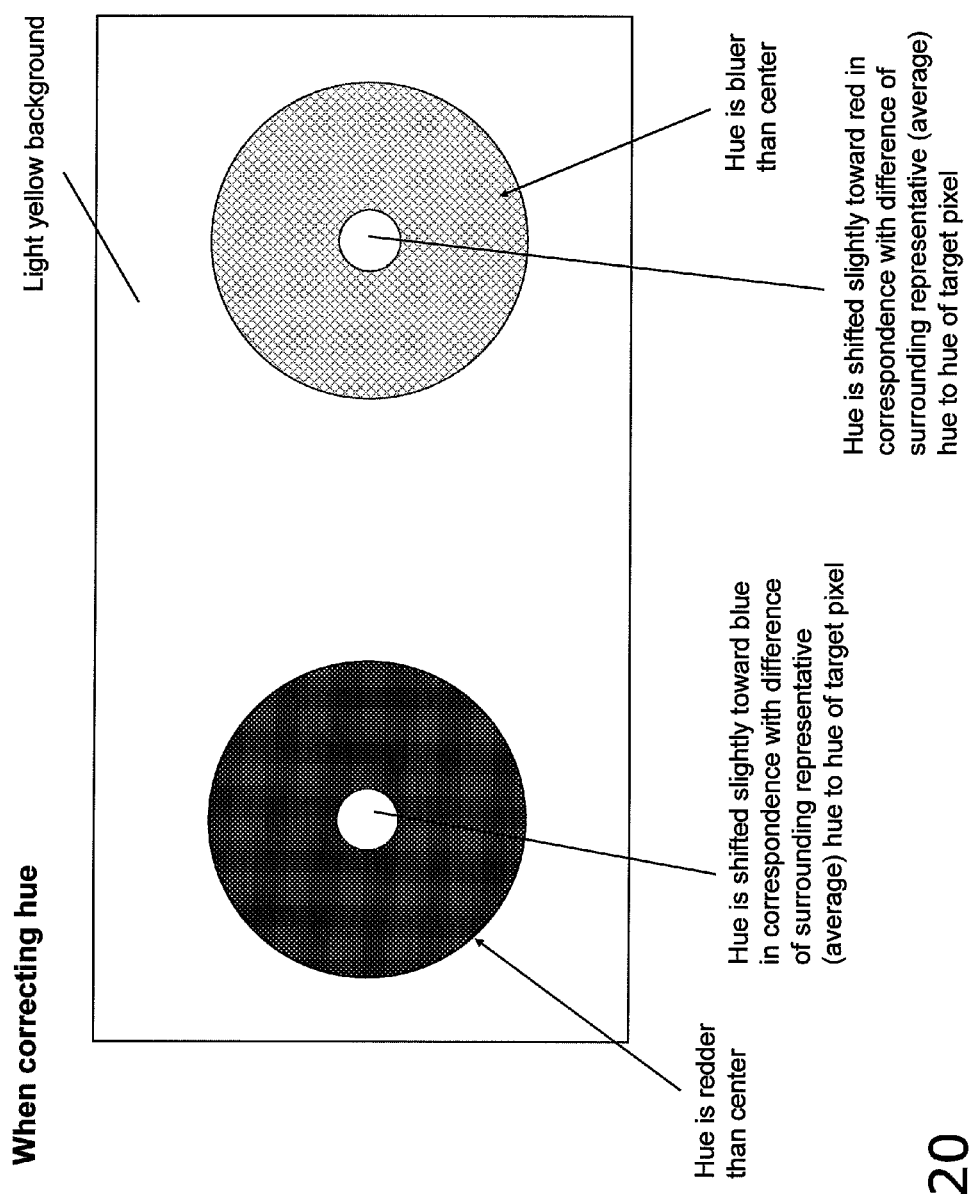
FIG. 20 is a diagram illustrating an exemplary case where hue correction, which is an example of color contrast, is used.

An outline of the color contrast amount shall be described using FIGS. 18 to 20.

In FIG. 18, two circles, red and blue, each with an open center, are drawn on a light yellow background. The central regions of these two circles have the same light yellow color as the background. When a person views these circles by focusing on the point of sight shown by the star mark in FIG. 18, that person tends to perceive the center of the red circle as slightly blue, and tends to perceive the center of the blue circle as slightly red. This phenomenon has been elucidated from the psychology of vision, and occurs due to the property known as color contrast. The color contrast characteristic refers to the effect on the saturation, hue, or the like of a target object when the area around the target object is surrounded by a different saturation, hue, or the like. The characteristics shown in (1) and (2) are evident.

(1) In the case where a target object is surrounded by a hue that is different from its own hue, it is perceived that a color complementary to the hue of the surroundings has been added to the hue of the target object (see, for example, FIG. 20).

(2) In the case where the saturation surrounding a target object is higher than the saturation of the target object, the target object is felt to have a lower saturation than it actually has. Conversely, in a case where the saturation surrounding a target object is lower than the saturation of the target object, the target object is felt to have a higher saturation than it actually has (see, for example, FIG. 19).

In the present embodiment, estimating the interest level, which imparts a sense that more closely resembles human sight (that is, an image (video) that when viewed feels natural based on human visual characteristics), is performed using the color contrast characteristic in combination with the brightness contrast characteristic used in the first embodiment.

Note that many methods can be used to find a color contrast amount vRCi, which expresses the degree of the color contrast, and defining a vector that has a plurality of components is also possible (for example, the vector data vRCi can be defined as data made up of two pieces of color information, saturation Vi and hue Hi).

For example, in the case where the saturation Vi has been selected as the color information Ci, a saturation contrast amount RVi for the saturation Vi can be defined, as indicated by (Formula 16), as, for example, the ratio of a weighted mean saturation AVi within an image region Ωi having a predetermined size that corresponds to the visual region of a human, to the saturation Vi of the target pixel i.

(Formula 16)

$$RV_i = V_i / AV_i \quad (16)$$

The saturation contrast amount RVi can also be defined, as indicated by (Formula 17), as the difference between the weighted mean saturation AVi within a corresponding image region Ωi having a predetermined size, and the saturation Vi of the target pixel i.

(Formula 17)

$$RV_i = V_i - AV_i \quad (17)$$

Furthermore, the saturation contrast amount RVi can be defined as the difference between, ratio of, and so on of the values of Vi and AVi after Vi and AVi have been converted using a function of the visual characteristics of the human eye (a function based on a logarithm or the like).

There are various ways to find a representative saturation AVi that expresses the surrounding characteristic (that is, the region surrounding the target pixel i). For example, using the pixels within the visual region (a pixel region that has a predetermined size that corresponds to the visual region of humans) as the target, it is also possible to find a histogram for the saturation of pixels in that region (a saturation histogram), and then take the most frequently appearing saturation value, the representative saturation that is obtained by clustering based on the statistical distribution within the visual area for that histogram, as the representative saturation AVi.

Similarly, the contrast amount of the hue Hi (the hue contrast ratio) RHi can be defined as the ratio of, the difference between, and so on of a weighted mean hue AHi within an image region Ωi having a predetermined size that corresponds to the visual region of a human, and the hue Hi of the target pixel i. In this case as well, using the pixels within the visual region as the target, it is possible to find a histogram for the hue of pixels in that region (a hue histogram), and then take the most frequently appearing hue value, or the representative hue that is obtained by clustering based on the statistical distribution within the visual area for that histogram, as the representative hue AHi.

In the present embodiment, the color contrast amount RCi is defined based on the ratio of the color information Ci of the target pixel i, to the weighted mean color information ACi within a surrounding region (visual region) set to a size of approximately ⅙ to ⅓ that of the image surrounding the target pixel i (the entire image region), as indicated by (Formula 16).

It should be noted that although the color contrast amount vRCi can be defined as a vector having a plurality of components, for the sake of simplicity, the following descriptions shall focus on the color contrast amount RCi of a single piece of color information Ci. When plural color contrast amounts vRCi are taken as (RC1i, RC2i, . . . , RCNi), the same process as described below can be carried out by finding the product of these components tRCi, a predetermined conversion function output, or the like, and re-setting the resultant as RCi, as is indicated by (Formula 18).

(Formula 18)

$$tRC_i = \prod_{k=1}^{N} RCk_i \quad (18)$$

First, the surrounding color information calculation portion 120 calculates the representative color information ACi surrounding the target pixel i. In this case, the surrounding color information calculation portion 120 uses, as the surrounding region, the pixel region of a size approximately ⅙ to ⅓ that of the entire image region and finds the weighted mean color information ACi within that region.

The color contrast amount calculation portion 121 finds the color contrast amount RCi of the pixel i.

Here, the following holds true.

$$RC_i = C_i/AC_i$$

Such being the case, the ratio (Ci/ACi) to the representative color information ACi of the color information Ci of the target pixel is defined as the color contrast amount RCi.

Similar to the first embodiment, the brightness contrast amount RKi is found by the surrounding brightness information calculation portion 20 and the brightness contrast amount calculation portion 21 based on the brightness information Ki. The brightness contrast amount RKi and the color contrast amount RCi are inputted into the high-interest level conversion portion 123, and the high-interest level conversion portion 123 finds the interest level Si.

Figure 21:
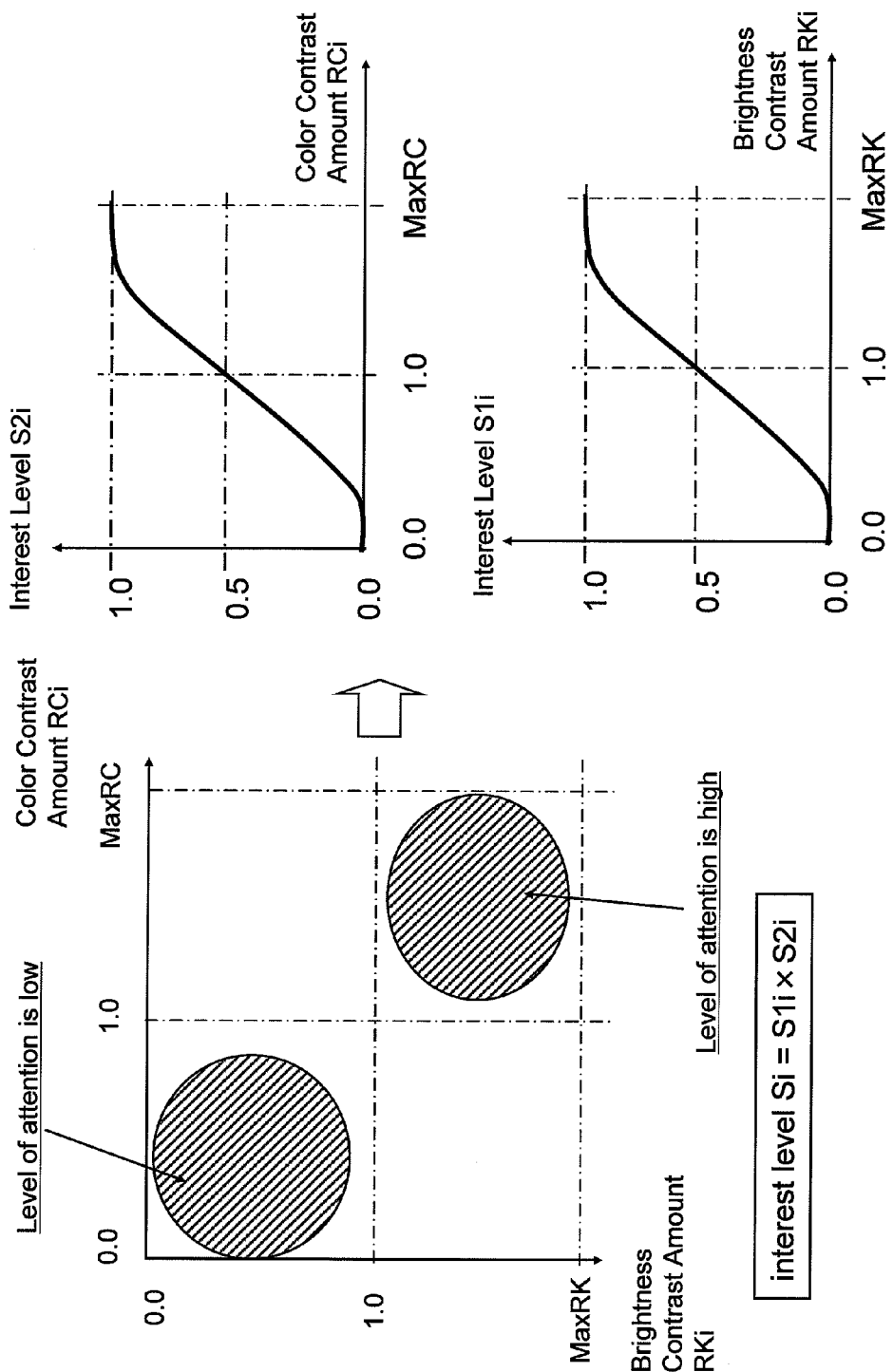
FIG. 21 is a diagram schematically illustrating an example of the relationship between the brightness contrast and the interest level based on the color contrast.

FIG. 21 schematically illustrates an example of the method for calculating the interest level Si.

In the same manner as in the first embodiment, pixels in which the brightness contrast amount RKi of the target pixel i is greater than "1" are brighter than the surrounding area, and thus stand out; such pixels are therefore regarded as pixels that are present in a region having a high interest level Si. Similarly, pixels in which the color contrast amount RCi of the target pixel i is greater than "1" are more vivid than the surrounding area, and thus stand out; such pixels are therefore regarded as pixels that are present in a region having a high interest level Si.

The circular region in the lower-right of the left side of FIG. 21 corresponds to such an portion.

Meanwhile, the circular region on the top-left of the left side of FIG. 21 (the region with diagonal lines) corresponds to a region in which the brightness contrast amount RKi and the color contrast amount RCi of the target pixel i are both less than "1"; pixels in this region are regarded as being present in a region that is darker and less saturated than the surrounding area, and are thus regarded as pixels that are present in a region having a low interest level Si.

Taking the above into consideration, the interest level Si is defined as indicated in (Formula 19). The interest level Si is then separated into an interest level S1$i$ based on the brightness contrast amount RKi and an interest level S2$i$ based on the color contrast amount RCi, as indicated in (Formula 19); the two interest levels are controlled based on, for example, the characteristics shown in the right side of FIG. 21.

(Formula 19)

$$S_i = S1_i \times S2_i \qquad (19)$$

First, pixels for which the brightness contrast amount RKi is greater than "1" are regarded as pixels that are present in a region having a high interest level, and the interest level S1$i$ of those pixels is set to a high value, as shown in the lower right of FIG. 21. Note that the interest level S1$i$ takes on a value in the range defined by $0.0 \leq S1i \leq 1.0$, where $S1i=1.0$ indicates the highest interest level, and $S1i=0.0$ indicates the lowest interest level. Pixels having a brightness contrast amount RKi of 1.0 are considered as having a normal interest level, and the interest level Si is therefore set to "0.5"; as the brightness contrast amount RKi increases toward a predetermined maximum brightness contrast amount MaxRK, the interest level with regards to that pixel (the pixel i) increases, and thus the interest level S1$i$ also increases monotonically toward "1.0". Conversely, as the brightness contrast amount RKi decreases toward "0.0", the interest level with regards to that pixel (the pixel i) decreases, and thus the interest level S1$i$ also decreases monotonically toward "0.0".

Based on the above, the interest level S1$i$ is defined as indicated in (Formula 20), based on the brightness contrast amounts RKi of each pixel i.

(Formula 20)

$$S1_i = 1.0/(1.0 + \exp(-s1keisu \times (RK_i - 1))) \qquad (20)$$

In (Formula 20), s1keisu is a predetermined positive constant that controls the slope (the size of the slope).

Furthermore, pixels for which the color contrast amount RCi is greater than "1" are regarded as pixels that are likely to be present in a region having a high interest level, and the interest level S2$i$ based on RCi is set to a high value, as shown in the upper right of FIG. 21. The interest level S2$i$ takes on a value in the range defined by $0.0 \leq Si \leq 1.0$ where $S2i=1.0$ indicates the highest interest level, and $S2i=0.0$ indicates the lowest interest level. Like the brightness contrast amount RKi, pixels (pixels i) in which the color contrast amount RCi is 1.0 are regarded as having a normal interest level, and thus S2$i$ is set to "0.5" for those pixels. As the color contrast amount RCi increases as it approaches a predetermined maximum color contrast amount MaxRC, the interest level with regards to that pixel (the pixel i) decreases, and thus the interest level S2$i$ also increases monotonically toward "1.0". Conversely, as the color contrast amount RCi decreases toward a "0.0", the interest level with regards to that pixel (the pixel i) decreases, and thus the interest level S2$i$ also decreases monotonically toward "0.0".

Based on the above, the interest level S2$i$ is defined as indicated in (Formula 21), based on the color contrast amounts RCi of each pixel i.

(Formula 21)

$$S2_i = 1.0/(1.0 + \exp(-s2keisu \times (RC_i - 1))) \qquad (21)$$

In (Formula 21), s1keisu is a predetermined positive constant that controls the slope (the size of the slope).

Note that the interest level Si of the pixel i is not intended to be limited to the above, and may be calculated through an approximation using a function that takes the color contrast amount RCi and the brightness contrast amount RKi as variables. In such a case, settings are made so that the maximum interest level of "1.0" is attained if the color contrast amount RCi or the brightness contrast amount RKi is at its maximum value; the point at which the interest level reaches that maximum value is taken as the center, and the interest level is calculated through a function (both linear and non-linear functions are acceptable) that gradually decreases the interest level in accordance with changes in the color contrast amount RCi or the brightness contrast amount RKi. Alternatively, the interest level may be determined by dividing a two-dimensional space defined by the color contrast amount RCi and the brightness contrast amount RKi, setting each region formed by the division to a constant interest level, and using a function that sets the interest level at the borders of the regions to take on smoothly continuous values.

As described thus far, the image processing device 2000 enables the interest level Si to be estimated with greater accuracy than in the first embodiment by combining the effects of the brightness contrast, which is a value that applies the psychology of vision to brightness, with the effects of the color contrast, which is a value that applies the psychology of vision to color (saturation, hue, and the like).

Meanwhile, the vanishing point estimation portion 3 estimates the vanishing point information vVPk using the same method as described in the first embodiment. The vanishing point information vVPk obtained by the vanishing point estimation portion 3 and the interest level Si obtained by the high-interest level estimation portion 102 are then inputted into the depth estimation portion 4. After this, the degree of depth fbi of the pixel i(x,y) and the correction gain Gi are found by the depth estimation portion 4 based on the vanishing point information vVPk and the interest level Si. Furthermore, a predetermined depth correction process is executed by the depth correction portion 5 on the inputted image vIi based on the correction gain Gi. Finally, the depth-corrected image signal is processed by the output portion 6 in the same manner as described in the first embodiment, and is outputted from the image processing device 2000 as an output image signal vOi.

Accordingly, with the image processing device 2000 and the image processing method according to the second embodiment, both the brightness contrast amount and the color contrast amount are used to estimate the interest level, making it possible to set the interest level based not only on the brightness but also on the vividness of the colors and the like. This makes it possible to set the interest level and the degree of depth so as to more closely match the visual characteristics of humans.

Third Embodiment

An image processing method and an image processing device, which estimate a degree of depth based on an interest level and the distance from a vanishing point and carry out pixel value correction, shall be described as a third embodiment of the present invention, with reference to FIGS. 22 through 26.

<3.1: Configuration of the Image Processing Device>

Figure 22:
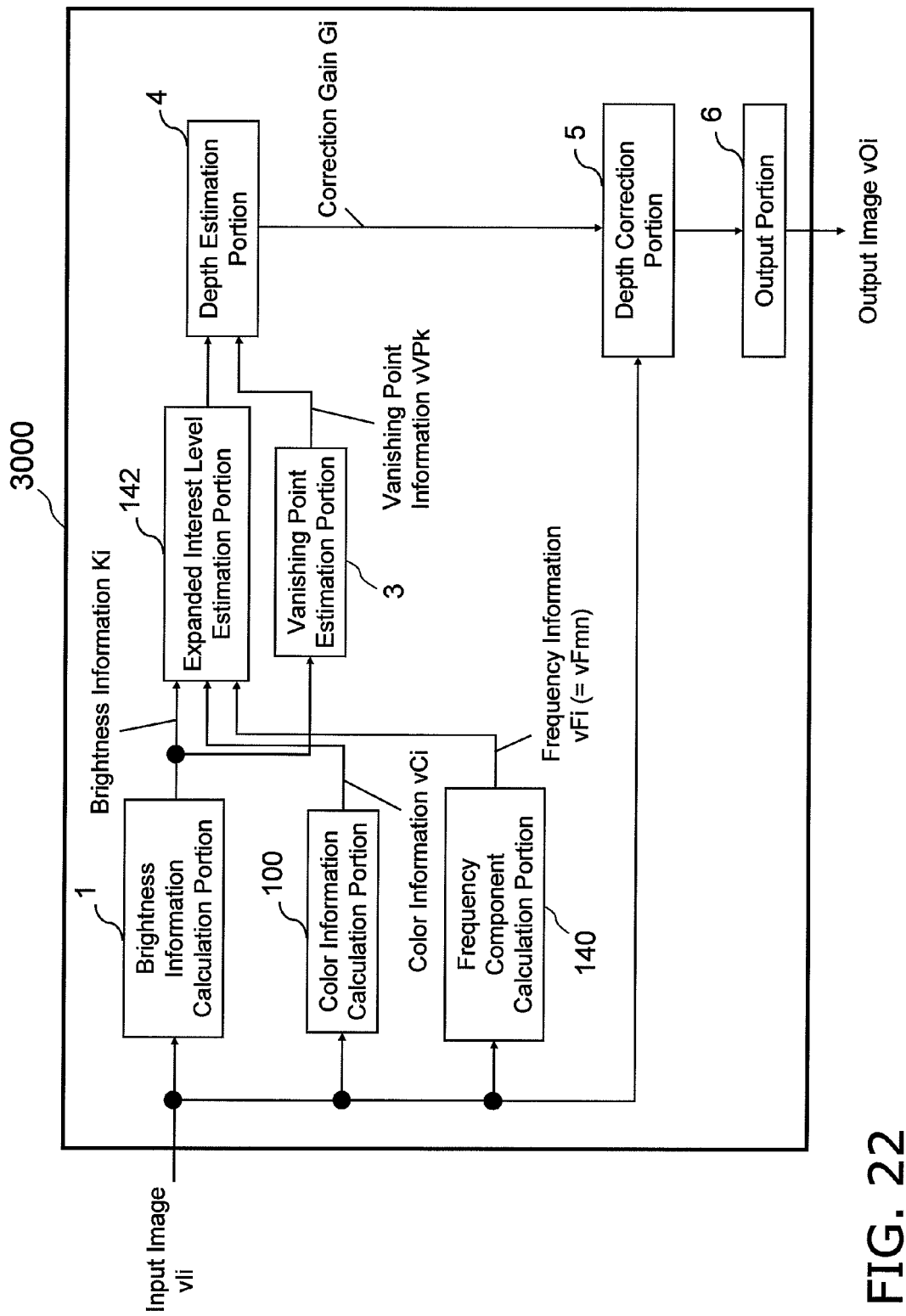
FIG. 22 is a block diagram illustrating the configuration of an image processing device according to a third embodiment of the present invention.

FIG. 22 illustrates the configuration of an image processing device 3000 according to the third embodiment of the invention. As shown in FIG. 22, the image processing device 3000 according to the third embodiment differs from the image processing device 2000 according to the second embodiment in that a frequency component calculation portion 140 has been added and the high-interest level estimation portion 102 has been replaced with an expanded interest level estimation portion 142.

It should be noted that with the image processing device 3000 according to the present embodiment, portions that are the same as those of the previous embodiment shall be assigned the same reference numerals, and descriptions thereof shall be omitted.

Figure 23:
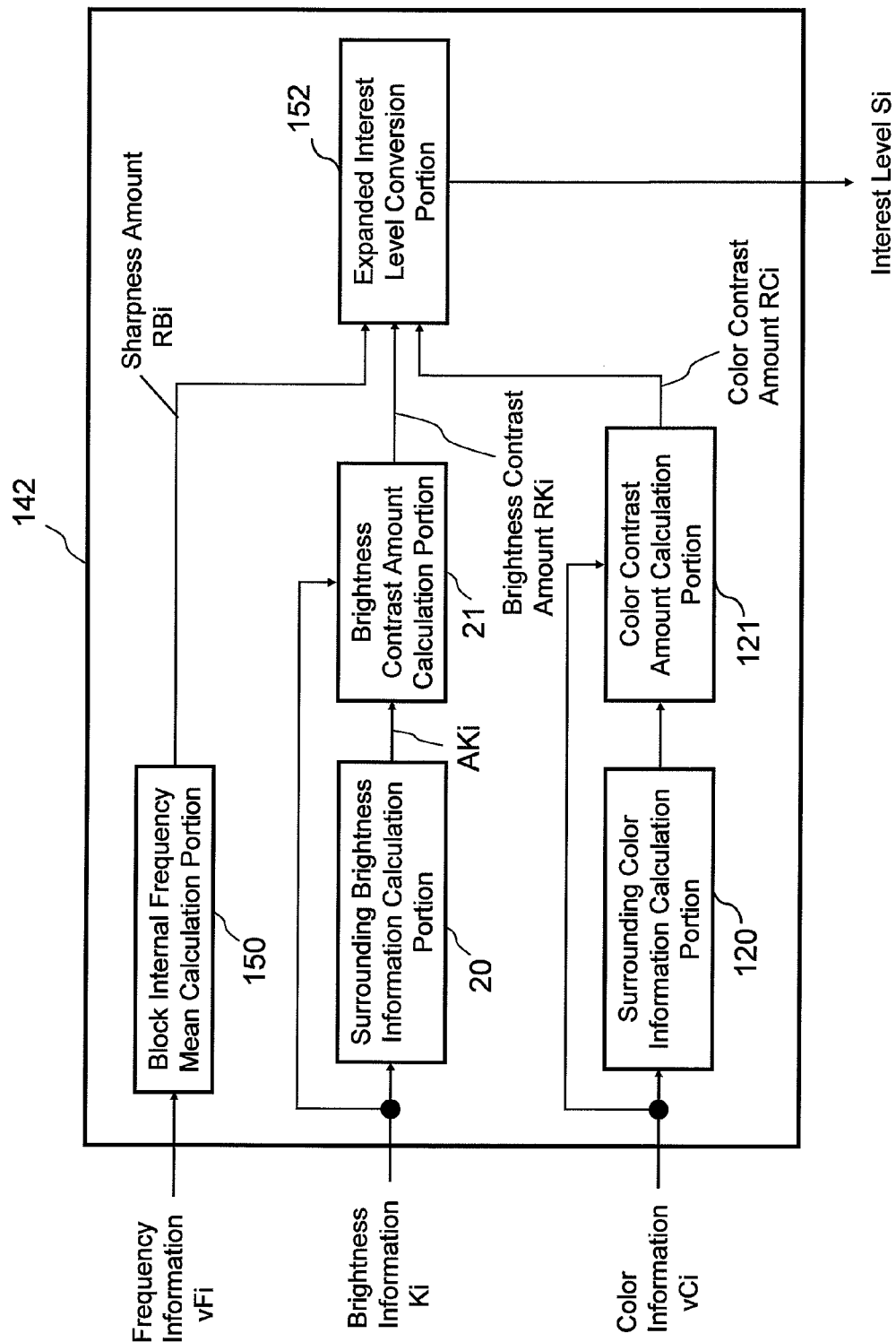
FIG. 23 is a block diagram illustrating the configuration of an expanded interest level estimation portion within the image processing device according to the third embodiment of the present invention.

FIG. 23 illustrates the configuration of the expanded interest level estimation portion 142. The expanded interest level estimation portion 142 differs from the high-interest level estimation portion 102 of the second embodiment in that it uses a sharpness amount RBi, obtained based on frequency information vFi of the pixel i(x,y), in addition to the brightness contrast amount RKi and the color contrast amount RCi when estimating the interest level Si.

The frequency component calculation portion 140 calculates frequency information vFmn based on the input image signal vIi, and outputs the calculated frequency information vFmn to the expanded interest level estimation portion 142.

The expanded interest level estimation portion 142 takes, as its input, the brightness information Ki outputted from the brightness information calculation portion 1, the color information Ci outputted from the color information calculation portion 100, and the frequency information vFmn outputted from the frequency component calculation portion 140, calculates (estimates) the interest level Si based on the brightness information Ki, the color information Ci, and the frequency information vFmn, and outputs the calculated interest level Si to the depth estimation portion 4.

The expanded interest level estimation portion 142 includes, as illustrated in FIG. 23, a surrounding brightness information calculation portion 20, a brightness contrast amount calculation portion 21, a surrounding color information calculation portion 120, a color contrast amount calculation portion 121, a block internal frequency mean calculation portion 150, and an expanded interest level conversion portion 152.

The surrounding brightness information calculation portion 20, the brightness contrast amount calculation portion 21, the surrounding color information calculation portion 120, and the color contrast amount calculation portion 121 are the same as those of the high-interest level estimation portion 102 described in the second embodiment, and thus further descriptions thereof shall be omitted.

The block internal frequency mean calculation portion 150 takes the frequency information vFmn as its input, calculates the sharpness amount RBi based on the frequency information vFmn, and outputs the calculated sharpness amount RBi to the expanded interest level conversion portion 152.

The expanded interest level conversion portion 152 takes, as its input, the brightness contrast amount RKi outputted from the brightness contrast amount calculation portion 21, the color contrast amount RCi outputted from the color contrast amount calculation portion 121, and the sharpness amount RBi outputted from the block internal frequency mean calculation portion 150, calculates the interest level Si based on the brightness contrast amount RKi, the color contrast amount RCi, and the sharpness amount RBi, and outputs the calculated interest level Si to the depth estimation portion 4.

<3.2: Operation of the Image Processing Device>

Next, the operation of the image processing device 3000 shall be described.

Figure 24:
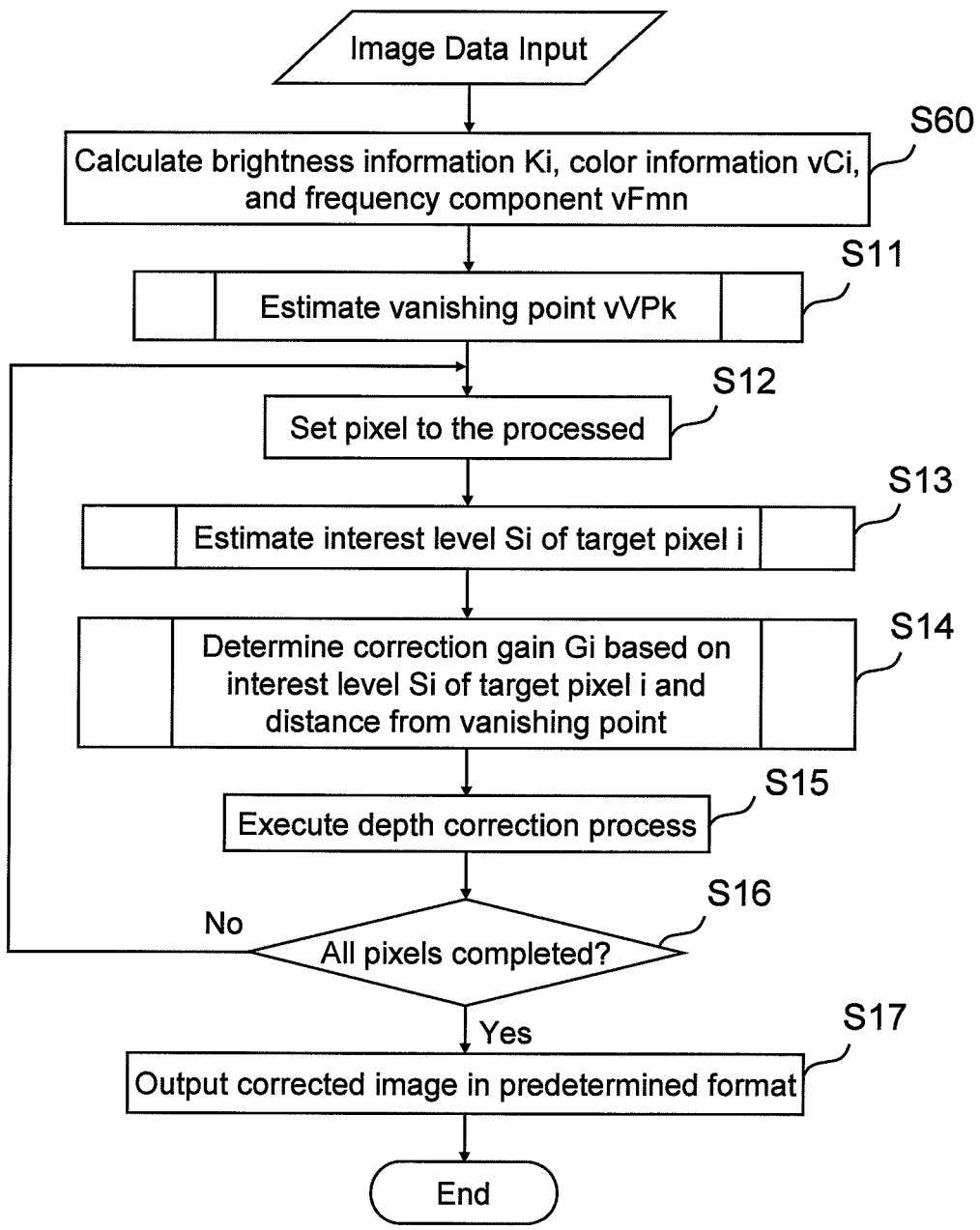
FIG. 24 is a flowchart illustrating the entirety of an image processing method according to the third embodiment of the present invention.
Figure 25:
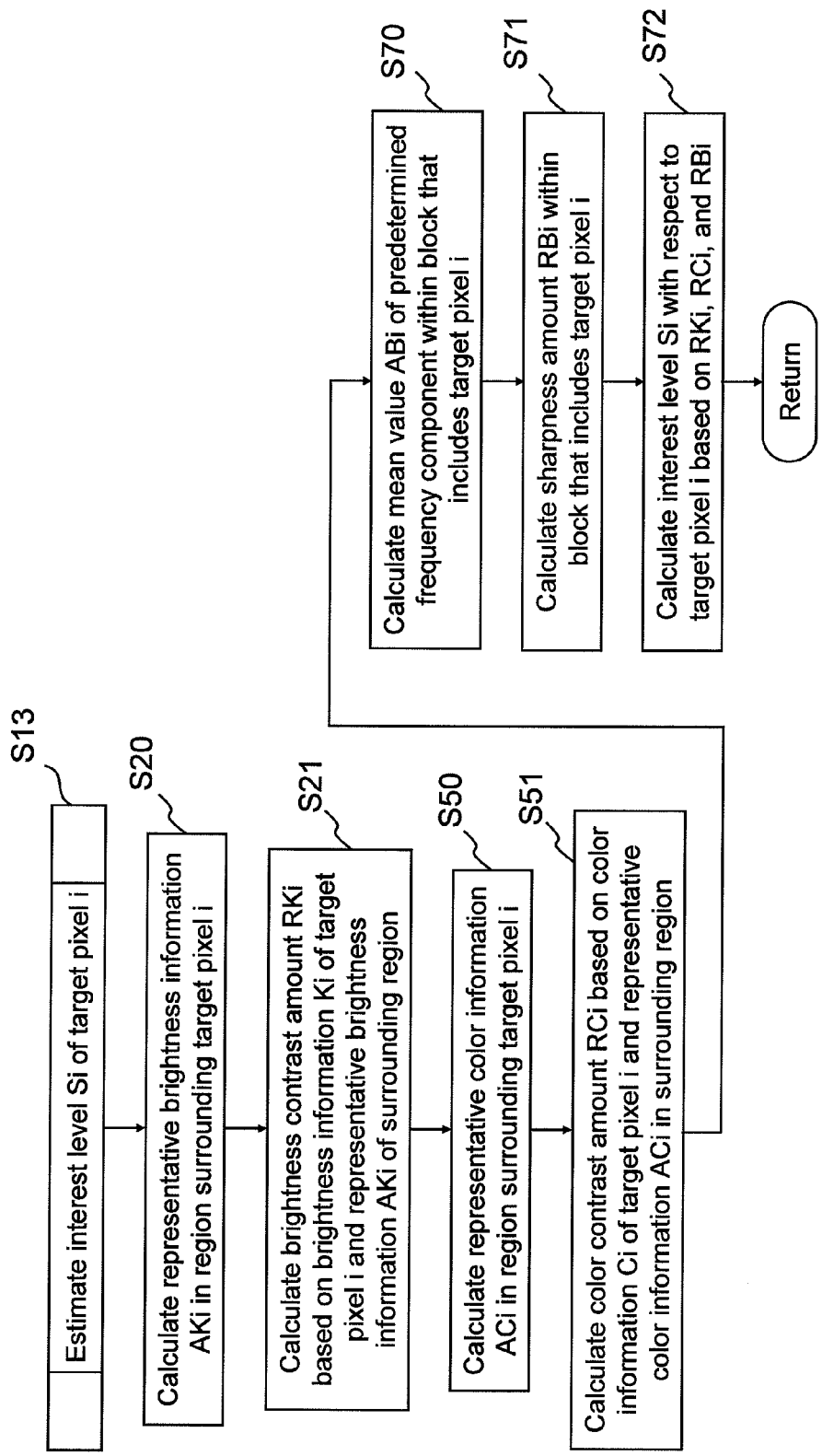
FIG. 25 is a flowchart illustrating an expanded interest level estimation process within the image processing method according to the third embodiment of the present invention.

FIG. 24 is a flowchart illustrating processes performed in the image processing method according to the third embodiment, and FIG. 25 is a flowchart illustrating an expanded interest level estimation process.

The processes performed by the image processing device 3000 shall be described using FIGS. 22 through 25.

The processes spanning from image data (an image signal) vIi(x,y) being inputted into the image processing device 3000 to the data of the pixel i(x,y) (an input image signal) being converted into predetermined brightness information Ki and color information vCi are the same as described in the previous embodiments. In addition to this, the frequency component calculation portion 140 calculates a frequency component vFi of the pixel i(x,y). Although vFi can be calculated using a variety of conversion methods, the image processing device 3000 performs a discrete cosine transform (DCT), a transform often used conventionally, on the pixel i(x,y), and performs processing using a DCT coefficient obtained through the discrete cosine transform. Note, however, that the transform used by the frequency component calculation portion 140 in calculating the frequency component is not intended to be limited to a discrete cosine transform. Other transforms, such as a wavelet transform (including a discrete wavelet transform), a Fourier transform (fast Fourier transform) (including a discrete Fourier transform and a discrete fast Fourier transform), and so on may be used as long as they can enable extraction of the frequency component.

The frequency component calculation portion 140 calculates the frequency information vFmn (=vFi) in the following manner.

First, a two-dimensional image formed by the input image signal vIi is divided into blocks of NN pixels×NN pixels, after which a discrete cosine transform is carried out on the brightness information Ki of each block Bmn (where m=1, . . . , Mmax, and n=1, . . . , Nmax). The DCT coefficient obtained through the discrete cosine transform is taken as vFmn=(Fmn[s,t]) (where s=0, 1, . . . , NN−1, and t=0, 1, . . . , NN−1). vFmn is calculated through (Formula 22) and (Formula 23).

(Formula 22)

$$Fmn[s, t] = \sum_{y=0}^{NN-1} \sum_{x=0}^{NN-1} Ki(x, y) \cdot \Phi_s(x) \cdot \Phi_t(y) \quad (22)$$

(Formula 23)

$$\Phi_s[x] = \begin{cases} \frac{1}{\sqrt{NN}} & (s = 0) \\ \sqrt{\frac{2}{NN}} \cos\left(\frac{(2x+1)s\pi}{2NN}\right) & (s = 1, 2, \ldots, NN-1) \end{cases} \quad (23)$$

Here, vFmn expresses a DCT coefficient in a block mn that contains the pixel i, and is a two-dimensional matrix composed of NN×NN. The frequency information vFmn and the brightness contrast amount RKi and color contrast amount RCi described in the previous embodiments are inputted into the expanded interest level estimation portion 142, and the interest level Si of the pixel i is then found by the expanded interest level estimation portion 142.

The interest level Si is, as indicated by (Formula 24), expressed as a product of an interest level S1$i$ based on the brightness contrast amount RKi, an interest level S2$i$ based on the color contrast amount RCi, and an interest level S3$i$ based on the sharpness amount RBi obtained from the frequency information vFmn (=vFi). Note that the interest level Si is not intended to be limited thereto, and may be an interest level that can be controlled by these three variables and that is found through a non-linear function that is gently continuous with respect to the three variables.

(Formula 24)

$$Si = S1i \times S2i \times S3i \quad (24)$$

S1$i$, based on the brightness contrast, and S2$i$, based on the color contrast, are found based on the characteristics illustrated in FIG. 21, in the same manner as described in the second embodiment.

With regards to the sharpness amount RBi, first, sumHFreq, which is the sum of frequency components that are greater than a predetermined threshold frequency ThFreq (a sum of high-frequency components) within the divided block Bmn that contains the pixel i, is found, after which the ratio of the total sum of all frequencies within the block sumAllFreq to the stated sum of the high-frequency components is found; the sharpness amount RBi is defined as that ratio. In other words, the sharpness amount RBi is defined as:

$$RBi = sumHFreq/sumAllFreq$$

The greater the value of the sharpness amount RBi, the more high-frequency components are present in a block containing the pixel i, and thus that block that contains the pixel i is a block with a high level of sharpness. Conversely, the lower the value of the sharpness amount RBi, the less high-frequency components are present in a block containing the pixel i, and thus that block that contains the pixel i is a block with a low level of sharpness (has a higher amount of blurriness).

The sharpness amount RBi obtained in this manner is uniform among pixels i in blocks Bmn that contain the pixel i. Accordingly, the interest level S3$i$ is calculated through the sharpness amount RBi by applying a Gaussian function, which uses the center of the block Bmn as a peak and decreases in accordance with the distance from the center, to the sharpness amount RBi.

Figure 26:
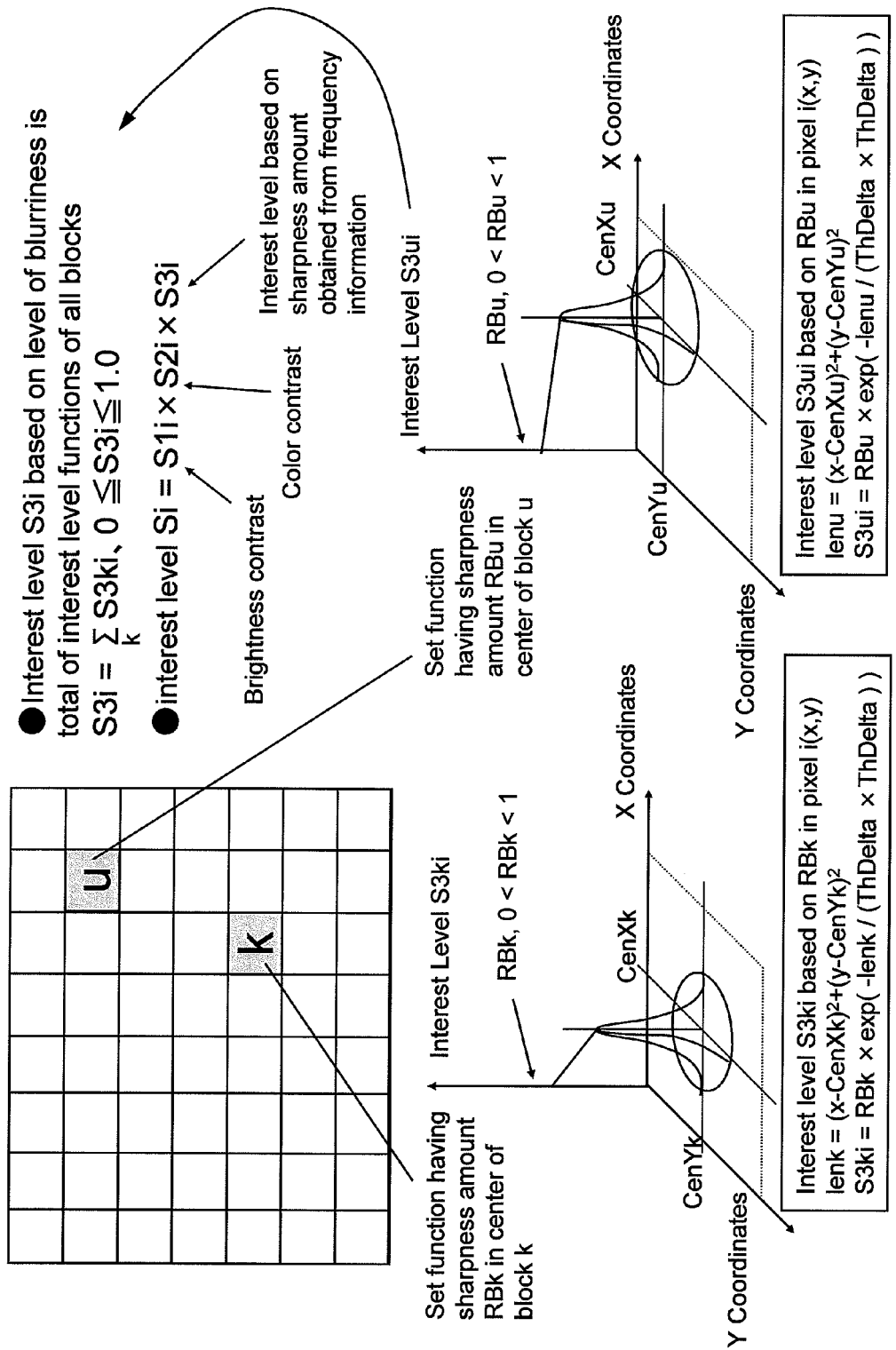
FIG. 26 is a diagram illustrating a relationship between the calculation of the interest level based on a sharpness amount (frequency component), and the interest level based on the color contrast and the brightness contrast.

FIG. 26 schematically illustrates a method for calculating the interest level S3$i$ through the sharpness amount RBi, based on the above.

As shown in FIG. 26, a Gaussian distribution is applied to a sharpness amount RBk of a block k and a sharpness amount RBu of a block u, an interest level S3$ki$ is calculated through (Formula 25) based on the amount of blurriness imparted on the pixel i(x,y) by the sharpness amount RBk of the block k, and an interest level S3$ui$ is calculated through (Formula 26) based on the amount of blurriness imparted on the pixel i(x,y) by the sharpness amount RBu of the block u.

(Formula 25)

$$S3ki = RBk \times \exp(-lenk/ThDelta^2)$$

$$lenk = (x - CenXk)^2 + (y - CenYk)^2 \quad (25)$$

(Formula 26)

$$S3ui = RBu \times \exp(-lenu/ThDelta^2)$$

$$lenu = (x - CenXu)^2 + (y - CenYu)^2 \quad (26)$$

Here, ThDelta is a predetermined positive constant that indicates a degree of variance. The coordinates (CenXk, CenYk) indicate the central coordinates of the block k, whereas the coordinates (CenXu,CenYu) indicate the central coordinates of the block u.

The expanded interest level conversion portion 152 calculates the interest level S3$i$ based on the sharpness amount of the pixel i by finding the sum of the interest levels S3$si$ for which the sharpness amount RBs of the blocks s obtained as described above influences the processed pixel i(x,y). In other words, the expanded interest level conversion portion 152 calculates the interest level S3$i$ based on the sharpness amount of the pixel i using (Formula 27).

(Formula 27)

$$S3i = \sum_s S3si \quad (27)$$

In this manner, the image processing device 3000 enables the interest level Si to be estimated with greater accuracy than in the previous embodiments by combining the brightness contrast amount, which is a value that applies the psychology of vision to brightness, the color contrast amount, which is a value that applies the psychology of vision to color (saturation, hue, and the like), and a value of the sharpness amount based on high-frequency components with the interest level Si.

Meanwhile, the vanishing point estimation portion 3 estimates the vanishing point information vVPk using the same method as described in the previous embodiments. The vanishing point information vVPk obtained by the vanishing point estimation portion 3 and the interest level Si obtained by the expanded interest level conversion portion 152 are then inputted into the depth estimation portion 4. After this, the degree of depth fbi of the pixel i(x,y) and the correction gain Gi are found by the depth estimation portion 4 based on the vanishing point information vVPk and the interest level Si, and a depth correction process is executed by the depth correction portion 5 on the inputted image vIi based on the correction gain Gi. Finally, the depth-corrected image signal is processed by the output portion 6 in the same manner as described in the previous embodiments, and is outputted from the image processing device 3000 as an output image signal vOi.

Accordingly, with the image processing device 3000 and the image processing method according to the present embodiment, the brightness contrast amount, the color contrast amount, and the sharpness amount based on the frequency information are used to estimate the interest level, making it possible to set the interest level based not only on the brightness and the vividness of the colors and the like but also on the amount of blurriness. This makes it possible to set the interest level so as to more closely match the visual characteristics of humans.

Fourth Embodiment

An image processing method and an image processing device, which estimate depth information for a pixel based on a vanishing point and an interest level and carry out correction on that pixel, shall be described as a fourth embodiment of the present invention, with reference to FIGS. 27 through 30.

Figure 27:
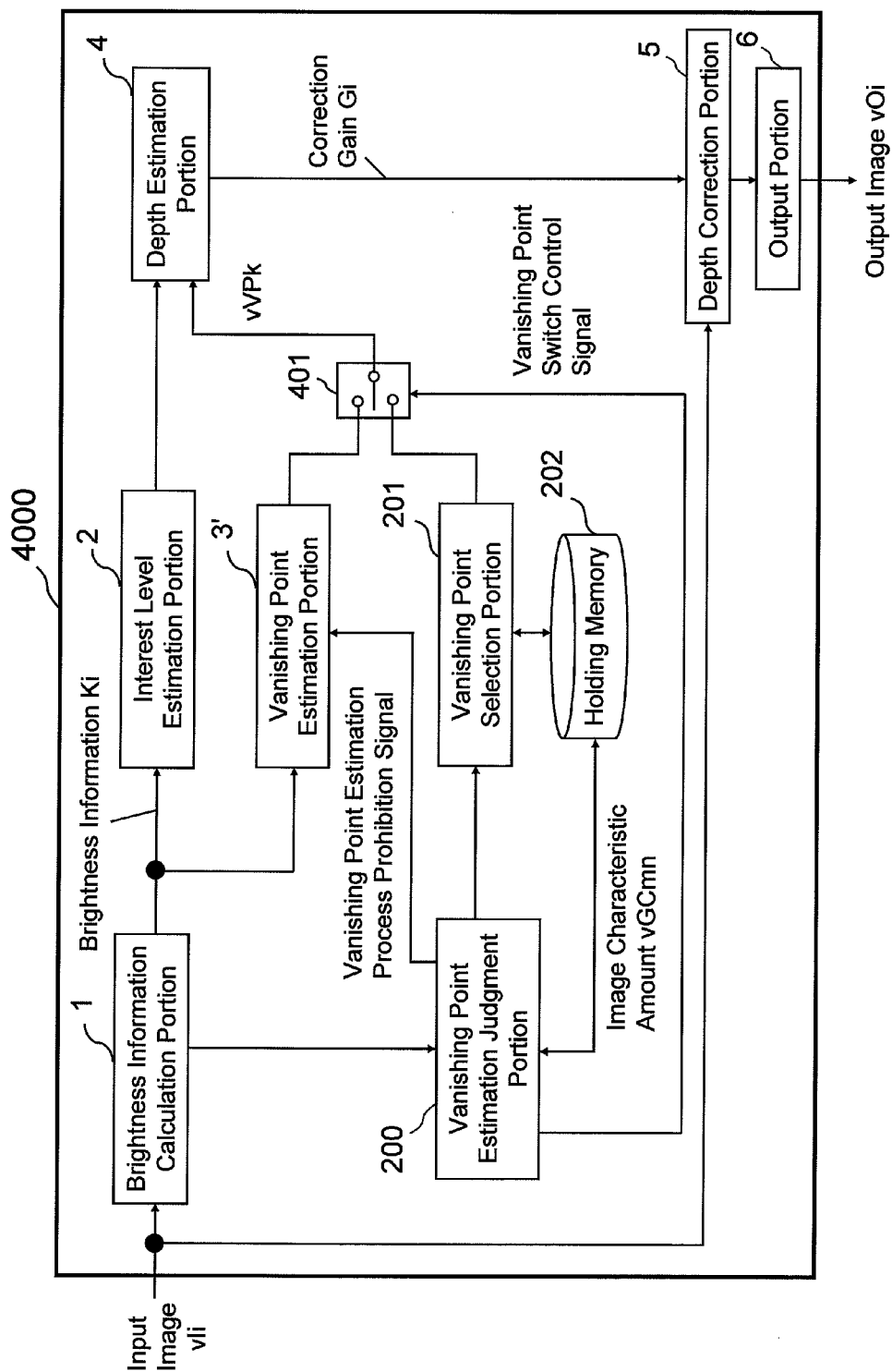
FIG. 27 is a block diagram illustrating the configuration of an image processing device according to a fourth embodiment of the present invention.
Figure 29:
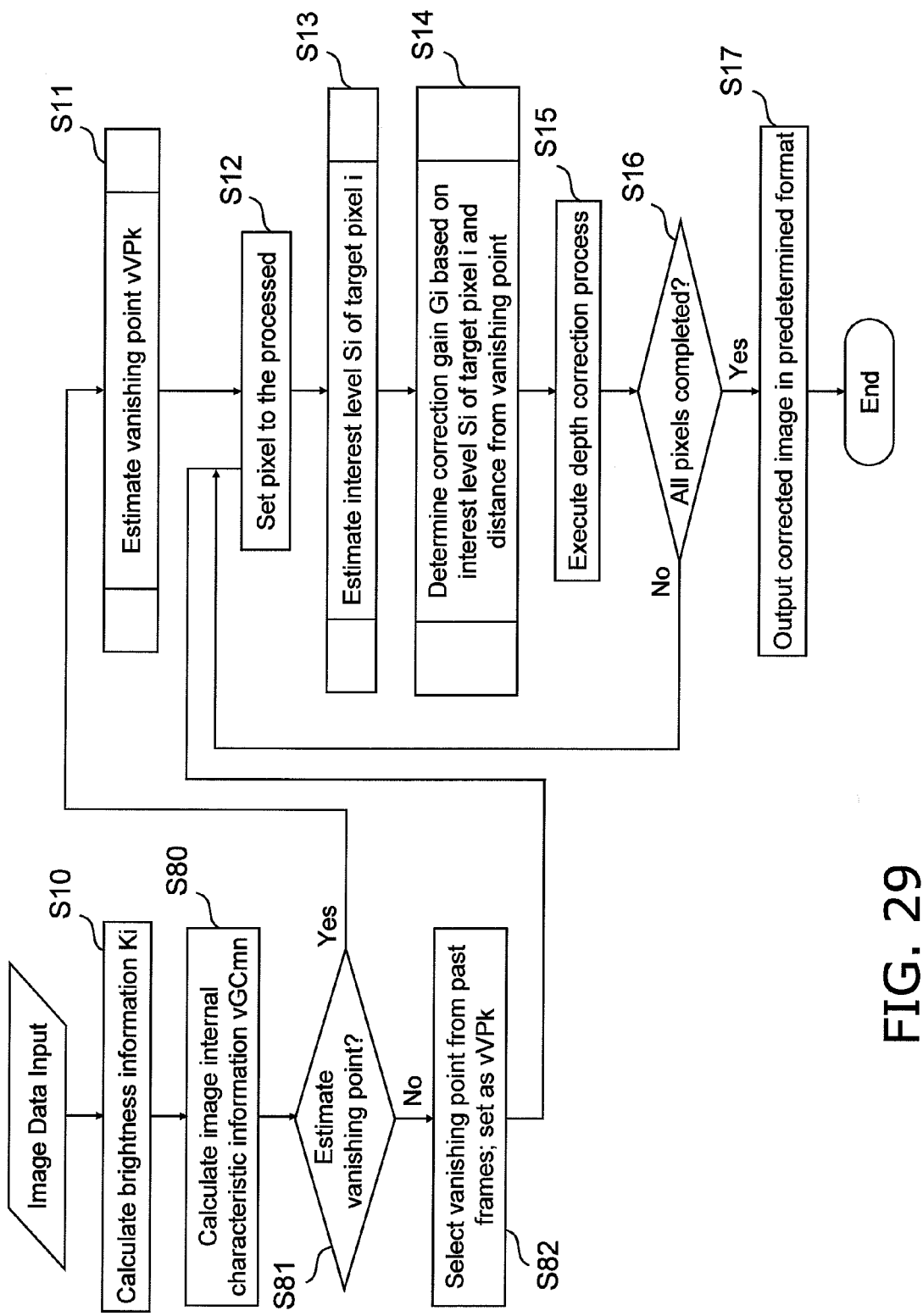
FIG. 29 is a flowchart illustrating the entirety of an image processing method according to the fourth embodiment of the present invention.

FIG. 27 illustrates the configuration of an image processing device 4000 according to the fourth embodiment of the present invention. FIG. 29 is a flowchart illustrating processes performed in the image processing method according to the fourth embodiment.

Figure 28:
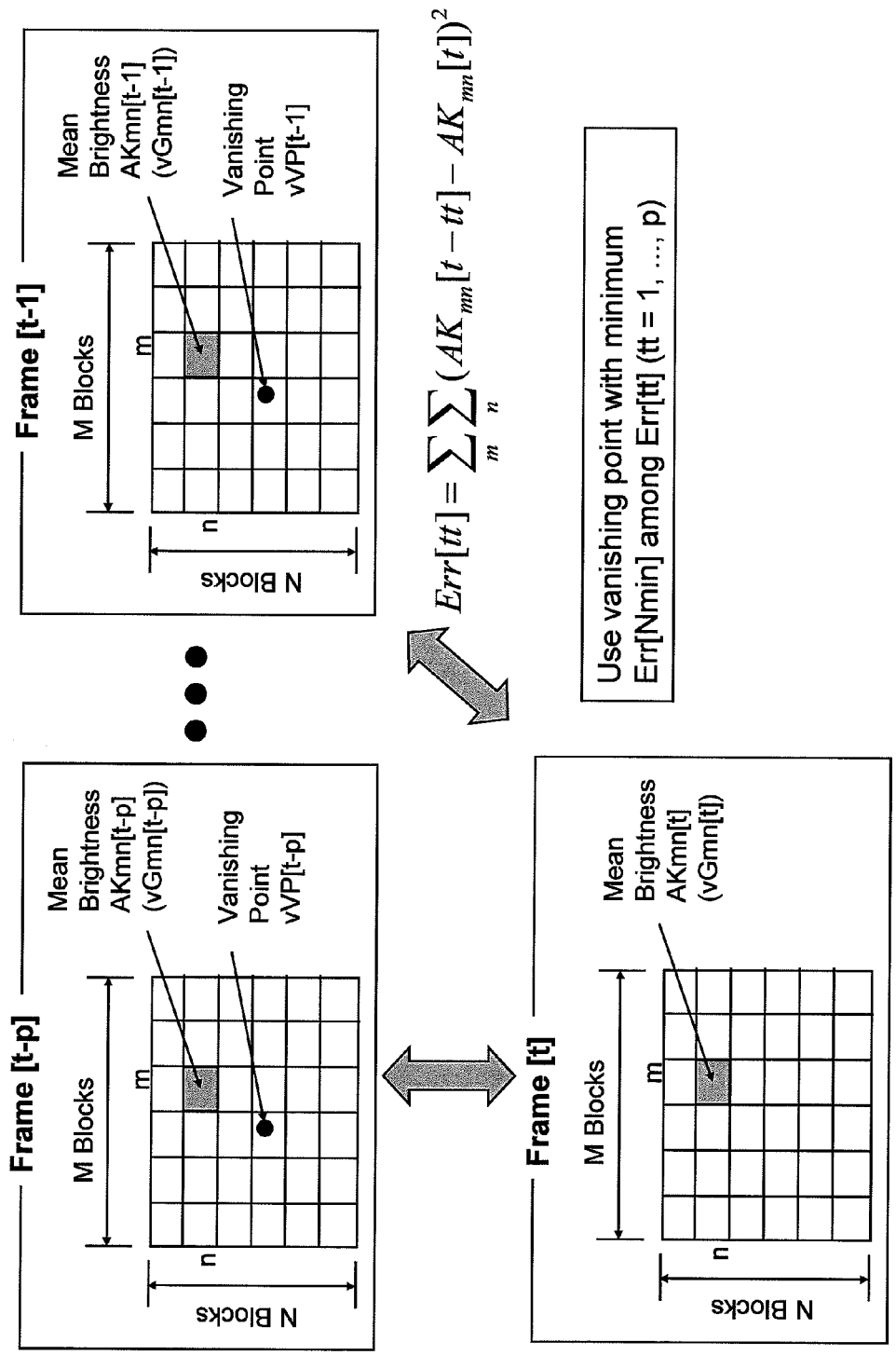
FIG. 28 is a diagram illustrating an example of the details stored within a holding memory according to the fourth embodiment.

FIG. 28 is a descriptive diagram illustrating an image characteristic amount vGCmn (where m=1, . . . , M, and n=1, . . . , N) used for judgment by a vanishing point estimation judgment portion 200 according to the present embodiment. Here, M and N are predetermined positive constants, where M indicates the number of blocks into which an image has been divided in the horizontal direction (x direction) and N indicates the number of blocks into which the image has been divided in the vertical direction (y direction). Note that when the processing described in the present invention is carried out on, for example, a high-definition television image, it is preferable to set the block size to 16×16 pixels, 32×32 pixels, 64×64 pixels, or the like.

<4.1: Configuration of the Image Processing Device>

The image processing device 4000 according to the fourth embodiment differs from the image processing device 1000 according to the first embodiment in that the vanishing point estimation judgment portion 200, a vanishing point selection portion 201, a holding memory 202, and a switching portion 401 have been added, and the vanishing point estimation portion 3 has been replaced with a vanishing point estimation portion 3'.

It should be noted that with the image processing device 4000 according to the present embodiment, portions that are the same as those of the previous embodiments shall be assigned the same reference numerals, and descriptions thereof shall be omitted.

The vanishing point estimation judgment portion 200 takes, as its input, the brightness information Ki outputted from the brightness information calculation portion 1 and an image characteristic amount vGCmn outputted from the holding memory 202, and acquires, from the brightness information Ki, an image internal characteristic amount of a frame image currently being processed by the image processing device 4000 (this frame image is referred to as a "frame image in the current time t" or a "current frame image", and an image p frames prior to the "frame image in the current time t" is referred to as a "frame image of the time t−p"). The vanishing point estimation judgment portion 200 then compares the image internal characteristic amount of the frame image in the current time t with image characteristic amounts (outputted from the holding memory 202) of p frame images processed in the past by the image processing device 4000 (that is, the frame images from time (t−p) to (t−1)), and if there is a frame image Nmin, processed in the past, that has a similar characteristic amount to the characteristic amount of the current frame image, it is once again determined whether or not the vanishing point vVPk[Nmin] obtained at that time is to be set as the vanishing point for the time t (the current time). In the case where the vanishing point estimation judgment portion 200 has determined the vanishing point vVPk[Nmin] as the vanishing point of the time t (the current time), the vanishing point estimation judgment portion 200 outputs information causing the vanishing point selection portion 201 to select the vanishing point vVPk[Nmin], as well as outputting, to the switching portion 401, a vanishing point switching signal that causes the vanishing point vVPk outputted from the vanishing point selection portion 201 to be inputted into the depth estimation portion 4. In such a case, the vanishing point estimation judgment portion 200 outputs a vanishing point estimation process prohibition signal to the vanishing point estimation portion 3', so that the vanishing point estimation portion 3' does not execute a vanishing point estimation process.

The vanishing point estimation judgment portion 200 also outputs the image characteristic amount vGCmn of the time t (the current time) to the holding memory 202.

Information regarding the image internal characteristic amount and vanishing point vVPk for each frame image is stored in the holding memory 202; the holding memory 202 holds that information and outputs it to the vanishing point estimation judgment portion 200 or the vanishing point selection portion 201 in response to requests from those respective portions.

The vanishing point selection portion 201 takes, as its input, the information outputted from the vanishing point estimation judgment portion 200 that causes the vanishing point vVPk[Nmin] to be selected, and outputs the vanishing point vVPk[Nmin] to the switching portion 401 based on the information that causes the vanishing point vVPk[Nmin] to be selected.

The switching portion 401 is a selector that outputs either the output from the vanishing point estimation portion 3' or the output from the vanishing point selection portion 201 to the depth estimation portion 4. The switching portion 401 switches based on a vanishing point switch control signal outputted from the vanishing point estimation judgment portion 200 so that either the output from the vanishing point estimation portion 3' or the output from the vanishing point selection portion 201 is outputted to the depth estimation portion 4.

In the case where the vanishing point estimation process prohibition signal has been outputted from the vanishing point estimation judgment portion 200, the vanishing point estimation portion 3' does not execute the vanishing point estimation process. Aside from this, the configuration of the vanishing point estimation portion 3' is the same as the vanishing point estimation portion 3 from the previous embodiments.

<4.2: Operation of the Image Processing Device>

Next, the operation of the image processing device 4000 shall be described using FIGS. 27 and 28.

Similar to the first embodiment, with the image processing device 4000, an interest level Si[t] is found by the interest level estimation portion 2 based on the brightness contrast amount RKi of a pixel i(x,y) within the frame image in the current time t.

The image processing device 4000 then determines the vanishing point vVPk for this time t in the following manner.

First, the vanishing point estimation judgment portion 200 judges whether or not to cause the vanishing point estimation portion 3' to execute the vanishing point estimation process on the current frame image (the frame image of the current time t). This judgment is carried out so that the following are executed:

(1) so that fluctuation in the vanishing point information, due to fluctuations in the border information and the like caused by external light, is inhibited;

(2) so that the vanishing point of the current frame is substituted for the vanishing point of the frame Nmin, which was processed in the past and has a similar image characteristic amount to that of the current frame, thereby reducing the estimation time; and (3) so that contradictions in the sense of distance within the image caused by scene changes between frames are reduced. A case where an object A that appears in the foreground of an image in time (t−1) suddenly appears in the background due to a scene change at time t can be given as an example of a case in which such contradictions in the sense of distance (abnormalities felt due to the correction of the sense of distance) occur. There is also the possibility that such a fluctuation in the vanishing point information or abnormalities felt due to the correction of the sense of distance will occur not only due to scene changes but also due to changes in the movement of a main object (that is, an object on which it is easy for a human to focus). When the first through the third embodiments are applied to moving images, measures must be taken with respect to such a fluctuation in the vanishing point information or abnormalities felt due to the correction of the sense of distance.

As shown in FIG. 28, an image characteristic amount vGCmn[t−p] in the frame [t−p] in a frame time tt=t−p (=AKmn[t−p]) (where m=1, . . . , M, and n=1, . . . , N) to an image characteristic amount vGCmn[t−1] in the frame [t−1] in a frame time tt=t−1 (=AKmn[t−1]) (where m=1, . . . , M, and n=1, . . . , N) is read out from the holding memory 202. The vanishing point estimation judgment portion 200 then finds an image characteristic amount vGCmn[t] (=AKmn[t]) (where m=1, . . . , M, and n=1, . . . , N) in a frame [t] in the current time tt=t and an evaluation function Err[tt] of the frame [tt] using the following (Formula 28). The frame tt=Nmin, in which the evaluation function Err[tt] is minimum, and an evaluation function Err[Nmin] are found, and in the case where the value of the evaluation function Err[Nmin] is lower than a predetermined threshold ThErr, the vanishing point information vVPk[Nmin] in a previous frame tt=Nmin is taken as the vanishing point vVPk[t], or vVPk[Nmin], in the frame image at the current time t.

(Formula 28)

$$Err[tt] = \sum_m \sum_n \left\{ \begin{array}{l} w_k \cdot (AK_{mn}[t-tt] - AK_{mn}[t])^2 + \\ w_v \cdot (AV_{mn}[t-tt] - AV_{mn}[t])^2 \end{array} \right\} \quad (28)$$

Here, AKmn[tt] indicates mean brightness information in a block mn within the frame image in the time tt.

In this manner, the image processing device 4000 carries out a depth process appropriate for moving images by taking the mean brightness information of blocks into which an image has been divided as the characteristic amount of that image, comparing the image characteristic amount of the current frame image with the image characteristic amount of images of past frame times, and using, as the vanishing point information of the current frame, the vanishing point information used in the frame Nmin that has a similar image characteristic amount. Accordingly, by employing the vanishing point of a frame processed in the past and that has an image characteristic amount similar to the image characteristic amount of the current frame as the vanishing point of the current frame, the occurrence of contradictions in the sense of distance caused by scene changes (abnormalities felt due to the correction of the sense of distance) can be resolved (suppressed). In other words, the image processing device 4000 has an effect that it can reduce abnormalities felt due to the depth correction occurring when an object A, which appears to be in the foreground of an image at time (t−1), suddenly appears in the background due to a scene change at time t. Furthermore, the image processing device 4000 can reduce the abnormalities felt not only due to the depth correction occurring due to scene changes but also due to changes in the movement of a main object.

Although the mean brightness information within the blocks into which the image has been divided has been used here as the image characteristic amount of the image in the frame time tt, it should be noted that the image characteristic amount may be found using the brightness contrast amount RKi[tt] used by the interest level estimation portion 2 to estimate the interest level Si. To be more specific, the mean value of the brightness contrast amount RKi[tt] within the blocks, into which the image has been divided, is found, and a mean brightness contrast amount ARKmn[tt], which is the stated mean value, may be used as the image characteristic amount. The amount of processing performed by the image processing device 4000 can thus be reduced by using the brightness contrast amount RKi[tt], used in the estimation of the interest level Si, in the calculation of the image characteristic amount as well.

If it has been determined by the vanishing point estimation judgment portion 200 that the vanishing point information vVPk[Nmin] of the past frame tt=Nmin is to be taken as the vanishing point vVPk[t]=vVPk[Nmin] of the frame image at the current time t, the vanishing point vVPk[t]=vVPk[Nmin] is outputted by the vanishing point selection portion 201 to the switching portion 401; the output of the vanishing point selection portion 201 is then inputted to the depth estimation portion 4 based on the vanishing point switch control signal from the vanishing point estimation judgment portion 200, and the depth estimation portion 4 then performs its processing. At this time, the vanishing point estimation process prohibition signal from the vanishing point estimation judgment portion 200 is outputted to the vanishing point estimation portion 3', and thus the vanishing point estimation portion 3' does not execute the vanishing point estimation process.

On the other hand, if it has been determined by the vanishing point estimation judgment portion 200 that the vanishing point of a past frame is not to be used, the vanishing point estimation portion 3' finds the vanishing point information vVPk in the current frame image in the same manner as in the first through third embodiments. The output of the switching portion 401 is then controlled so that the output of the vanishing point estimation portion 3' is inputted into the depth estimation portion 4, based on the vanishing point switch control signal from the vanishing point estimation judgment portion 200. The depth estimation portion 4 then performs the same processes as described in the previous embodiments.

The degree of depth fbi of the pixel i(x,y) and the correction gain Gi are found by the depth estimation portion 4 based on the vanishing point information vVPk and the interest level Si obtained as described here, after which the depth correction portion 5 performs a depth correction process on the input image signal vIi based on the correction gain Gi.

As described thus far, in addition to the depth correction effects obtained through the vanishing point information and the interest level Si estimated based on the brightness contrast discussed in the first embodiment, the image processing device 4000 of the fourth embodiment substitutes the vanishing point in the current frame image (the frame image at time t) with vanishing point information of past frame images (frame images from time t−p to time t−1) that have image characteristic amounts similar to the image characteristic amount of the current frame image. Through this, the image processing device 4000 can suppress abnormalities felt due to the depth correction that arise through fluctuations in the vanishing point extraction caused by ambient light and so on, abnormalities felt due to the depth correction that arise through changes in the vanishing point caused by movement of objects in the image, and so on, as well as reducing the amount of processing performed.

Figure 30:
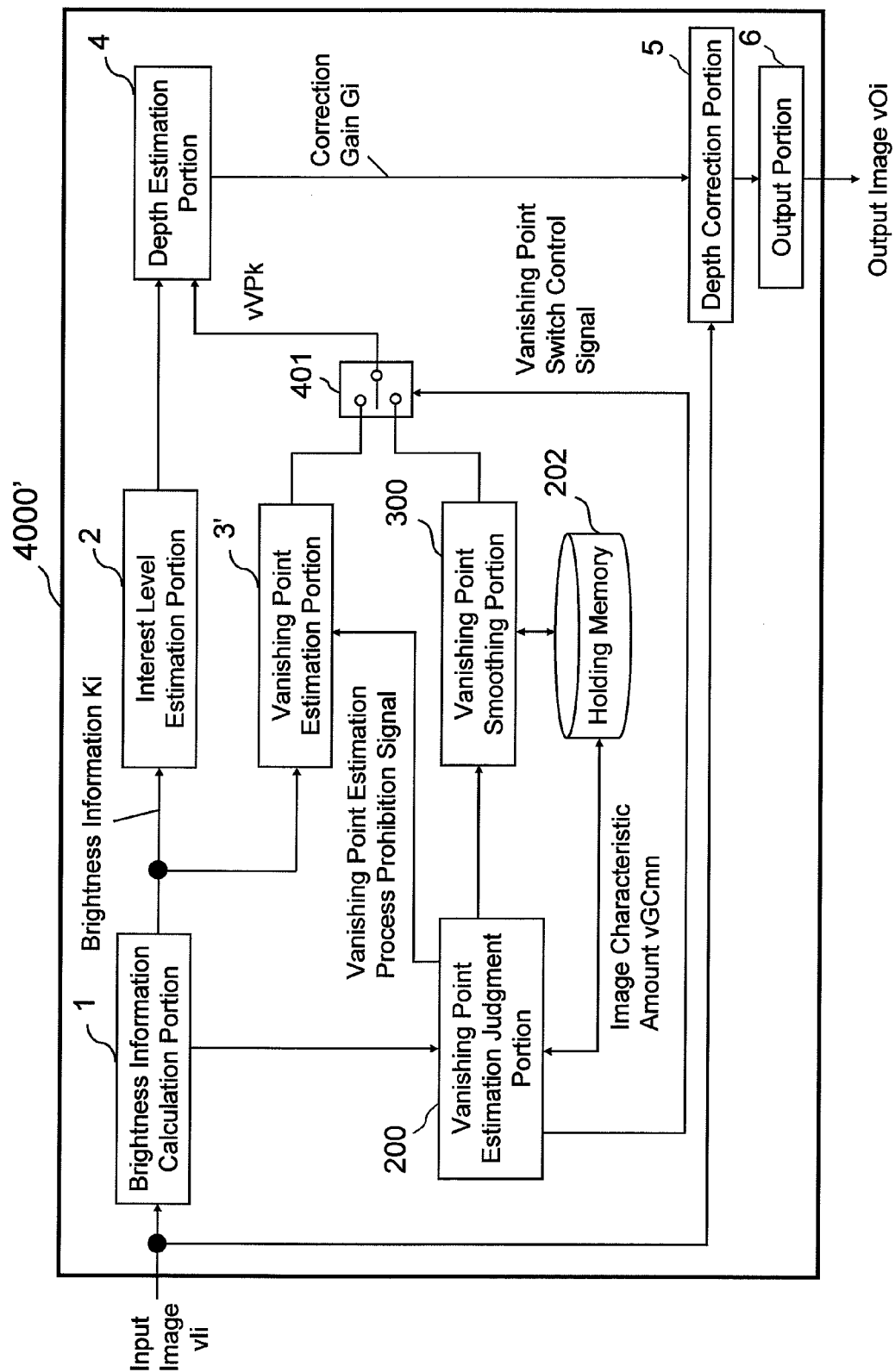
FIG. 30 is a block diagram illustrating another configuration of the image processing device according to the fourth embodiment of the present invention.

Meanwhile, in the case where the vanishing point estimation judgment portion 200 has judged that the vanishing point estimation is not to be carried out, rather than selecting the vanishing point vVPk[Nmin] of the appropriate frame image Nmin from among the vanishing point vVPk[t−p] in the (t−p) frame time to the vanishing point vVPk[t−1] in the (t−1) frame time, a value resulting from a vanishing point smoothing portion 300 smoothing the information of a total of p number of vanishing points which span from the vanishing point vVPk[t−p] in the (t−p) frame time to the vanishing point in the (t−1) frame time may be found, as illustrated in FIG. 30; the image processing device 4000 may then substitute that smoothed value for the vanishing point information of the current frame image. In this case, the smoothing process may be carried out by simply averaging the corresponding vanishing point information, or a smoothing process as indicated by (Formula 29) may be carried out, whereby a weighting coefficient weight[tt] in the frame time tt is controlled using a Gaussian distribution. By performing such a process, the image processing device 4000 can reduce detrimental effects caused by vanishing point flicker more effectively than when substituting the vanishing point of the current frame image with a single appropriate vanishing point.

Note that in (Formula 29), DeltaK is a predetermined positive constant indicating the degree of variance of the weighting coefficient. As this value increases, the effects imparted on the smoothing value spreads to frames further in the past in chronological order; conversely, as this value decreases, the effects imparted on the smoothing value spreads to nearby (close in chronological order) past frames.

(Formula 29)

$$weight[tt] = \exp(-tlen/DeltaK^2)$$

$$tlen = (tt-t)^2 \qquad (29)$$

Fifth Embodiment

Figure 31:
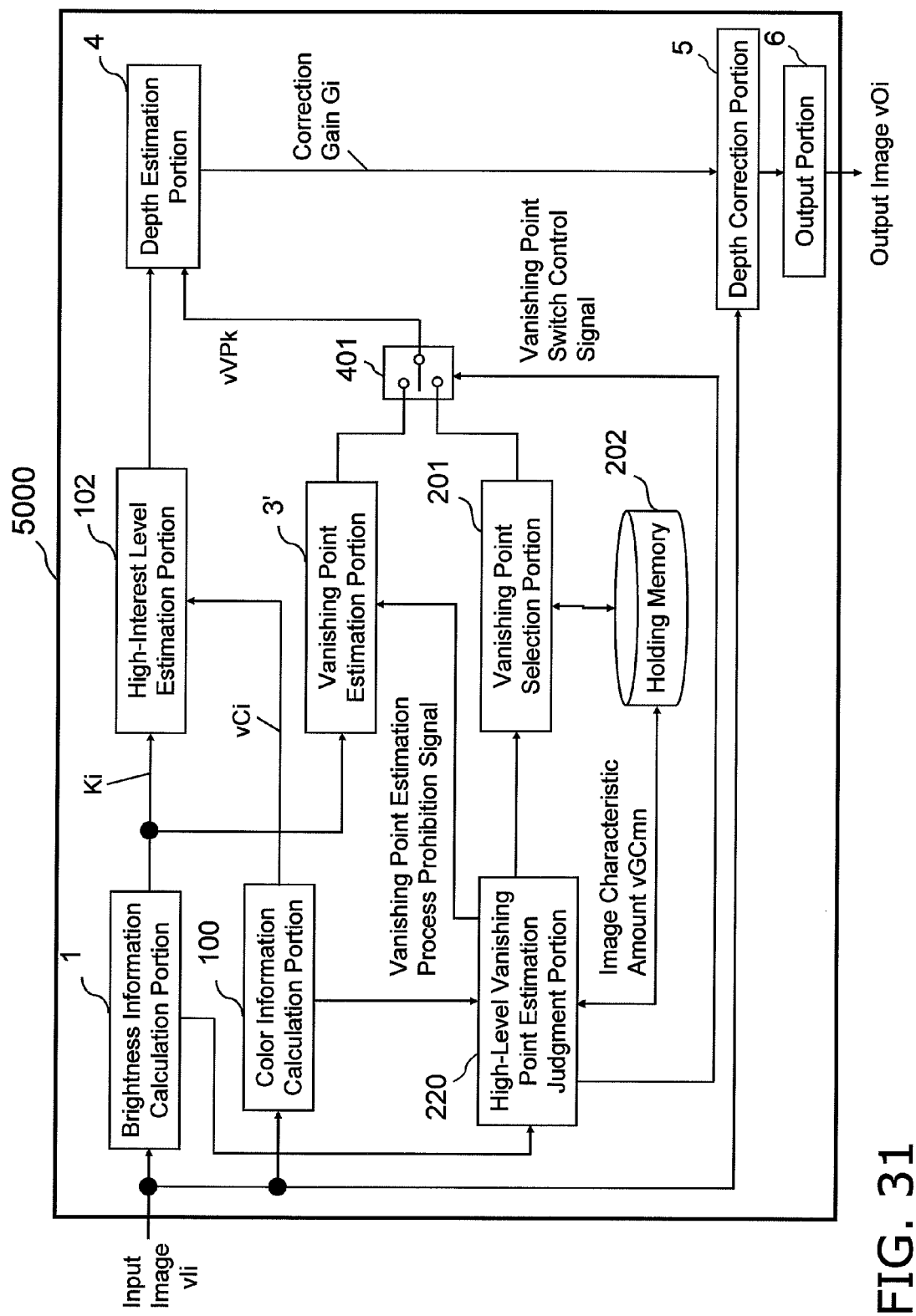
FIG. 31 is a block diagram illustrating the configuration of an image processing device according to a fifth embodiment of the present invention.
Figure 32:
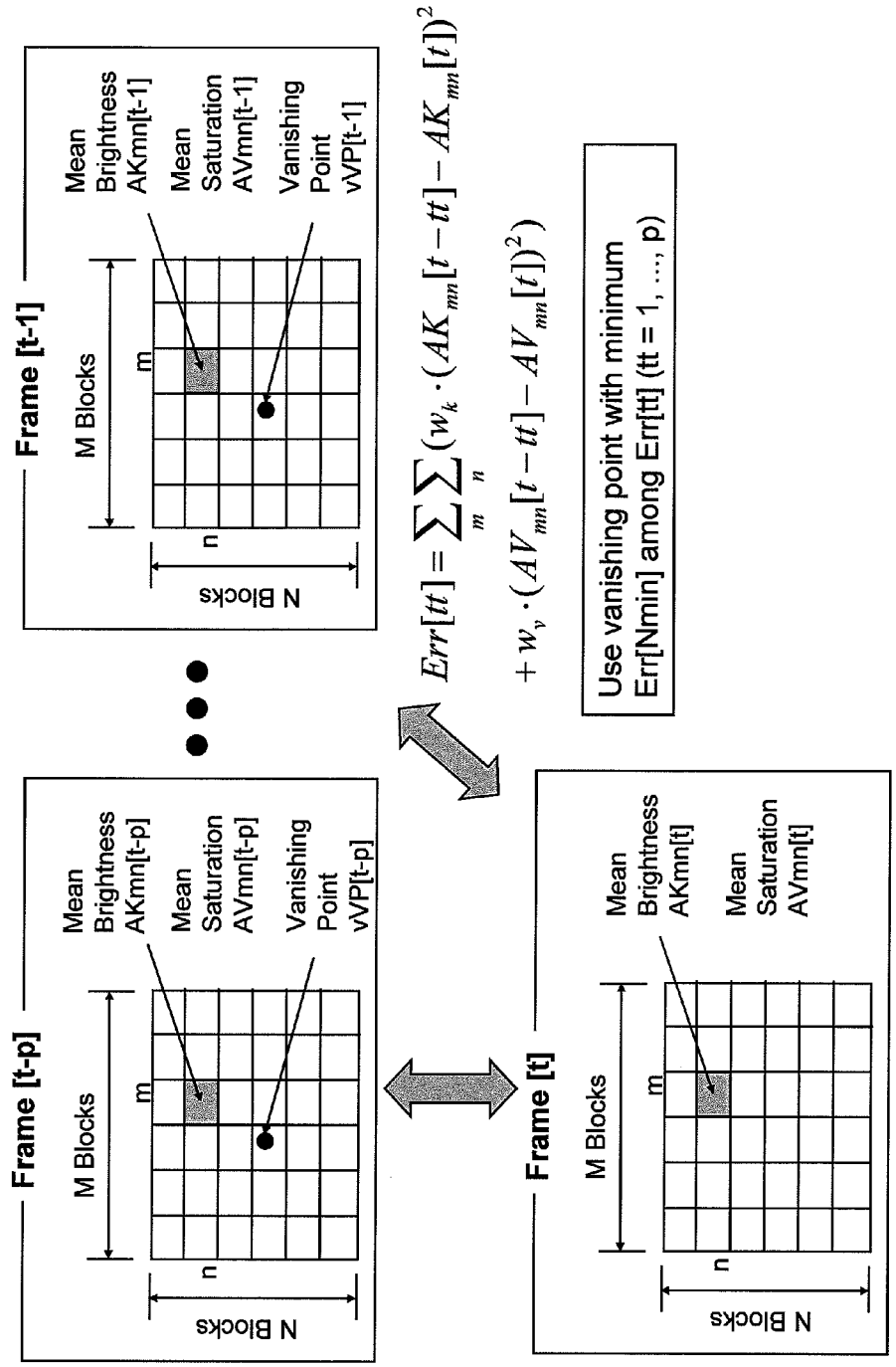
FIG. 32 is a diagram illustrating an example of the details stored within a holding memory according to the fifth embodiment.
Figure 33:
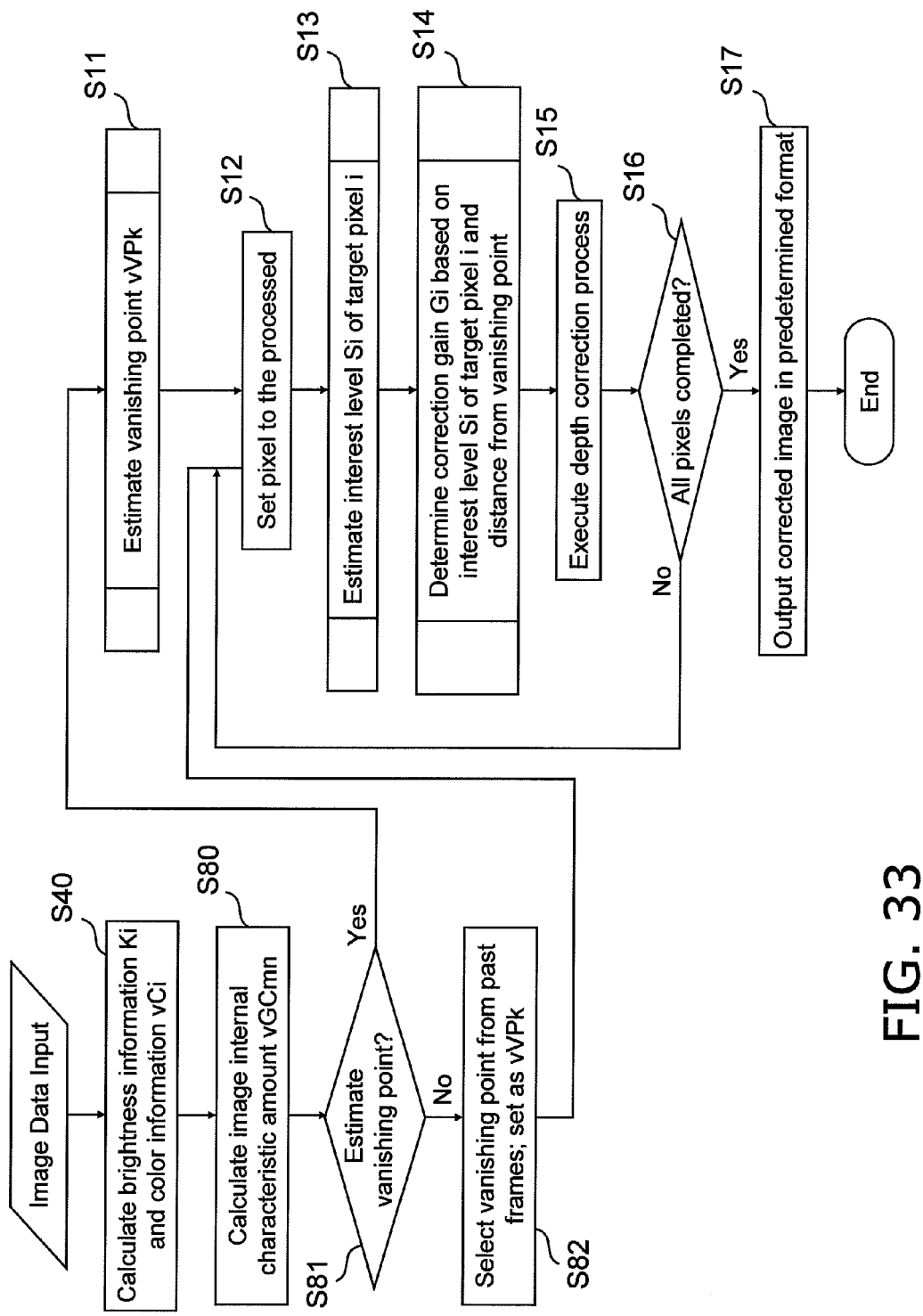
FIG. 33 is a flowchart illustrating the entirety of an image processing method according to the fifth embodiment of the present invention.

An image processing method and an image processing device, which estimate depth information for a pixel based on a vanishing point and an interest level and carry out correction on that pixel, shall be described as a fifth embodiment of the present invention, with reference to FIGS. 31 through 33.

FIG. 31 illustrates the configuration of an image processing device 5000 according to the fifth embodiment of the invention. FIG. 33 is a flowchart illustrating processes performed in the image processing method according to the fifth embodiment.

FIG. 32 is a descriptive diagram illustrating an image characteristic amount vGCmn (where m=1, . . . , M, and n=1, . . . , N) used for judgment by a high-level vanishing point estimation judgment portion 220 according to the present embodiment. Here, M and N are predetermined positive constants, where M indicates the number of blocks into which an image has been divided in the horizontal direction (x direction) and N indicates the number of blocks into which the image has been divided in the vertical direction (y direction). Note that when the processing described in the present invention is carried out on, for example, a high-definition television image, it is preferable to set the block size to 16×16 pixels, 32×32 pixels, 64×64 pixels, or the like.

<5.1: Configuration of the Image Processing Device>

The image processing device 5000 according to the fifth embodiment differs from the image processing device 2000 according to the second embodiment in that the high-level vanishing point estimation judgment portion 220, a vanishing point selection portion 201, a holding memory 202, and a switching portion 401 have been added, and the vanishing point estimation portion 3 has been replaced with a vanishing point estimation portion 3'.

It should be noted that with the image processing device 5000 according to the present embodiment, portions that are the same as those of the previous embodiments shall be assigned the same reference numerals, and descriptions thereof shall be omitted.

The high-level vanishing point estimation judgment portion 220 takes, as its input, the brightness information Ki outputted from the brightness information calculation portion 1, the color information vCi outputted from the color information calculation portion 100, and an image characteristic amount vGCmn outputted from the holding memory 202, and acquires, from the brightness information Ki and the color information vCi, an image internal characteristic amount of the current frame image (the frame image in the current time t), as shown in FIG. 31. The high-level vanishing point estimation judgment portion 220 then compares the image internal characteristic amount of the frame image in the current time t with image characteristic amounts (outputted from the holding memory 202) of p frame images processed in the past by the image processing device 5000 (that is, the frame images from time (t−p) to (t−1)), and if there is a frame image Nmin, processed in the past, that has a similar characteristic amount to the characteristic amount of the current frame image, it is once again determined whether or not the vanishing point vVPk[Nmin] obtained at that time is to be set as the vanishing point for the time t (the current time). In the case where the high-level vanishing point estimation judgment portion 220 has determined the vanishing point vVPk[Nmin] as the vanishing point of the time t (the current time), the high-level vanishing point estimation judgment portion 220 outputs information causing the vanishing point selection portion 201 to select the vanishing point vVPk[Nmin], as well as outputting, to the switching portion 401, a vanishing point switching signal that causes the vanishing point vVPk outputted from the vanishing point selection portion 201 to be inputted into the depth estimation portion 4. In such a case, the high-level vanishing point estimation judgment portion 220 outputs a vanishing point estimation process prohibition signal to the vanishing point estimation portion 3', so that the vanishing point estimation portion 3' does not execute a vanishing point estimation process.

The high-level vanishing point estimation judgment portion 220 also outputs the image characteristic amount vGCmn of the time t (the current time) to the holding memory 202.

Information regarding the image internal characteristic amount and vanishing point vVPk for each frame image is stored in the holding memory 202; the holding memory 202 holds that information and outputs it to the high-level vanishing point estimation judgment portion 220 or the vanishing point selection portion 201 in response to requests from those respective portions.

The vanishing point selection portion 201 takes, as its input, the information outputted from the high-level vanishing point estimation judgment portion 220 that causes the vanishing point vVPk[Nmin] to be selected, and outputs the vanishing point vVPk[Nmin] to the switching portion 401 based on the information that causes the vanishing point vVPk[Nmin] to be selected.

The switching portion 401 is a selector that outputs either the output from the vanishing point estimation portion 3' or the output from the vanishing point selection portion 201 to the depth estimation portion 4. The switching portion 401 switches based on a vanishing point switch control signal outputted from the high-level vanishing point estimation judgment portion 220 so that either the output from the vanishing point estimation portion 3' or the output from the vanishing point selection portion 201 is outputted to the depth estimation portion 4.

In the case where the vanishing point estimation process prohibition signal has been outputted from the high-level vanishing point estimation judgment portion 220, the vanishing point estimation portion 3' does not execute the vanishing point estimation process. Aside from this, the configuration of the vanishing point estimation portion 3' is the same as the vanishing point estimation portion 3 from the previous embodiments.

<5.2: Operation of the Image Processing Device>

Next, the operation of the image processing device 5000 shall be described using FIGS. 31 to 33.

Similar to the second embodiment, with the image processing device 5000, an interest level Si[t] is found by the high-interest level estimation portion 102 based on the brightness contrast amount RKi and the color contrast amount RCi of a pixel i(x,y) within the frame image in the current time t.

The image processing device 5000 then determines the vanishing point vVPk for this time t in the following manner.

First, as in the fourth embodiment, the high-level vanishing point estimation judgment portion 220 judges whether or not to cause the vanishing point estimation portion 3' to execute the vanishing point estimation process on the current frame image (the frame image of the current time t). This judgment is carried out so that the following are executed:

(1) so that fluctuation in the vanishing point information, due to fluctuations in the border information and so on caused by external light, is inhibited; and (2) so that the vanishing point of the current frame is substituted for the vanishing point of the frame Nmin, which is a frame processed in the past and has a similar image characteristic amount to that of the current frame, thereby reducing the estimation time.

As shown in FIG. 32, an image characteristic amount vGCmn[t−p]=(AKmn[t−p], AVmn[t−p]) in the frame [t−p] in a frame time tt=t−p (where m=1, ..., M, and n=1, ..., N) to an image characteristic amount vGCmn[t−1]=(AKmn[t−1], AVmn[t−1]) in the frame [t−1] in a frame time tt=t−1 (where m=1, ..., M, and n=1, ..., N) is read out from the holding memory 202. The high-level vanishing point estimation judgment portion 220 then finds an image characteristic amount vGCmn[t]=(AKmn[t], AVmn[t]) (where m=1, ..., M, and n=1, ..., N) in a frame [t] in the current time tt=t and an evaluation function Err[tt] of the frame [tt] using the following (Formula 30). The frame tt=Nmin, in which the evaluation function Err[tt] is minimum, and an evaluation function Err[Nmin] are found, and in the case where the value of the evaluation function Err[Nmin] is lower than a predetermined threshold ThErr, the vanishing point information vVPk[Nmin] in a previous frame tt=Nmin is taken as the vanishing point vVPk[t], or vVPk[Nmin], in the frame image at the current time t.

(Formula 30)

$$Err[tt] = \sum_m \sum_n \left\{ \begin{array}{l} w_k \cdot (AK_{mn}[t-tt] - AK_{mn}[t])^2 + \\ w_v \cdot (AV_{mn}[t-tt] - AV_{mn}[t])^2 \end{array} \right\} \quad (30)$$

Here, AKmn[tt] indicates mean brightness information in a block mn within the frame image in the time tt, whereas AVmn[tt] indicates mean saturation information in a block mn within the frame image in the time tt. In (Formula 30), wk is a weighting coefficient applied to the square error of the mean brightness component, whereas wv is a weighting coefficient applied to the square error of the mean saturation component.

In this manner, the image processing device 5000 can achieve the goals listed above as (1) and (2) by taking the mean brightness information and mean saturation information of blocks into which an image has been divided as the characteristic amount of the current frame image, comparing that image characteristic amount with the image characteristic amount of images of past frame times, and using, as the vanishing point information of the current frame, the vanishing point information used in the frame Nmin that has a similar image characteristic amount. Particularly regarding (1) above, contradictions in the sense of distance resulting from scene changes can be resolved by substituting the vanishing point of the current frame image with a vanishing point of a frame image processed in the past that has an image characteristic amount similar to that of the current frame image. In other words, the image processing device 5000 can also reduce abnormalities felt due to the depth correction occurring when an object A, which appears to be in the foreground of an image at time (t−1), suddenly appears in the background due to a scene change at time t. There is also the possibility that such a fluctuation in the vanishing point will occur not only due to scene changes but also due to changes in the movement of a main object. The image processing device 5000 is capable of reducing abnormalities felt due to the depth correction even in such cases where there is the possibility of such a fluctuations in the vanishing point occurring.

Although the mean brightness information and mean saturation information within the blocks into which the image has been divided has been used here as the image characteristic amount of the image in the frame time tt, it should be noted that the image characteristic amount may be found using the brightness contrast amount RKi[tt] and the color contrast amount RCi[tt] used by the high-interest level estimation portion 102 to estimate the interest level Si. To be more specific, the respective mean values of the brightness contrast amount RKi[tt] and the color contrast amount RCi[tt] within the blocks, into which the image has been divided, are found, and a mean brightness contrast amount ARKmn[tt] and a mean color contrast amount ARCmn[tt], which are the stated mean values, may be used as the image characteristic amount.

If it has been determined by the high-level vanishing point estimation judgment portion 220 that the vanishing point information vVPk[Nmin] in the past frame tt=Nmin is to be taken as the vanishing point vVPk[t]=vVPk[Nmin] of the frame image at the current time t, the vanishing point vVPk[t]=vVPk[Nmin] is outputted by the vanishing point selection portion 201 to the switching portion 401; the output of the vanishing point selection portion 201 is then inputted to the depth estimation portion 4 based on the vanishing point switch control signal from the high-level vanishing point estimation judgment portion 220, and the depth estimation portion 4 then performs its processing. At this time, the vanishing point estimation process prohibition signal from the high-level vanishing point estimation judgment portion 220 is outputted to the vanishing point estimation portion 3', and thus the vanishing point estimation portion 3' does not execute the vanishing point estimation process.

On the other hand, if it has been determined by the high-level vanishing point estimation judgment portion 220 that the vanishing point of a past frame image is not to be used, the vanishing point estimation portion 3' finds the vanishing point information vVPk in the current frame image in the same manner as in the first through third embodiments. The output of the switching portion 401 is then controlled so that the output of the vanishing point estimation portion 3' is inputted into the depth estimation portion 4, based on the vanishing point switch control signal from the high-level vanishing point estimation judgment portion 220. The depth estimation portion 4 then performs the same processes as described in the previous embodiments.

The degree of depth fbi of the pixel i(x,y) and the correction gain Gi are found by the depth estimation portion 4 based on the vanishing point information vVPk and the interest level Si obtained as described here, after which the depth correction portion 5 performs a depth correction process on the input image signal vIi based on the correction gain Gi.

As described thus far, in addition to the depth correction effects obtained through the vanishing point information and the interest level Si estimated based on the brightness contrast and color contrast discussed in the second embodiment, the image processing device 5000 of the fifth embodiment substitutes the vanishing point in the frame image at time t (the current frame image) with vanishing point information of past frame images (frame images from time t−p to time t−1) that have image characteristic amounts similar to the image characteristic amount of the current frame image. Through this, the image processing device 5000 can suppress abnormalities felt due to the depth correction that arise through fluctuations in the vanishing point extraction caused by ambient light and so on, abnormalities felt due to the depth correction that arise through changes in the vanishing point caused by movement of objects in the image, and so on, as well as reducing the amount of processing performed.

Although the mean saturation AVmn[tt] is used in FIG. 32, it should be noted that a mean hue AHmn[tt] or a mean color difference may be used as well.

Figure 34:
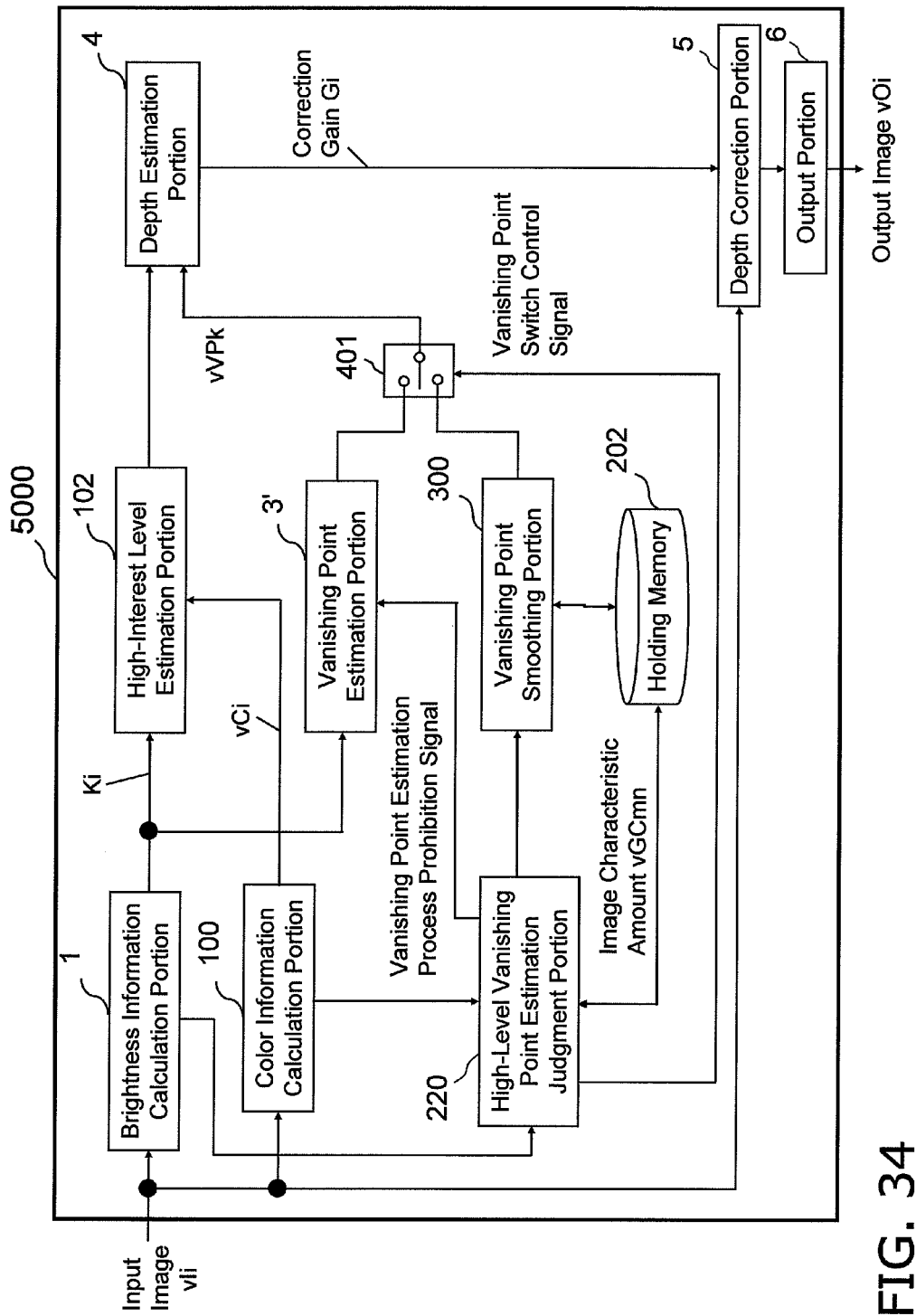
FIG. 34 is a block diagram illustrating another configuration of an image processing device according to the fifth embodiment of the present invention.

Meanwhile, in the case where the high-level vanishing point estimation judgment portion 220 has judged that the vanishing point estimation is not to be carried out, rather than selecting the vanishing point vVPk[Nmin] of the appropriate frame image Nmin from among the vanishing point vVPk[t−p] in the (t−p) frame time to the vanishing point vVPk[t−1] in the (t−1) frame time, a value resulting from a vanishing point smoothing portion 300 smoothing the information of a total of p number of vanishing points which span from the vanishing point vVPk[t−p] in the (t−p) frame time to the vanishing point in the (t−1) frame time may be found, as illustrated in FIG. 34; the image processing device 5000 may then substitute that smoothed value for the vanishing point information of the current frame image. In this case, the smoothing process may be carried out by simply averaging the corresponding vanishing point information, or a smoothing process as described in the previous embodiment may be carried out, whereby a weighting coefficient weight[tt] in the frame time tt is controlled using a Gaussian distribution. By performing such a process, the image processing device 5000 can reduce detrimental effects caused by vanishing point flicker more effectively than when substituting the vanishing point of the current frame image with a single appropriate vanishing point.

Sixth Embodiment

Figure 35:
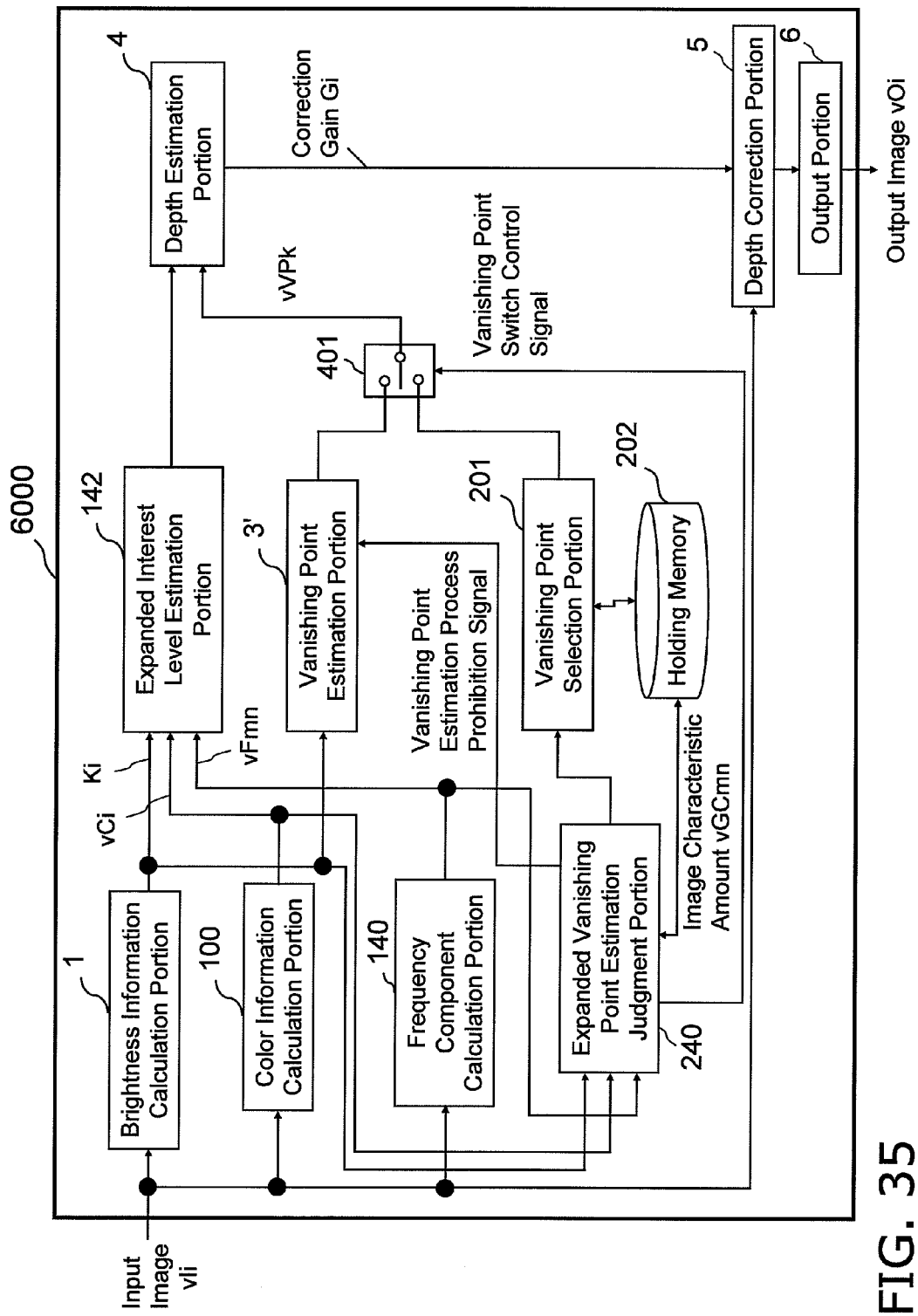
FIG. 35 is a block diagram illustrating the configuration of an image processing device according to a sixth embodiment of the present invention.
Figure 36:
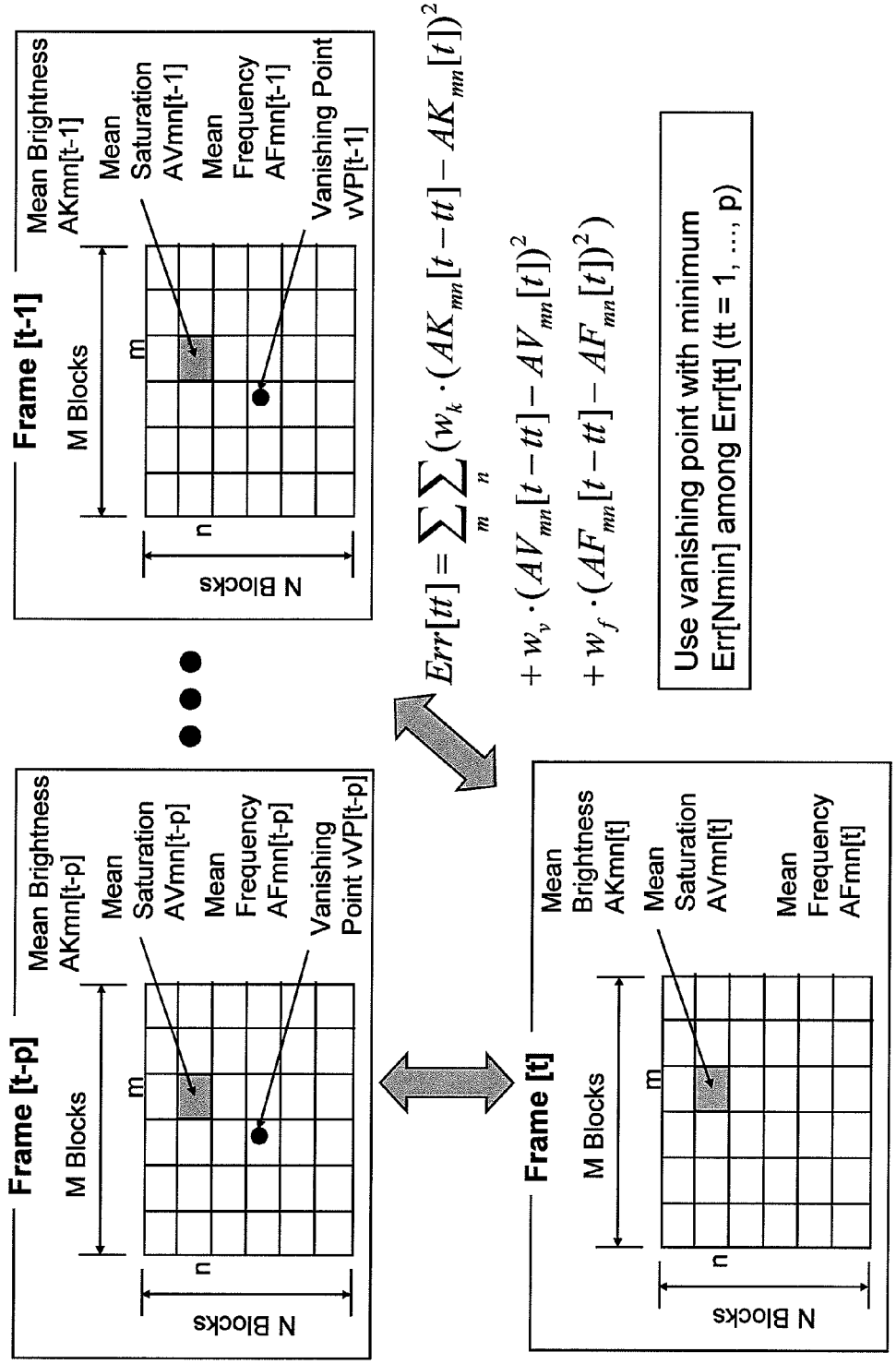
FIG. 36 is a diagram illustrating an example of the details stored within a holding memory according to the sixth embodiment.
Figure 37:
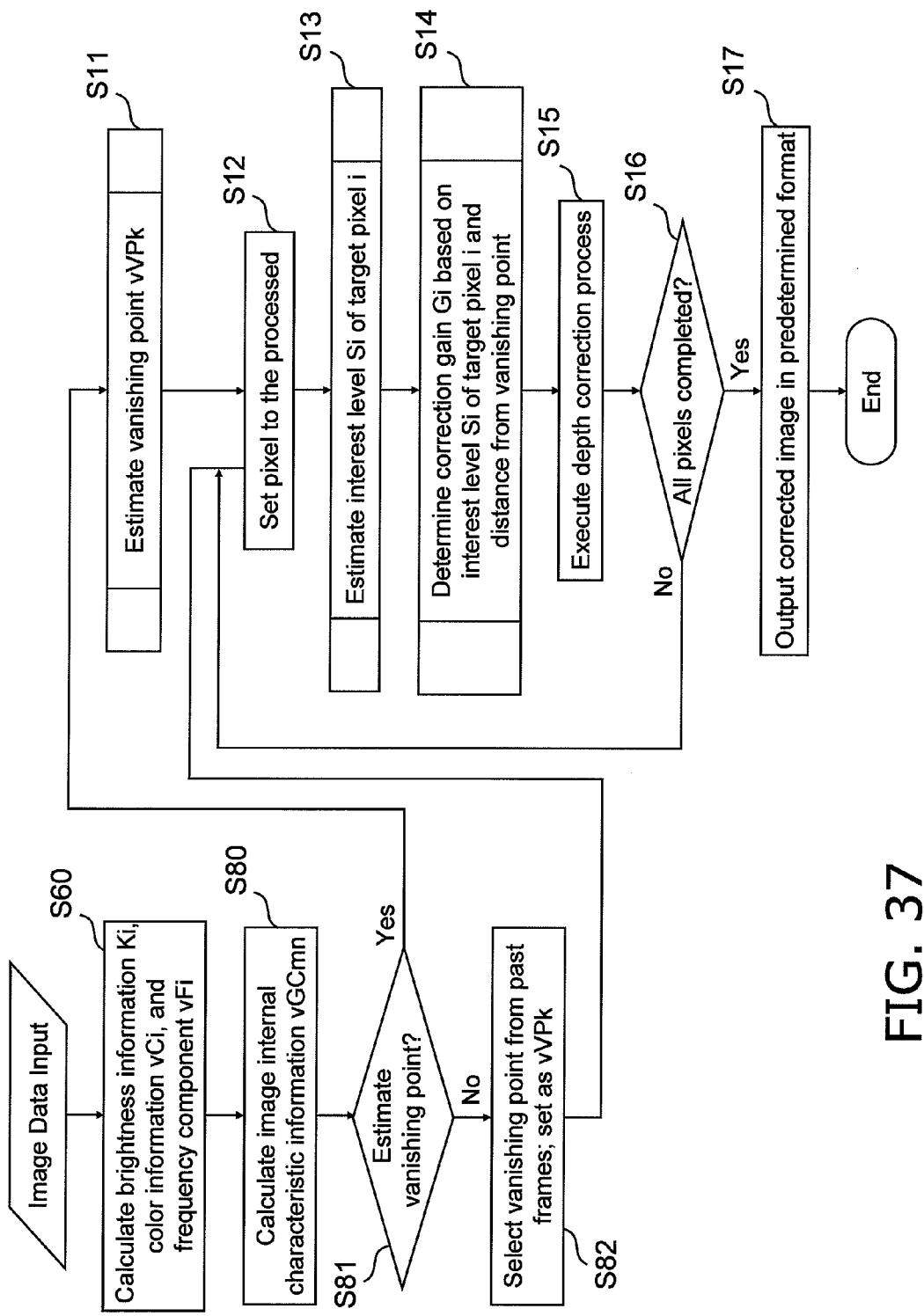
FIG. 37 is a flowchart illustrating the entirety of an image processing method according to the sixth embodiment of the present invention.

An image processing method and an image processing device, which estimate depth information for a pixel based on a vanishing point and an interest level and carry out correction on that pixel, shall be described as a sixth embodiment of the present invention, with reference to FIGS. 35 through 37.

FIG. 35 illustrates the configuration of an image processing device 6000 according to the sixth embodiment of the invention. FIG. 37 is a flowchart illustrating processes performed in the image processing method according to the sixth embodiment.

FIG. 36 is a descriptive diagram illustrating an image characteristic amount vGCmn (where m=1, . . . , M, and n=1, . . . , N) used for judgment by an expanded vanishing point estimation judgment portion 240 according to the present embodiment. Here, M and N are predetermined positive constants, where M indicates the number of blocks into which an image has been divided in the horizontal direction (x direction) and N indicates the number of blocks into which the image has been divided in the vertical direction (y direction). Note that when the processing described in the present invention is carried out on, for example, a high-definition television image, it is preferable to set the block size to 16×16 pixels, 32×32 pixels, 64×64 pixels, or the like.

<6.1: Configuration of the Image Processing Device>

The image processing device 6000 according to the sixth embodiment differs from the image processing device 3000 according to the third embodiment in that the expanded vanishing point estimation judgment portion 240, a vanishing point selection portion 201, a holding memory 202, and a switching portion 401 have been added, and the vanishing point estimation portion 3 has been replaced with a vanishing point estimation portion 3'.

It should be noted that with the image processing device 6000 according to the present embodiment, portions that are the same as those of the previous embodiments shall be assigned the same reference numerals, and descriptions thereof shall be omitted.

As shown in FIG. 35, the expanded vanishing point estimation judgment portion 240 takes, as its input, the brightness information Ki outputted from the brightness information calculation portion 1, the color information vCi outputted from the color information calculation portion 100, the frequency information vFmn outputted from the frequency component calculation portion 140, and the image characteristic amount vGCmn outputted from the holding memory 202, and acquires, from the brightness information Ki, the color information vCi, and the frequency information vFmn, an image internal characteristic amount of the current frame image (the frame image in the current time t). The expanded vanishing point estimation judgment portion 240 then compares the image internal characteristic amount of the frame image in the current time t with image characteristic amounts (outputted from the holding memory 202) of p frame images processed in the past by the image processing device 6000 (that is, the frame images from time (t−p) to (t−1)), and if there is a frame image Nmin, processed in the past, that has a similar characteristic amount to the characteristic amount of the current frame image, it is determined whether or not the vanishing point vVPk[Nmin] obtained at that time is to be set once again as the vanishing point for the time t (the current time). In the case where the expanded vanishing point estimation judgment portion 240 has determined the vanishing point vVPk[Nmin] as the vanishing point of the time t (the current time), the expanded vanishing point estimation judgment portion 240 outputs information causing the vanishing point selection portion 201 to select the vanishing point vVPk[Nmin], as well as outputting, to the switching portion 401, a vanishing point switching signal that causes the vanishing point vVPk outputted from the vanishing point selection portion 201 to be inputted into the depth estimation portion 4. In such a case, the expanded vanishing point estimation judgment portion 240 outputs a vanishing point estimation process prohibition signal to the vanishing point estimation portion 3', so that the vanishing point estimation portion 3' does not execute a vanishing point estimation process.

The expanded vanishing point estimation judgment portion 240 also outputs the image characteristic amount vGCmn of the time t (the current time) to the holding memory 202.

Information regarding the image internal characteristic amount and vanishing point vVPk for each frame image is stored in the holding memory 202; the holding memory 202 holds that information and outputs it to the expanded vanishing point estimation judgment portion 240 or the vanishing point selection portion 201 in response to requests from those respective portions.

The vanishing point selection portion 201 takes, as its input, the information outputted from the expanded vanishing point estimation judgment portion 240 that causes the vanishing point vVPk[Nmin] to be selected, and outputs the vanishing point vVPk[Nmin] to the switching portion 401 based on the information that causes the vanishing point vVPk[Nmin] to be selected.

The switching portion 401 is a selector that outputs either the output from the vanishing point estimation portion 3' or the output from the vanishing point selection portion 201 to the depth estimation portion 4. The switching portion 401 switches based on a vanishing point switch control signal outputted from the high-level vanishing point estimation judgment portion 220 so that either the output from the vanishing point estimation portion 3' or the output from the vanishing point selection portion 201 is outputted to the depth estimation portion 4.

In the case where the vanishing point estimation process prohibition signal has been outputted from the high-level vanishing point estimation judgment portion 220, the vanishing point estimation portion 3' does not execute the vanishing point estimation process. Aside from this, the configuration of the vanishing point estimation portion 3' is the same as the vanishing point estimation portion 3 from the previous embodiments.

<6.2: Operation of the Image Processing Device>

Next, the operation of the image processing device 6000 shall be described using FIGS. 35 and 36.

Similar to the third embodiment, with the image processing device 6000, an interest level Si[t] is found by the expanded interest level estimation portion 142 based on the brightness contrast amount RKi, the color contrast amount RCi, and the frequency information vFmn (=vFi) of a pixel i(x,y) within the frame image in the current time t.

The image processing device 6000 then determines the vanishing point vVPk for this time t in the following manner.

First, as in the fourth embodiment, the expanded vanishing point estimation judgment portion 240 judges whether or not to cause the vanishing point estimation portion 3' to execute the vanishing point estimation process on the current frame image (the frame image of the current time t).

As shown in FIG. 36, an image characteristic amount vGCmn[t−p]=(AKmn[t−p], AVmn[t−p], AFmn[t−p]) in the frame [t−p] in a frame time tt=t−p (where m=1, ..., M, and n=1, ..., N) to an image characteristic amount vGCmn[t−1]= (AKmn[t−1], AVmn[t−1], AFmn[t−1]) in the frame [t−1] in a frame time tt=t−1 (where m=1, ..., M, and n=1, ..., N) is read out from the holding memory 202. The expanded vanishing point estimation judgment portion 240 then finds an image characteristic amount vGCmn[t]=(AKmn[t], AVmn[t], AFmn[t]) (where m=1, ..., M, and n=1, ..., N) in a frame [t] in the current time tt=t and an evaluation function Err[tt] of the frame [tt] using the following (Formula 31). The frame tt=Nmin, in which the evaluation function Err[tt] is minimum, and an evaluation function Err[Nmin] are found, and in the case where the value of the evaluation function Err[Nmin] is lower than a predetermined threshold ThErr, the vanishing point information vVPk[Nmin] in a previous frame tt=Nmin is taken as the vanishing point vVPk[t], or vVPk[Nmin], in the frame image at the current time t.

(Formula 31)

$$Err[tt] = \sum_m \sum_n \left\{ \begin{array}{l} w_k \cdot \left( \dfrac{AK_{mn}[t-tt]-}{AK_{mn}[t]} \right)^2 + w_v \cdot \\ \left( \dfrac{AV_{mn}[t-tt]-}{AV_{mn}[t]} \right)^2 + \\ w_f \cdot \left( \dfrac{AF_{mc}[t-tt]-}{AF_{mn}[t]} \right)^2 \end{array} \right\} \quad (31)$$

Here, AKmn[tt] indicates mean brightness information in a block mn within the frame image in the time tt, whereas AVmn[tt] indicates mean saturation information in a block mn within the frame image in the time tt. AFmn[tt] indicates a mean value of frequency components that are greater than a predetermined threshold frequency ThFreq (high-frequency components) within a block mn in the frame at time tt. In (Formula 31), wk is a weighting coefficient applied to the square error of the mean brightness component, wv is a weighting coefficient applied to the square error of the mean saturation component, and wf is a weighting coefficient applied to the square error of the mean frequency component. The "block" referred to here may be the same as that used in calculating the DCT coefficient, which is frequency information, as described in the third embodiment, or a larger-sized block may be used with consideration for a reduction in the holding memory. However, in the case where the block size differs from that used in the DCT coefficient calculation in the third embodiment, it is necessary for the frequency component calculation portion 140 to prepare DCT coefficients (in other words, frequency information vFmn) for the two block sizes.

In this manner, the image processing device 6000 can achieve the goals listed above as (1) and (2) by taking the mean brightness information, mean saturation information, and mean frequency component (that is, the mean frequency information of high-frequency components) of blocks into which an image has been divided as the characteristic amount of the current frame image, comparing that image characteristic amount with the image characteristic amount of images of past frame times, and using, as the vanishing point information of the current frame image, the vanishing point information used in the frame Nmin that has a similar image characteristic amount. Particularly regarding (1) above, contradictions in the sense of distance resulting from scene changes can be resolved by substituting the vanishing point of the current frame image with a vanishing point of a frame image processed in the past that has an image characteristic amount similar to that of the current frame image. In other words, the image processing device 6000 can also reduce abnormalities felt due to the depth correction occurring when an object A, which appears to be in the foreground of an image at time (t−1), suddenly appears in the background due to a scene change at time t. There is also the possibility that such a fluctuation in the vanishing point will occur not only due to scene changes but also due to changes in the movement of a main object. The image processing device 6000 is capable of reducing abnormalities felt due to the depth correction even in such cases where there is the possibility of such a fluctuations in the vanishing point occurring.

Although the mean brightness information, mean saturation information, and mean frequency component (that is, the mean frequency information of high-frequency components) within the blocks into which the image has been divided has been used here as the image characteristic amount of the image in the frame time tt, it should be noted that the image characteristic amount may be found using the brightness contrast amount RKi[tt] and the color contrast amount RCi[tt] used by the expanded interest level estimation portion 142 to estimate the interest level Si. To be more specific, the respective mean values of the brightness contrast amount RKi[tt] and the color contrast amount RCi[tt] within the blocks, into which the image has been divided, are found, and a mean brightness contrast amount ARKmn[tt] and a mean color contrast amount ARCmn[tt], which are the stated mean values, along with a sharpness amount RBi[tt], may be used as the image characteristic amount.

If it has been determined by the expanded vanishing point estimation judgment portion 240 that the vanishing point information vVPk[Nmin] in the past frame tt=Nmin is to be taken as the vanishing point vVPk[t]=vVPk[Nmin] of the frame image at the current time t, the vanishing point vVPk[t]=vVPk[Nmin] is outputted by the vanishing point selection portion 201 to the switching portion 401; the output of the vanishing point selection portion 201 is then inputted to the depth estimation portion 4 based on the vanishing point switch control signal from the expanded vanishing point estimation judgment portion 240, and the depth estimation portion 4 then performs its processing. At this time, the vanishing point estimation process prohibition signal from the expanded vanishing point estimation judgment portion 240 is outputted to the vanishing point estimation portion 3', and thus the vanishing point estimation portion 3' does not execute the vanishing point estimation process.

On the other hand, if it has been determined by the expanded vanishing point estimation judgment portion 240 that the vanishing point of a past frame is not to be used, the vanishing point estimation portion 3' finds the vanishing point information vVPk in the current frame image in the same manner as in the first through third embodiments. The output of the switching portion 401 is then controlled so that the output of the vanishing point estimation portion 3' is inputted into the depth estimation portion 4, based on the vanishing point switch control signal from the expanded vanishing point estimation judgment portion 240. The depth estimation portion 4 then performs the same processes as described in the previous embodiments.

The degree of depth fbi of the pixel i(x,y) and the correction gain Gi are found by the depth estimation portion 4 based on the vanishing point information vVPk and the interest level Si obtained as described here, after which the depth correction portion 5 performs a depth correction process on the input image signal vIi based on the correction gain Gi.

As described thus far, in addition to the depth correction effects obtained through the vanishing point information and the interest level Si estimated based on the brightness contrast, color contrast, and degree of blurriness caused by the high-frequency component discussed in the third embodiment, the image processing device 6000 of the sixth embodiment substitutes the vanishing point in the frame image at the current time t (the current frame image) with vanishing point information of past frame images (frame images from time t−p to time t−1) that have image characteristic amounts similar to the image characteristic amount of the current frame image. Through this, the image processing device 6000 can suppress abnormalities felt due to the depth correction that arise through fluctuations in the vanishing point extraction caused by ambient light and so on, abnormalities felt due to the depth correction that arise through changes in the vanishing point caused by movement of objects in the image, and so on, as well as reducing the amount of processing performed.

Although the mean saturation AVmn[tt] is used in FIG. 36, it should be noted that a mean hue AHmn[tt] or a mean color difference may be used as well.

Figure 38:
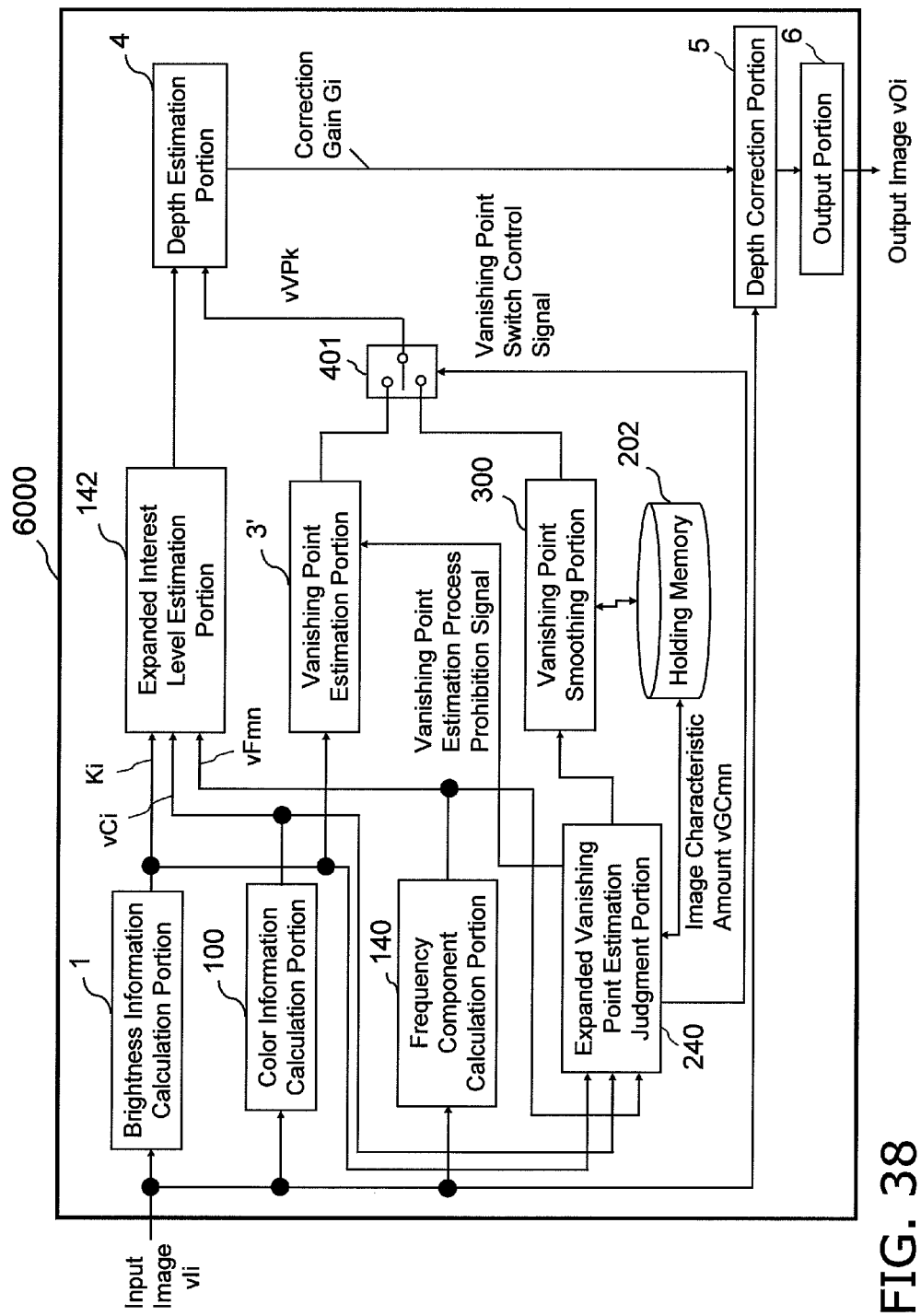
FIG. 38 is a block diagram illustrating another configuration of the image processing device according to the sixth embodiment of the present invention.

Meanwhile, in the case where the expanded vanishing point estimation judgment portion 240 has judged that the vanishing point estimation is not to be carried out, rather than selecting the vanishing point vVPk[Nmin] of the appropriate frame image Nmin from among the vanishing point vVPk[t−p] in the (t−p) frame time to the vanishing point vVPk[t−1] in the (t−1) frame time, a value resulting from a vanishing point smoothing portion 300 smoothing the information of a total of p number of vanishing points which span from the vanishing point vVPk[t−p] in the (t−p) frame time to the vanishing point in the (t−1) frame time may be found, as illustrated in FIG. 38; the image processing device 6000 may then substitute that smoothed value for the vanishing point information of the current frame image. In this case, the smoothing process may be carried out by simply averaging the corresponding vanishing point information, or a smoothing process as described in the previous embodiment may be carried out, whereby a weighting coefficient weight[tt] in the frame time tt is controlled using a Gaussian distribution. By performing such a process, the image processing device 6000 can reduce detrimental effects caused by vanishing point flicker more effectively than when substituting the vanishing point of the current frame image with a single appropriate vanishing point.

Seventh Embodiment

Figure 39:
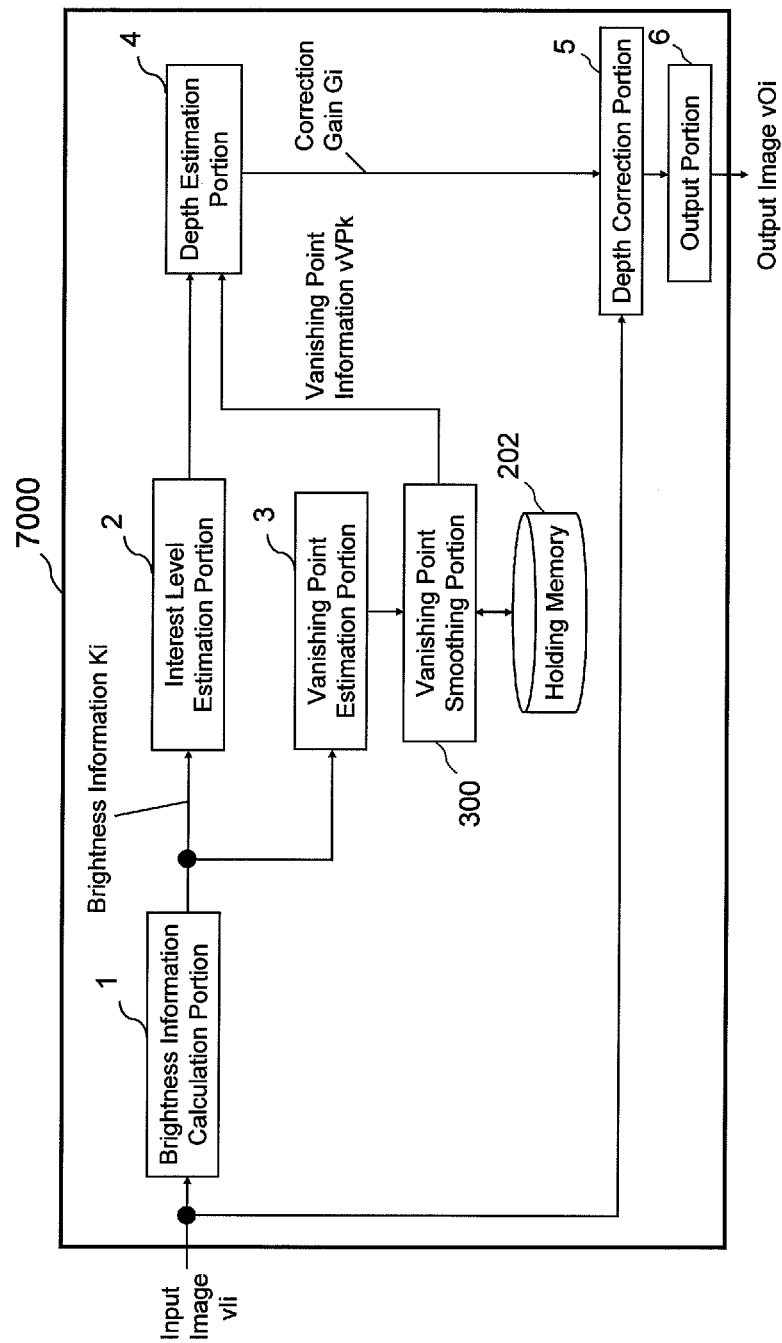
FIG. 39 is a block diagram illustrating the configuration of an image processing device according to a seventh embodiment of the present invention.
Figure 40:
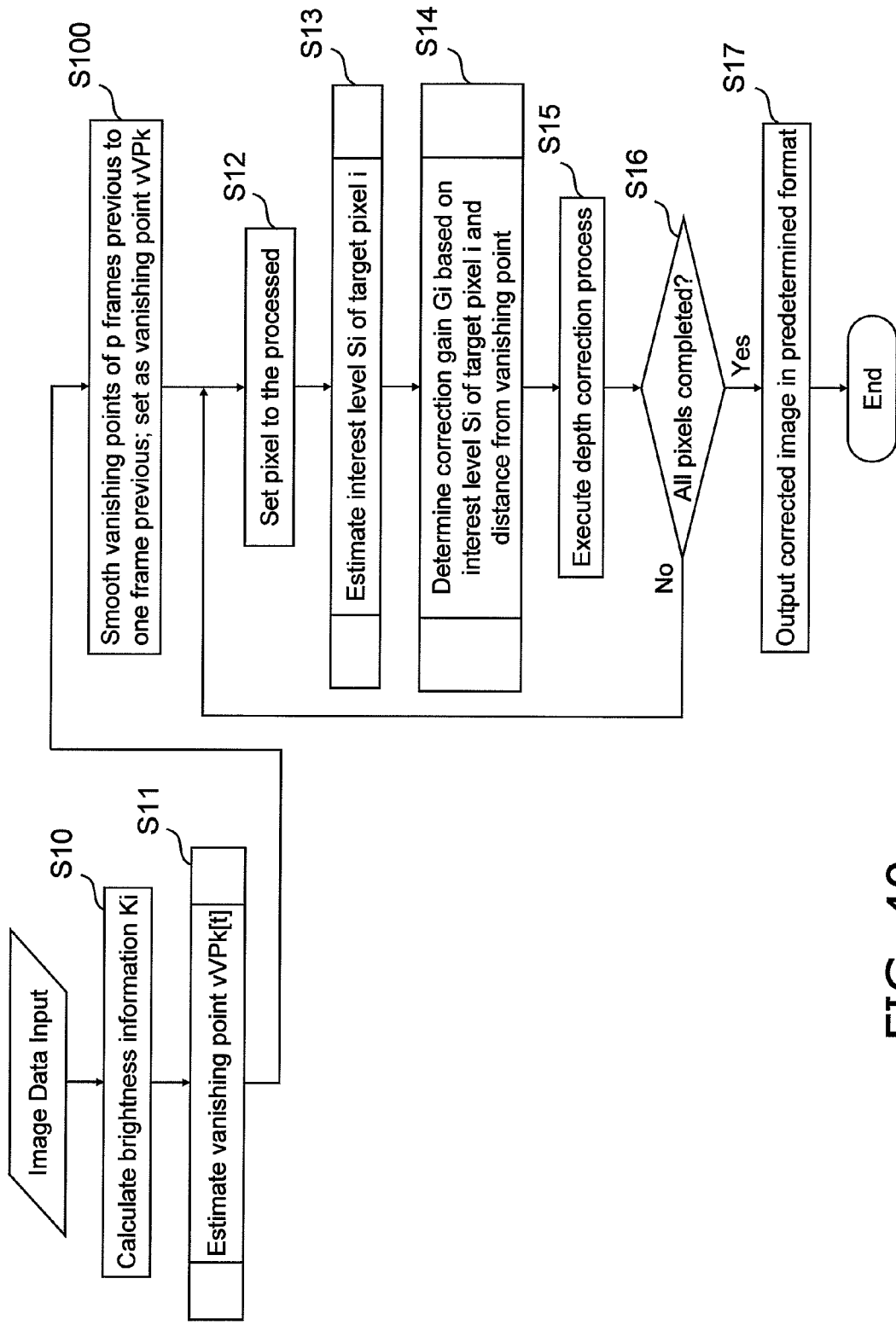
FIG. 40 is a flowchart illustrating the entirety of an image processing method according to the seventh embodiment of the present invention.

An image processing method and an image processing device, which estimate depth information for a pixel based on a vanishing point and an interest level and carry out correction on that pixel, shall be described as a seventh embodiment of the present invention, with reference to FIGS. 39 through 40.

FIG. 39 illustrates the configuration of an image processing device 7000 according to the seventh embodiment of the invention.

FIG. 40 is a flowchart illustrating processes performed in the image processing method according to the seventh embodiment.

<7.1: Configuration of the Image Processing Device>

As illustrated in FIGS. 39 and 40, the image processing device 7000 according to the seventh embodiment differs from the image processing device 1000 according to the first embodiment in that a vanishing point smoothing portion 300 and a holding memory 202 have been added.

It should be noted that with the image processing device 7000 according to the present embodiment, portions that are the same as those of the previous embodiments shall be assigned the same reference numerals, and descriptions thereof shall be omitted.

<7.2: Operation of the Image Processing Device>

Next, the operation of the image processing device 7000 shall be described.

Similar to the first embodiment, with the image processing device 7000, an interest level Si[t] is found by the interest level estimation portion 2 based on the brightness contrast amount RKi of a pixel i(x,y).

Meanwhile, the vanishing point information vVPk[t] in the current frame image (the frame image at the time t) is found by the vanishing point estimation portion 3. After this, a smoothing process is carried out on the vanishing point information vVPk[t] in the frame time t, using a total of p number of frame images from the vanishing point information vVPk[t−p] in time (t−p), which is p amount of frame time previous to the current frame time t, to the vanishing point information vVPk [t−1] in time (t−1). In such a case, the smoothing process may be carried out by simply averaging the components of the vanishing point information vVPk[mm] from (t−p) to t (where mm=t−p, . . . , t); however, here, the smoothing process is executed through a process that utilizes the following (Formula 32).

(Formula 32)

weight[*tt*]=exp(−*DelKeisu*×*tlen*)

*tlen*=(*tt*−*t*)² (32)

The weight[tt] in (Formula 32) is a weighting coefficient applied to the vanishing point of the frame tt that is to be smoothed (where tt=t−p, . . . , t), and is a Gaussian distribution that takes the time t as its center. DelKeisu is a predetermined positive constant indicating the degree of variance at that time.

Through these processes, the image processing device 7000 can suppress fluctuations in the vanishing point information arising due to fluctuations in border information and so on caused by external light, and resolve contradictions in the sense of distance (abnormalities felt due to the depth correction) caused by scene changes between frames. In other words, the image processing device 7000 can also resolve abnormalities felt due to the depth correction occurring when an object A, which appears to be in the foreground of an image at time (t−1), suddenly appears in the background due to a scene change at time t. There is also the possibility that such a fluctuation in the vanishing point will occur not only due to scene changes but also due to changes in the movement of a main object. The image processing device 7000 is capable of reducing abnormalities felt due to the depth correction even in such cases where there is the possibility of such a fluctuations in the vanishing point occurring.

Although the vanishing point information found by executing a smoothing process on the vanishing point information from the past frames from time (t−p) to time t is used as the vanishing point information for the current frame image here, it should be noted that vanishing point information found by executing a smoothing process on the vanishing point information vVPk[mm] from the past frame time (t−p) to a frame time (t+p), taking the current time t as the center, may be used as the vanishing point information of the time t (where mm=t−p, . . . , t+p). Note, however, that delay occurs in the depth correction process in this case.

Furthermore, each frame time is not limited to a single vanishing point. In the case where the number of vanishing points NN[t] in each frame time is the same, a corresponding number (that is, corresponding to the number of vanishing points) of smoothing processes are executed (for example, when there is n number of vanishing points, smoothing processes are executed for each of the n number of vanishing points). Meanwhile, in the case where the number of vanishing points NN[t] in each frame time is different, the smoothing process may be executed having selected candidates that are close in distance (that is, distance with respect to two-dimensional coordinates within each frame image) to vVPk [t] from among vanishing points vVPs[tt] within frames tt=t−p, . . . , t−1 to be smoothed (where s=1, . . . , NN[tt]), based on the vanishing point vVPk[t] in the current time t (where k=1, . . . , NN[t]). At this time, if there is no vanishing point information within the frame tt=t−p, . . . , t−1 for which the distance from vVPk[t] is lower than a predetermined value, a process that removes the vanishing point information of that frame image (the frame image at time tt) from being a target of the smoothing process may be executed.

With the image processing device 7000, the degree of depth fbi of the pixel i(x,y) and the correction gain Gi are found by the depth estimation portion 4 based on the vanishing point information vVPk obtained through the smoothing process described above and the interest level Si; the depth correction portion 5 then performs a depth correction process on the input image signal vIi based on the correction gain Gi.

As described thus far, in addition to the depth correction effects obtained through the vanishing point information and the interest level Si estimated based on the brightness contrast discussed in the first embodiment, the image processing device 7000 of the seventh embodiment performs a smoothing process on the vanishing point information of past frame images from time t−p to time t−1, thereby once again finding the vanishing point information for the current time t. Through this, the image processing device 7000 can inhibit abnormalities felt due to the depth correction that arise through fluctuations in the vanishing point extraction caused by ambient light and so on, abnormalities felt due to the depth correction that arise through changes in the vanishing point caused by movement of objects in the image, and so on.

Eighth Embodiment

Figure 41:
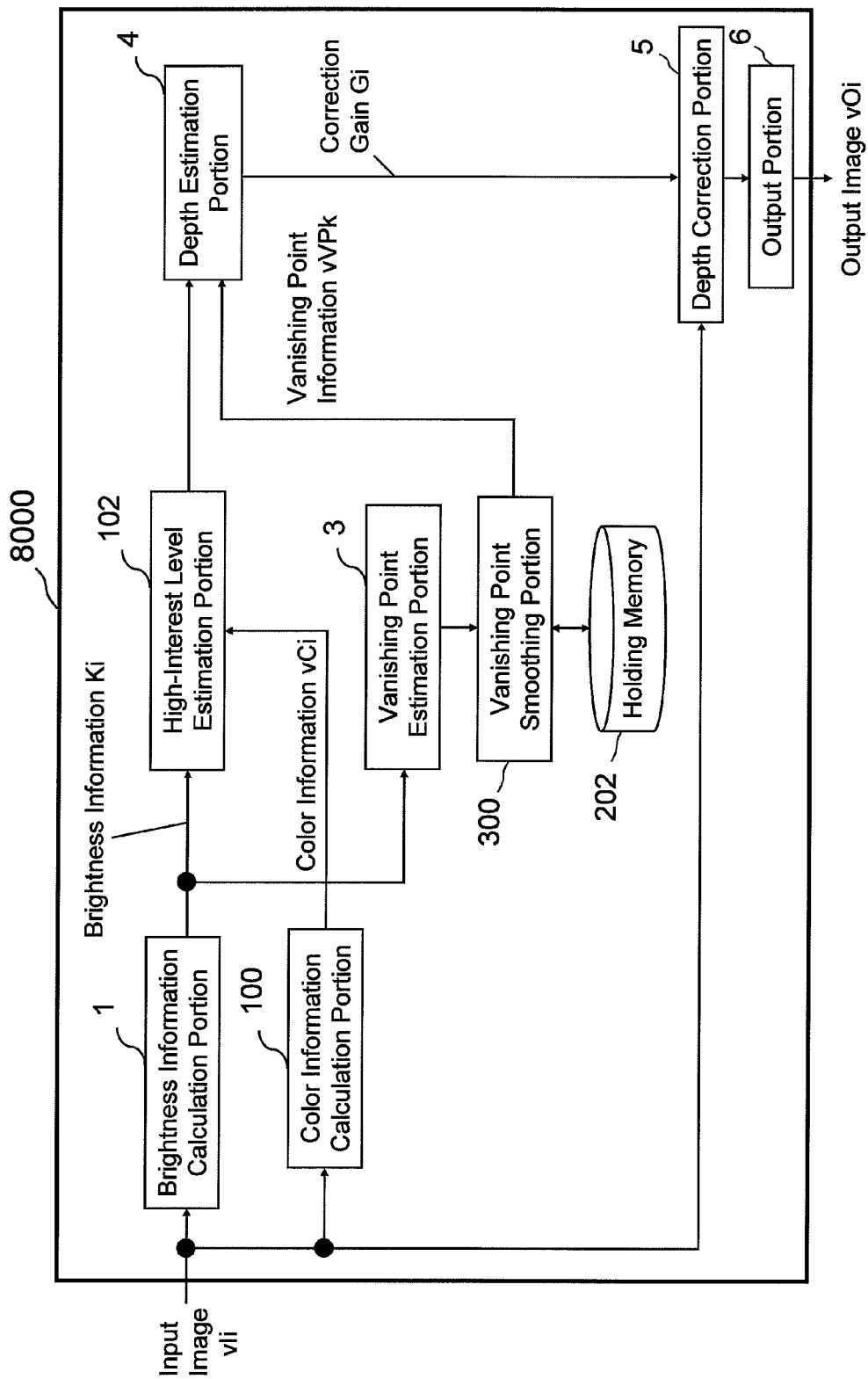
FIG. 41 is a block diagram illustrating the configuration of an image processing device according to an eighth embodiment of the present invention.
Figure 42:
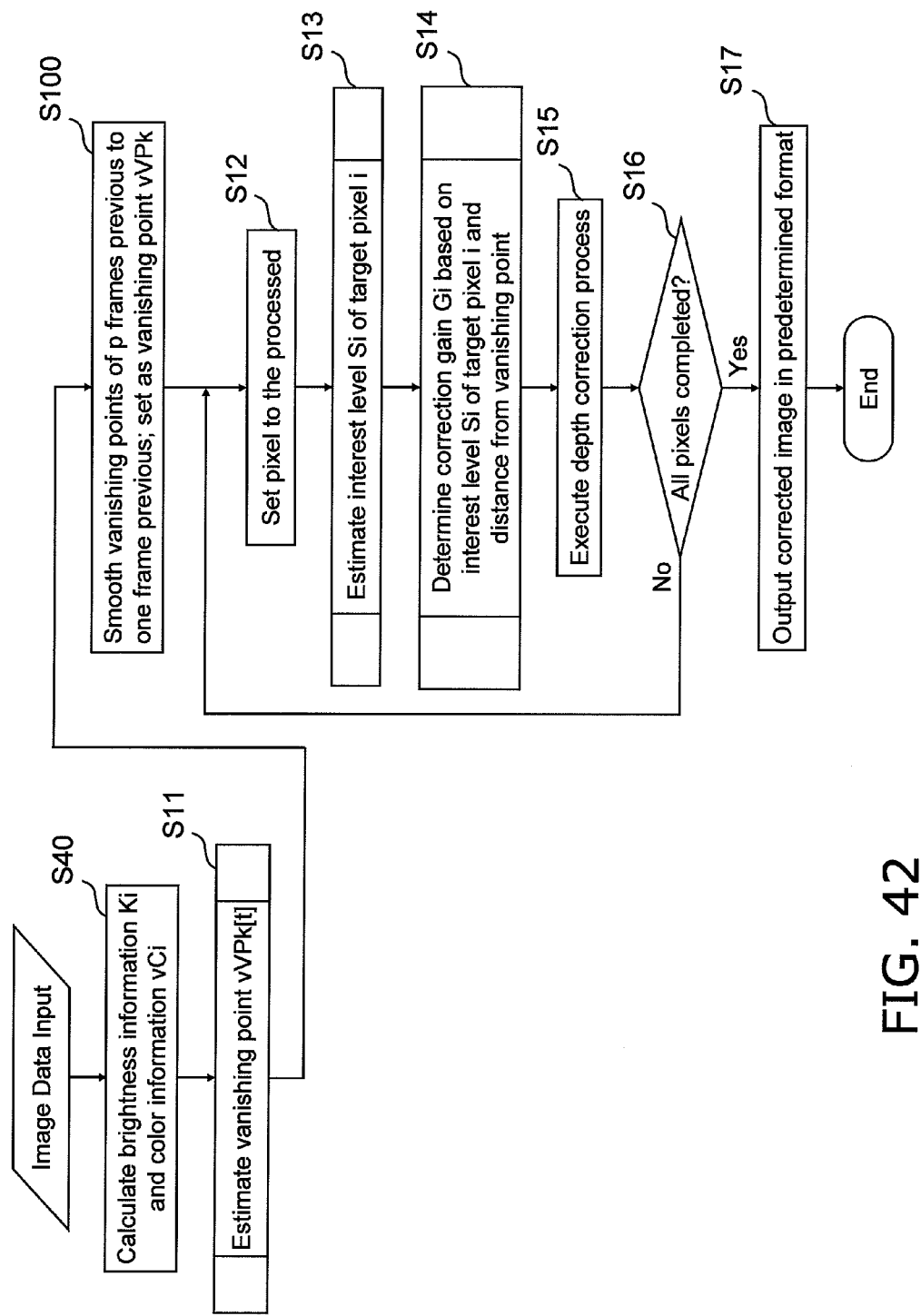
FIG. 42 is a flowchart illustrating the entirety of an image processing method according to the eighth embodiment of the present invention.

An image processing method and an image processing device, which estimate depth information for a pixel based on a vanishing point and an interest level and carry out correction on that pixel, shall be described as an eighth embodiment of the present invention, with reference to FIGS. 41 and 42.

FIG. 41 illustrates the configuration of an image processing device 8000 according to the eighth embodiment of the present invention. FIG. 42 is a flowchart illustrating processes performed in the image processing method according to the eighth embodiment.

<8.1: Configuration of the Image Processing Device>

As illustrated in FIGS. 41 and 42, the image processing device 8000 according to the eighth embodiment differs from the image processing device 2000 according to the second embodiment in that a vanishing point smoothing portion 300 and a holding memory 202 have been added.

It should be noted that with the image processing device 8000 according to the present embodiment, portions that are the same as those of the previous embodiments shall be assigned the same reference numerals, and descriptions thereof shall be omitted.

<8.2: Operation of the Image Processing Device>

Next, the operation of the image processing device 8000 shall be described.

Similar to the second embodiment, with the image processing device 8000, an interest level Si[t] is found by the high-interest level estimation portion 102 based on the brightness contrast amount RKi and the color contrast amount RCi of a pixel i(x,y).

Meanwhile, the vanishing point information vVPk[t] in the current frame image (the frame image at the time t) is found by the vanishing point estimation portion 3. After this, a smoothing process is carried out on the vanishing point information vVPk[t] in the frame time t, using a total of p number of frame images from the vanishing point information vVPk [t−p] in time (t−p), which is p amount of frame time previous to the current frame time t, to the vanishing point information vVPk [t−1] in time (t−1). In such a case, the smoothing process may be carried out by simply averaging the components of the vanishing point information vVPk[mm] from (t−p) to t (where mm=t−p, . . . , t); however, here, the smoothing process is executed by controlling a weighting coefficient applied to each frame time tt (where tt=t−p, . . . , t−1, t) through (Formula 32), as in the seventh embodiment.

Through these processes, the image processing device 8000 can suppress fluctuations in the vanishing point information arising due to fluctuations in border information and so on caused by external light, and resolve contradictions in the sense of distance caused by scene changes between frames. In other words, the image processing device 8000 can resolve abnormalities felt due to the depth correction occurring when an object A, which appears to be in the foreground of an image at time (t−1), suddenly appears in the background due to a scene change at time t.

Although here, the vanishing point information from the past frame time (t−p) to time t is smoothed, it should be noted that vanishing point information found by executing a smoothing process on the vanishing point information vVPk [mm] from past frame time (t−p) to a frame time (t+p), taking the current time t as the center, may be used as the vanishing point information of the time t (where mm=t−p, . . . , t+p). Note, however, that delay occurs in the depth correction process in this case.

Furthermore, each frame time is not limited to a single vanishing point. In the case where the number of vanishing points NN[t] in each frame time is the same, a corresponding number (that is, corresponding to the number of vanishing points) of smoothing processes are executed (for example, when there is n number of vanishing points, smoothing processes are executed for each of the n number of vanishing points). Meanwhile, in the case where the number of vanishing points NN[t] in each frame time is different, the smoothing process may be executed having selected candidates that are close in distance (that is, distance with respect to two-dimensional coordinates within each frame image) to vVPk [t] from among vanishing points vVPs[tt] within frames tt=t−p, . . . , t−1 to be smoothed (where s=1, . . . , NN[tt]), based on the vanishing point vVPk[t] in the current time t (where k=1, . . . , NN[t]). At this time, if there is no vanishing point information within the frame tt=t−p, . . . , t−1 for which the distance from vVPk[t] is lower than a predetermined value, a process that removes the vanishing point information of that frame image (the frame image at time tt) from being a target of the smoothing process may be executed.

With the image processing device 8000, the degree of depth fbi of the pixel i(x,y) and the correction gain Gi are found by the depth estimation portion 4 based on the vanishing point information vVPk obtained through the smoothing process described above and the interest level Si; the depth correction portion 5 then performs a depth correction process on the input image signal vIi based on the correction gain Gi.

As described thus far, in addition to the effects obtained through the interest level Si, which has been accurately estimated based on the brightness contrast/color contrast as described in the second embodiment, the image processing device 8000 according to the eighth embodiment can also achieve an effect of suppressing fluctuations in the vanishing point information based on the smoothing process carried out with vanishing points in past frame times, as described in the seventh embodiment.

Ninth Embodiment

Figure 43:
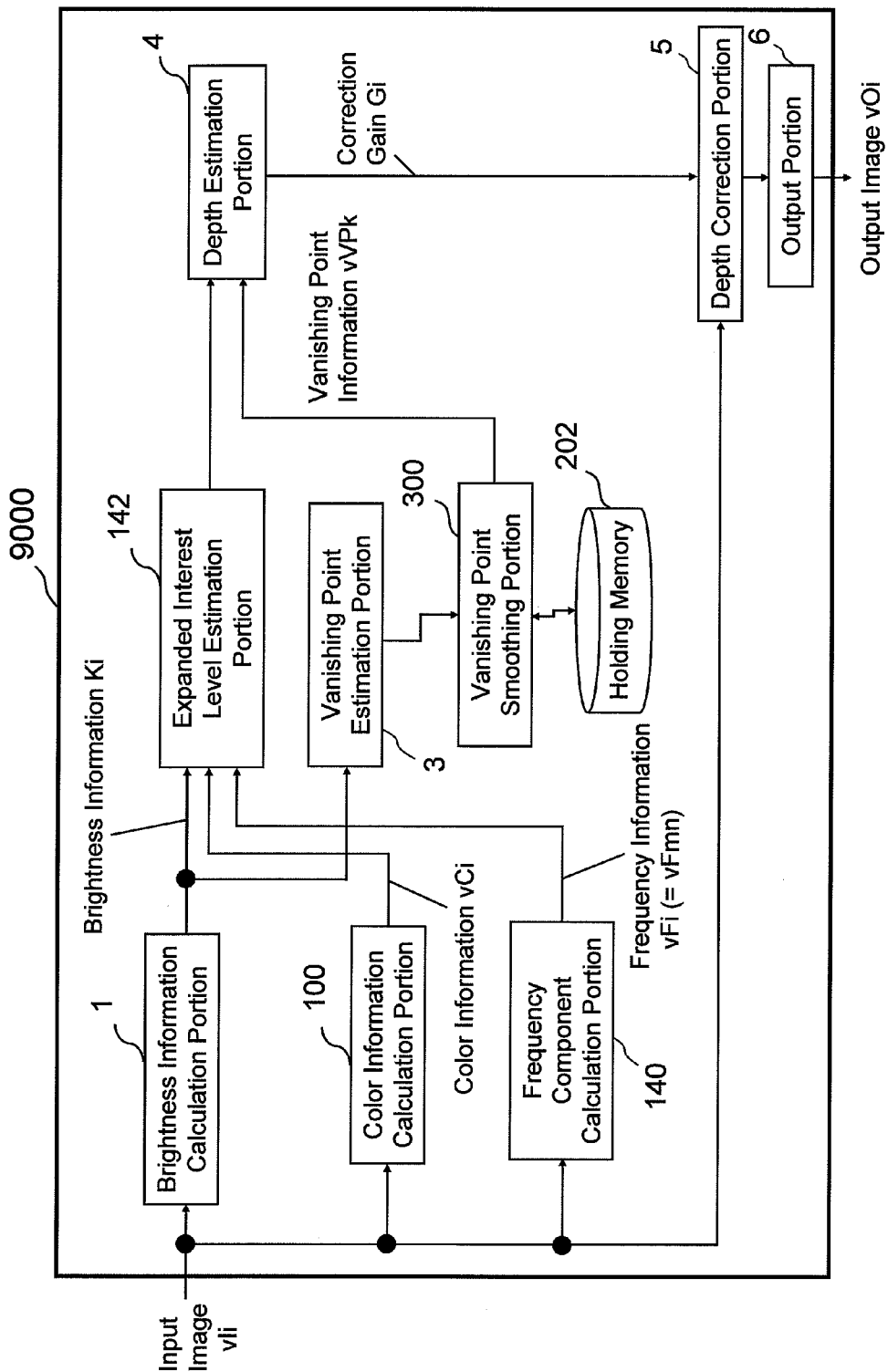
FIG. 43 is a block diagram illustrating the configuration of an image processing device according to a ninth embodiment of the present invention.
Figure 44:
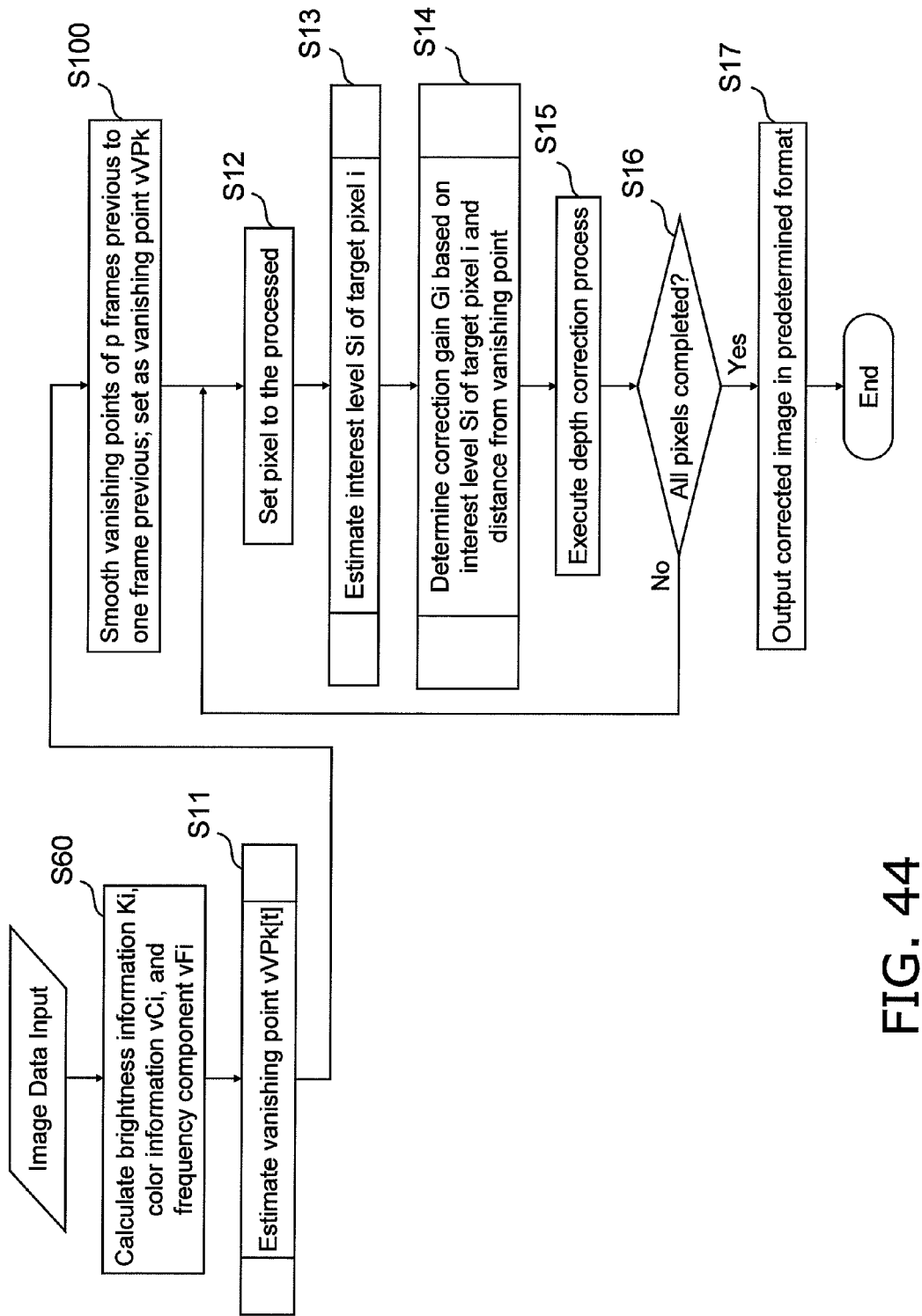
FIG. 44 is a flowchart illustrating the entirety of an image processing method according to the ninth embodiment of the present invention.

An image processing method and an image processing device, which estimate depth information for a pixel based on a vanishing point and an interest level and carry out correction on that pixel, shall be described as a ninth embodiment of the present invention, with reference to FIGS. 43 and 44.

FIG. 43 illustrates the configuration of an image processing device 9000 according to the ninth embodiment of the invention. FIG. 44 is a flowchart illustrating processes performed in the image processing method according to the ninth embodiment.

<9.1: Configuration of the Image Processing Device>

As illustrated in FIGS. 43 and 44, the image processing device 9000 according to the ninth embodiment differs from the image processing device 3000 according to the third embodiment in that a vanishing point smoothing portion 300 and a holding memory 202 have been added.

It should be noted that with the image processing device 9000 according to the present embodiment, portions that are the same as those of the previous embodiments shall be assigned the same reference numerals, and descriptions thereof shall be omitted.

<9.2: Operation of the Image Processing Device>

Next, the operation of the image processing device 9000 shall be described.

Similar to the third embodiment, with the image processing device 9000, an interest level Si[t] is found by the expanded interest level estimation portion 142 based on the brightness contrast amount RKi, the color contrast amount RCi, and the sharpness amount RBi for a pixel i (x,y) obtained based on frequency information.

Meanwhile, the vanishing point information vVPk[t] in the current frame image (the frame image at the time t) is found by the vanishing point estimation portion 3. After this, a smoothing process is carried out on the vanishing point information vVPk[t] in the frame time t, using a total of p number of frame images from the vanishing point information vVPk [t−p] in time (t−p), which is p amount of frame time previous to the current frame time t, to the vanishing point information vVPk [t−1] in time (t−1). In such a case, the smoothing process may be carried out by simply averaging the components of the vanishing point information vVPk[mm] from (t−p) to t (where mm=t−p, ..., t); however, here, the smoothing process is executed by controlling a weighting coefficient applied to each frame time tt (where tt=t−p, ..., t−1, t) through (Formula 32), as in the seventh embodiment.

Through these processes, the image processing device 9000 can suppress fluctuations in the vanishing point information arising due to fluctuations in border information and so on caused by external light, and resolve contradictions in the sense of distance caused by scene changes between frames. In other words, the image processing device 9000 can resolve abnormalities felt due to the depth correction occurring when an object A, which appears to be in the foreground of an image at time (t−1), suddenly appears in the background due to a scene change at time t.

Although here, the vanishing point information from the past frame time (t−p) to time t is smoothed, it should be noted that vanishing point information found by executing a smoothing process on the vanishing point information vVPk [mm] from past frame time (t−p) to a frame time (t+p), taking the time t as the center, may be used as the vanishing point information of the time t (where mm=t−p, ..., t+p). Note, however, that delay occurs in the depth correction process in this case.

Furthermore, each frame time is not limited to a single vanishing point. In the case where the number of vanishing points NN[t] in each frame time is the same, a corresponding number (that is, corresponding to the number of vanishing points) of smoothing processes are executed (for example, when there is n number of vanishing points, smoothing processes are executed for each of the n number of vanishing points). Meanwhile, in the case where the number of vanishing points NN[t] in each frame time is different, the smoothing process may be executed having selected candidates that are close in distance (that is, distance with respect to two-dimensional coordinates within each frame image) to vVPk [t] from among vanishing points vVPs[tt] within frames tt=t−p, ..., t−1 to be smoothed (where s=1, ..., NN[tt]), based on the vanishing point vVPk[t] in the current time t (where k=1, ..., NN[t]). At this time, if there is no vanishing point information within the frame tt=t−p, ..., t−1 for which the distance from vVPk[t] is lower than a predetermined value, a process that removes the vanishing point information of that frame image (the frame image at time tt) from being a target of the smoothing process may be executed.

With the image processing device 9000, the degree of depth fbi of the pixel i(x,y) and the correction gain Gi are found by the depth estimation portion 4 based on the vanishing point information vVPk obtained through the smoothing process described above and the interest level Si; the depth correction portion 5 then performs a depth correction process on the input image signal vIi based on the correction gain Gi.

As described thus far, in addition to the effects obtained through the interest level Si, which has been accurately estimated based on the brightness contrast/color contrast/degree of blurriness as described in the third embodiment, the image processing device 9000 according to the ninth embodiment can also achieve an effect of suppressing fluctuations in the vanishing point information based on the smoothing process carried out with vanishing points in past frame times, as described in the seventh embodiment.

Tenth Embodiment

Figure 46:
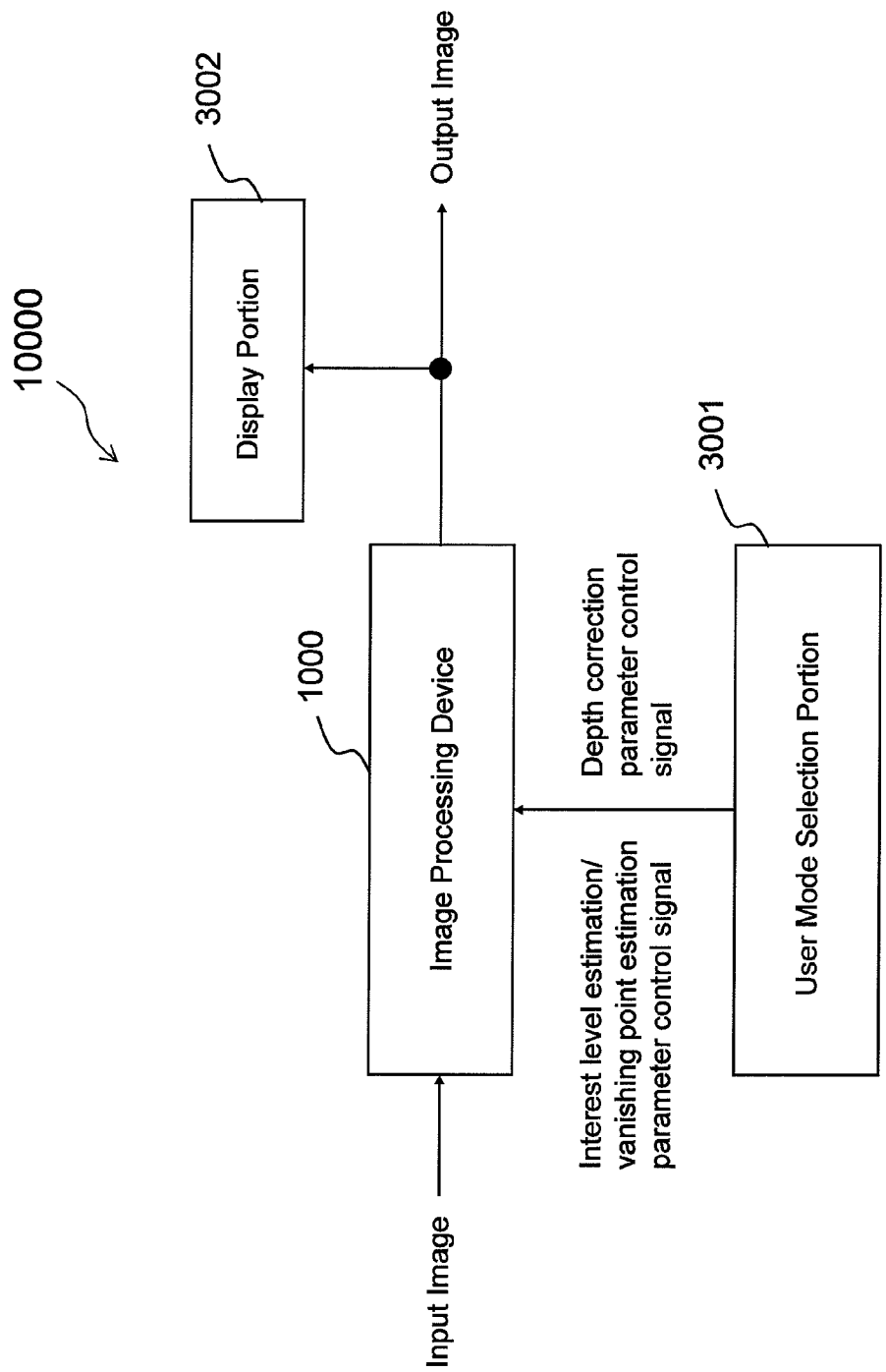
FIG. 46 is a block diagram illustrating the configuration of an image processing device according to a tenth embodiment of the present invention.
Figure 47:
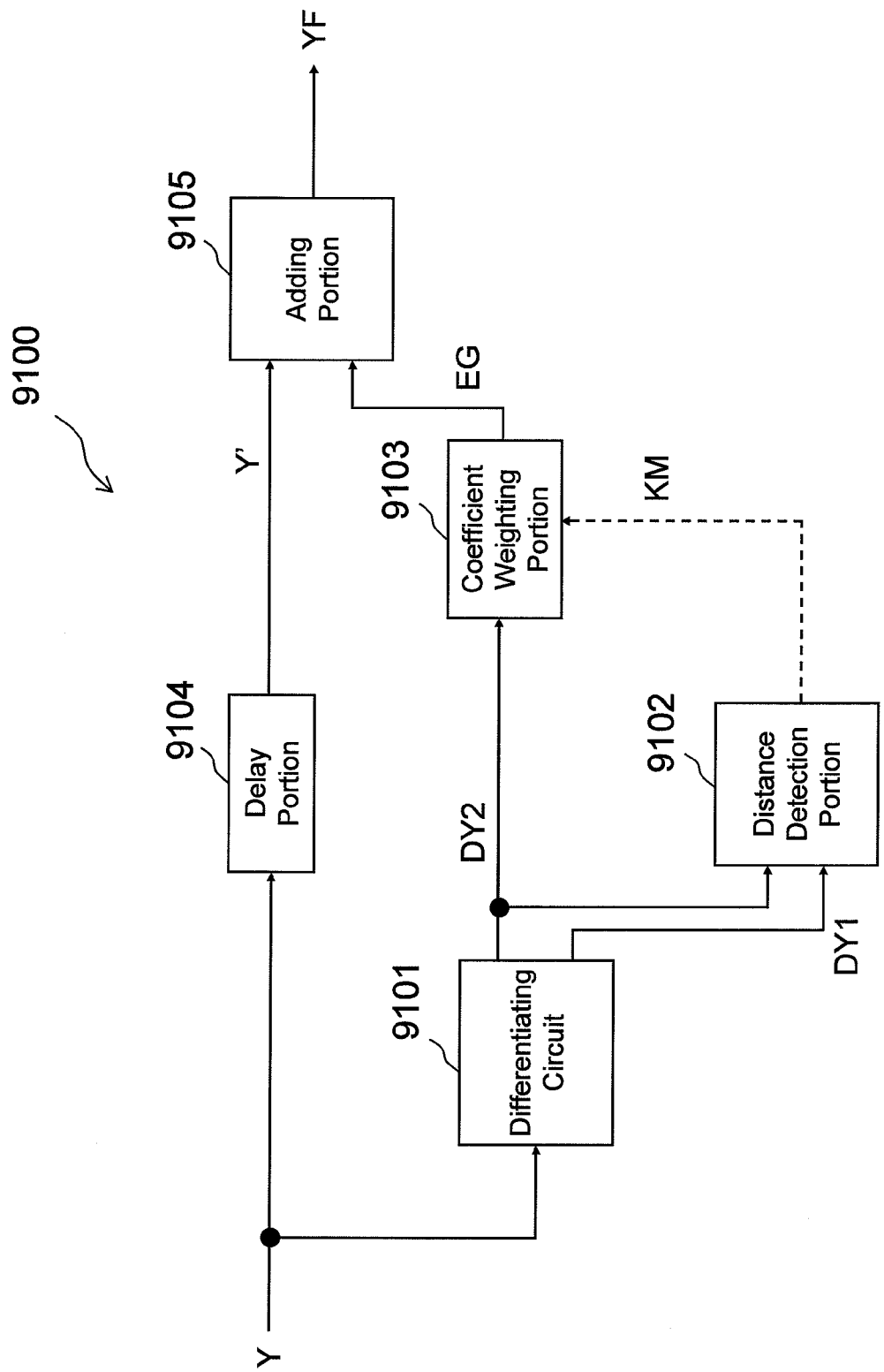
FIG. 47 is a block diagram illustrating the configuration of a conventional image processing device.

Descriptions shall now be given regarding an image processing system 10000 according to the tenth embodiment, illustrated in FIG. 46. This invention adds a user mode selection portion 3001, through which a user selects a processing mode, and a display portion 3002 to the image processing device 1000 (or 2000, 3000, 4000, 5000, 6000, 7000, 8000, and 9000) according to the first through the ninth embodiments (in FIG. 46, the image processing device 1000 is used as a representative example).

As shown in FIG. 46, the image processing system 10000 is configured of the image processing device 1000 (or 2000, 3000, 4000, 5000, 6000, 7000, 8000, and 9000) according to the first through the ninth embodiments (hereinafter, the image processing device 1000 is used as a representative example), the display portion 3002, which displays processing results thereof, and the user mode selection portion 3001, through which a user selects a processing mode.

The image processing system 10000 displays the resultant images of the depth correction process, the results of the vanishing point estimation process, and so on carried out by the image processing device 1000 in the display portion 3002. With the image processing system 10000, the user visually confirms the processed image in the display portion 3002, and can select a processing mode using the user mode selection portion 3001, making it possible to implement color correction more compliant with the characteristics of individual people (that is, more compliant with users' preferences). Here, the display portion 3002 has the function of allowing an image signal (video signal) and so on processed by the image processing device 1000 to be displayed, and can be the main screen display device or the sub-screen display device of a liquid crystal display device, a plasma display device, or an ordinary TV. The user mode selection portion 3001 uses a menu selection scheme; when, for example, the strength of the depth correction is to be selected, this scheme includes (S-1) a high mode, (S-2) a mid mode, (S-3) a low mode, and (S-4) a default mode.

The user views an image (video) that is displayed in the display portion 3002 and selects one of the modes, or (S-1) the high mode, (S-2) the mid mode, (S-3) the low mode, or (S-4) the default mode, from the options within menu that has been prepared by the user mode selection portion 3001, thereby determining the mode. The "default mode" mentioned here refers to a mode in which the correction gain Gi obtained from the degree of depth fbi in an acquired pixel i is set to a default value. For example, in the case where the correction gain Gi is obtained through a variable based on a first function in which the degree of depth fbi has a predetermined gain coefficient TS and an offset value TOFF, this default mode is equivalent to a mode that uses a default value TSdef of the correction gain coefficient TS and a default value TOFFdef of the offset value. The image processing system 10000 can control the strength level of the depth correction process applied by the image processing device 1000 through the user mode selection portion 3001, in accordance with the selection made using the user mode selection portion 3001. In other words, this makes it possible for the level of the processing performed by the image processing device 1000 to be controlled. By performing processing in this manner, the image processing system 10000 can perform a depth correction process that imparts a sense closely resembling the visual characteristics of humans, and can furthermore control the level (processing level) in accordance with the vision of each individual.

Meanwhile, the depth correction process may be selected using the user mode selection portion 3001. For example, (P-1) brightness correction, (P-2) color correction, (P-3) a shadow addition process, (P-4) an enhancing process, (P-5) a smoothing process, or the like may be presented by the user mode selection portion 3001, in menu form, as depth correction processes; the process may then be selected by the user. At this time, the user may be enabled to select a plurality of processes. Alternatively, a scheme in which a plurality of different processes is allocated to a single menu item and the user is allowed to select therefrom may be employed for the process menu, rather than using (P-1) through (P-4) above; for example, (Q-1) brightness correction, color correction, and the enhancing process, (Q-2) brightness correction, the shadow adding process, and color correction, (Q-3) the shadow adding process, the enhancing process, and the smoothing process, (Q-4) the shadow adding process, the enhancing process, and color correction, (Q-5) brightness correction, the shadow adding process, and the enhancing process, or the like may be used.

Furthermore, the vanishing point estimation results for the current image in the display portion 3002 may be displayed superimposed into a thumbnail image of the input image, and the user may then be able to adjust the position of the vanishing point with a pointing device, such as a mouse, using the user mode selection portion 3001. Furthermore, the user may adjust the various parameters used by the vanishing point estimation portion in the first embodiment and the various parameters used by the interest level estimation portion in the first through the third embodiments. Doing so makes it possible to further improve the accuracy of estimating the vanishing point vVPk and to estimate an interest level Si more suited to the user.

With regards to the image processing system 10000, although a menu selection scheme is illustrated as an example here, it should be noted that a selection scheme that uses switches or buttons corresponding to the various correction strength levels may be employed as well. Strength selection using an interface that moves seamlessly, such as a slider or the like, and such a bar may moreover be a bar that moves in an analog manner or in a digital manner. Furthermore, although a default mode has been prepared here, the correction gain coefficient TS, offset value TOFF, and so on may be set to their respective default values by selecting the "mid mode" in the menu.

Other Embodiments

Although the above embodiments described a process in which the vanishing point (that is, vanishing point information) is found by estimating the vanishing point, the present invention is not intended to be limited thus; for example, tag information from within the image data, file format information, or the like may be added to the vanishing point information, after which the vanishing point information is inputted. Furthermore, the vanishing point information may be inputted as a result of a user performing commands through a mouse or a pointer, or block numbers, generally identifying the blocks into which the image was divided, may be used, with the user inputting the block number in which the vanishing point is located.

The image processing method and image processing device of the present invention as described in the above embodiments includes a processing method and processing device that use the brightness contrast characteristics illustrated in FIGS. 7 and 8, and the color contrast characteristics illustrated in FIGS. 18 through 20. The effects of the image processing device and image processing method of the present invention are therefore significantly influenced by these characteristics.

Figure 45:
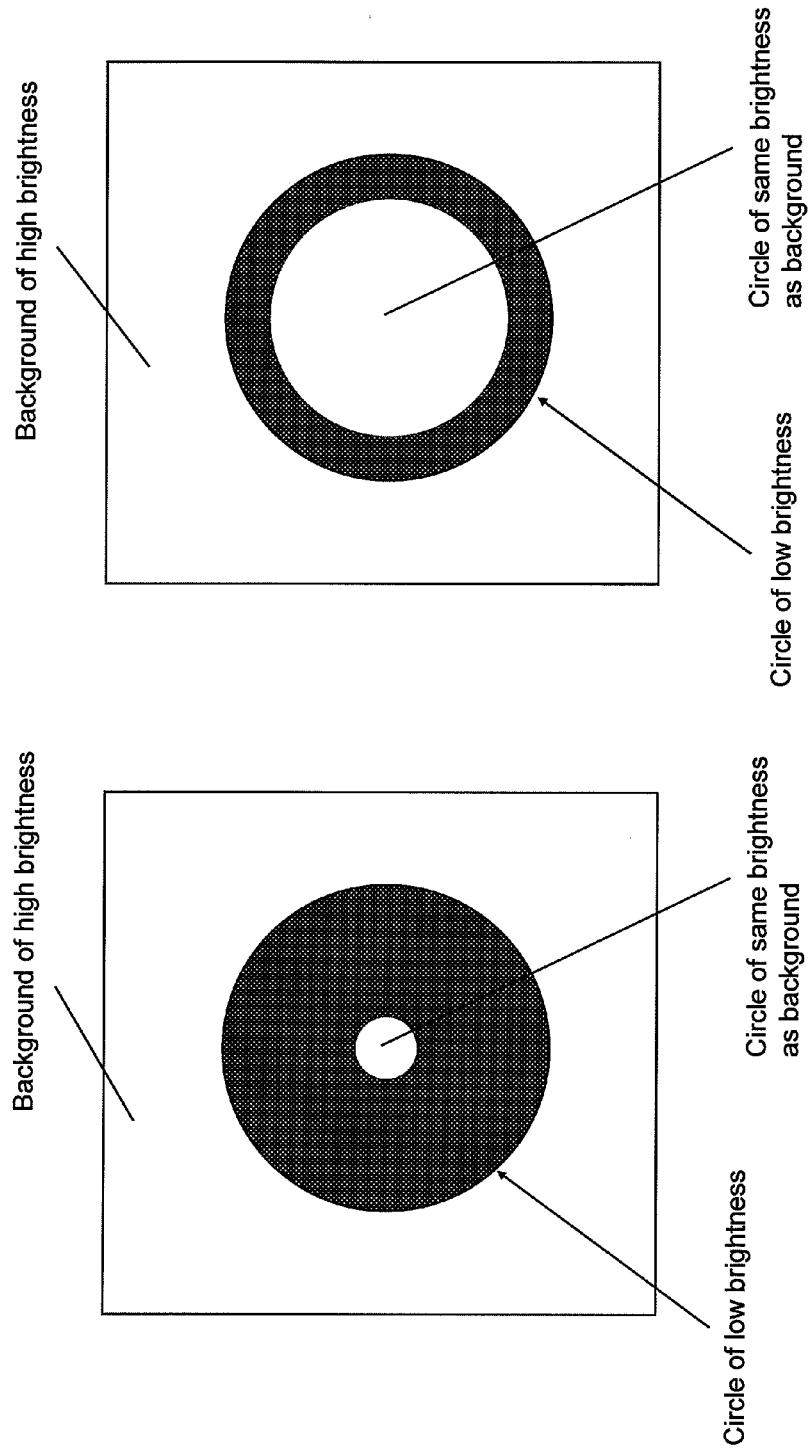
FIG. 45 is a diagram schematically illustrating a fluctuation in brightness contrast in the image processing methods according to the first through ninth embodiments of the present invention.

For example, FIG. 45 illustrates the characteristics of the brightness contrast phenomenon. In this diagram, a circle of a lower brightness than a high-brightness background has, in its center, a circle of the same brightness as the background; based on this, it can be seen that the effects fluctuate depending on the size of the circle in the center. For example, if the radius of the high-brightness circle in the center is comparatively smaller than that of the darker circle, the brightness contrast phenomenon, where the high-brightness circle in the center appears even brighter, is increased. As opposed to this, the greater the radius of the high-brightness circle in the center becomes, and the closer it gets to the darker circle, the brightness contrast phenomenon, where the high-brightness circle in the center appears even brighter, is decreased. The same can be said with regards to the color contrast characteristics; with the saturation contrast, where a highly-saturated blue circle in a light blue background has, in its center, a circle of the same light blue color as the background, it can be seen that the effects fluctuate depending on the size of the circle in the center. In this case, if the radius of the light blue circle in the center is comparatively smaller than that of the highly-saturated blue circle, the color contrast phenomenon, where the light blue circle in the center of the highly-saturated blue circle appears even lighter, is increased.

As opposed to this, the greater the radius of the light blue circle in the center becomes, and the closer it gets to the highly-saturated blue circle, the color contrast phenomenon, where the light blue circle in the center of the highly-saturated blue circle appears even lighter, is decreased. Accordingly, the state (distribution) of the estimated interest level fluctuates when the interest level based on the brightness contrast and color contrast is estimated using basic patterns of different sizes, such as those shown in FIG. 45, as input images. However, the vanishing point information found through the vanishing point estimation process is fixed as long as the image characteristic amount does not change. As a result, the states (distributions) of the degree of depth and the depth correction effects fluctuate when the image processing device of the present invention is applied using basic patterns of different sizes, such as those shown in FIG. 45, as input images. This is a characteristic of the image processing method and image processing device according to the present invention.

The following are used as the color contrast amount RCi of the target color information, as described in the second embodiment of the present invention:

(1) the ratio of the color information of the target pixel to the surrounding representative color information; and (2) the amount of difference between the color information of the target pixel and the representative color information surrounding the target pixel.

However, values obtained by converting the above (1) and (2) using a predetermined function may be used instead. Similarly, the following are used as the brightness contrast amount RKi of the brightness information, as described in the first embodiment of the present invention:

(3) the ratio of the brightness information of the target pixel to the surrounding representative brightness information; and (4) the amount of difference between the brightness information of the target pixel and the representative brightness information surrounding the target pixel.

However, values obtained by converting the above (3) and (4) using a predetermined function may be used instead.

It is furthermore not necessary to limit the size of the surrounding region used in finding the representative color information and the representative brightness information to a fixed size. For example, the size of the surrounding region may be changed based on the difference between the color information Ci of the target pixel i and the color information Ck of the pixel k within the surrounding region, the distance (length) between the pixel i and the pixel k, and so on. In other words, the representative color information, representative brightness information, and the like may be found using a surrounding region set in an adaptive manner. In a case where the average within the surrounding region is used as the representative brightness information, the process for finding the representative color information and the like can be carried out by weakening or strengthening the weighting coefficient that is applied to the color information Ck of the surrounding region pixel k in accordance with the difference between the color information Ci of the target pixel i and the color information Ck of the pixel k within the surrounding region of the target pixel i, the distance (length) between the pixel i and the pixel k, and so on. The same applies to the calculation of the brightness contrast amount, with regards to this surrounding region.

The control variables used by the image processing device in the above embodiments (such as the threshold parameters for the vanishing point estimation process in the first embodiment) are configured and held within the image processing device; however, this data may be provided by an external memory such as a RAM, an input portion that accepts an input from the exterior, and so on.

The image processing method and image processing device of the invention described in the above embodiments are implemented as devices that are used installed in or connected to devices that handles images, such as computers, televisions, digital cameras, mobile phones, PDAs, car TVs, and the like, and can be implemented as an integrated circuit, such as an LSI, as well.

Some or all of the functional blocks that carry out the various processes described in the above embodiments may be achieved through individual single chips; alternatively, some or all of these functional blocks may be implemented collectively using a single chip. It should be noted that here reference is made to LSIs, but depending on the degree of integration, these may also be referred to as ICs, system LSIs, super LSIs, or ultra LSIs.

The integrated circuit is not intended to be limited to the LSI configuration; a dedicated circuit or a generic processor may also be used to implement the integrated circuit. An FPGA (Field Programmable Gate Array), which makes it possible to program the LSI circuit post-production, or a reconfigurable processor, in which the connections, settings, and so on of the circuit cells within the LSI circuit can be reconfigured, may be used as well.

Further, if other technologies that improve upon or are derived from semiconductor technology enable integration technology to replace LSI circuits, then naturally it is also possible to integrate the functional blocks using that technology. Biotechnology applications are one such foreseeable example.

Some or all of the processing of the functional blocks of the above embodiments can be implemented by a program. In such a case, some or all of the processing of the functional blocks in the above embodiments are run by a central processing unit (CPU) on a computer. A program for performing the various processes is stored on a memory device such as a hard disk or a ROM, and is run on the ROM or read to and run on a RAM.

The various processes of the above embodiments may be implemented through hardware or software. These processes may also be implanted through processes in which the software and hardware run integrated with one another. It goes without saying that it is necessary to adjust the timing at which to execute each process in the case where the image processing device according to the above embodiments is implemented through hardware. For simplicity's sake, the descriptions in the above embodiments have omitted the details regarding the adjustment of the timing of the various signals that arises in the actual hardware architecture.

It should be noted that the specific configuration of the present invention is not intended to be limited to the above embodiments in any way, and various modifications and variations can be made without deviating from the essential spirit of the invention.

The image processing device, image processing method, image processing system, program, storage medium, and integrated circuit according to the present invention are capable of realizing a more natural feeling of depth in a processed image by linking correction gain control based on the distance from a vanishing point with the interest level/level of attention directed within the image by a human, and are thus useful in industrial fields dealing with image devices; thus the image processing device, image processing method, image processing system, program, storage medium, and integrated circuit of the present invention can be applied in such fields.

What is claimed is:

1. An image processing device comprising:
    a brightness information calculation portion operable to calculate brightness information of an image signal that can form an image made up of pixels, the calculation being performed per pixel or per pixel region made up of a plurality of pixels;
    an interest level estimation portion operable to estimate an interest level indicating the degree to which the pixel or the pixel region is visually focused on in the image, based on the brightness information;
    a vanishing point estimation portion operable to estimate vanishing point information of the image, based on the brightness information;
    a depth estimation portion operable to (i) estimate a degree of depth based on the interest level and the vanishing point information and (ii) calculate a correction gain for performing a depth correction process on the image signal based on the degree of depth;
    a depth correction portion operable to perform the depth correction process on the image signal based on the correction gain; and
    a processor operable to control at least one of the brightness information calculation portion, that interest level estimation portion, the vanishing point estimation portion, the depth estimation portion, and the depth correction portion, wherein the vanishing point estimation portion includes:
- a border calculation portion operable to calculate border information based on the brightness information and extract characteristic points in border portions within the image based on the border information;
- a Hough transform portion operable to convert straight lines in the image that connect the characteristic points into points within a Hough space by performing a Hough transform;
- a distribution calculation portion operable to calculate a histogram distribution for the points within the Hough space; and
- a vanishing point extraction portion operable to extract the vanishing point information of the image based on the histogram distribution for the points in the Hough space.

2. The image processing device according to claim 1, wherein the interest level estimation portion includes:
- a surrounding brightness information calculation portion operable to calculate surrounding brightness information AKi based on the brightness information of pixels surrounding a pixel of interest, the pixel of interest being the pixel in the image signal that is to be processed;
- a brightness contrast amount calculation portion operable to calculate a brightness contrast amount RKi based on the surrounding brightness information AKi and brightness information of interest Ki, the brightness information of interest Ki being the brightness information of the pixel of interest; and
- an interest level conversion portion operable to find the interest level based on the brightness contrast amount RKi.

3. The image processing device according to claim 2, wherein the brightness contrast amount calculation portion calculates the brightness contrast amount RKi using the formula (brightness contrast amount RKi)=(brightness information of interest Ki)/(surrounding brightness information AKi), and
wherein the interest level conversion portion sets the interest level to a greater value as the value of the brightness contrast amount RKi increases.

4. The image processing device according to claim 1, wherein the vanishing point extraction portion:
- divides the image into a plurality of blocks; and
- calculates, using the histogram distribution calculated by the distribution calculation portion, the number of straight lines within a block, the number being the number of times a straight line in the image corresponding to the points in the Hough space having a frequency value greater than a first threshold passes through the block, and uses the central point of the block as the vanishing point information of the image in the case where the number of straight lines within a block is greater than a predetermined value.

5. The image processing device according to claim 2, wherein the depth estimation portion:
- sets a degree of depth minimum value Min_fbi, which is the minimum value of the degree of depth, and a degree of depth maximum value Max_fbi (≧Min_fbi), which is the maximum value of the degree of depth, to values in a relationship in which they monotonically increase with respect to the distance between the pixel of interest and the vanishing point information in the image;
- sets the degree of depth (fbi) to a value, within the range between the degree of depth minimum value Min_fbi and the degree of depth maximum value Max_fbi, in a relationship that monotonically increases with respect to the interest level; and
- sets the correction gain to a value in a relationship that monotonically increases with respect to the degree of depth (fbi), and
wherein the depth correction portion performs the depth correction process on the image signal so that the greater the value of the correction gain becomes, the greater the degree to which the pixel of interest is visually focused on becomes.

6. The image processing device according to claim 1, further comprising:
- a color information calculation portion operable to calculate color information per pixel or per pixel region in the image signal,
wherein the interest level estimation portion estimates the interest level based on the brightness information and the color information.

7. The image processing device according to claim 1, further comprising:
- a frequency information calculation portion operable to calculate frequency information per block made up of plural pixels or plural pixel regions in the image signal,
wherein the interest level estimation portion estimates the interest level based on the frequency information in addition to the brightness information.

8. The image processing device according to claim 7, wherein the interest level estimation portion finds, per block, a high-frequency component sum sumHFreq, which is the sum of frequency components greater than or equal to a predetermined frequency, finds a ratio RBi of the high-frequency component sum sumHFreq to an all-frequency component sum sumAllFreq of the block (=sumHFreq/sumAllFreq), and estimates the interest level based on the ratio RBi.

9. The image processing device according to claim 1, further comprising:
- a storage portion operable to store past frame images, which are the image in p number of frame units from one frame previous to the current frame up to p frames previous to the current frame (where p is a natural number), and the vanishing point information in the past frame images;
- a vanishing point estimation judgment portion operable to (i) find a past frame image characteristic amount, which is an image characteristic amount of each of the p past frame images stored in the storage portion, (ii) find a current frame image characteristic amount, which is an image characteristic amount of the current frame image, the current frame image being the image in frame units in the current frame, (iii) identify the past frame image for which the difference between the current frame image characteristic amount and the past frame image characteristic amount is minimum as a minimum error past frame image, and (iv) output vanishing point replacement determination information in the case where the difference between the past frame image characteristic amount of the minimum error past frame image and the current frame image characteristic amount is less than a predetermined value; and
- a vanishing point selection portion operable to set the vanishing point information of the minimum error past frame image as the vanishing point information of the current frame image in the case where the vanishing point determination information has been outputted by the vanishing point estimation judgment portion, wherein the depth estimation portion estimates the degree of depth based on the vanishing point information set by the vanishing point selection portion and the interest level.

10. The image processing device according to claim 9, wherein the vanishing point estimation portion does not execute the process for estimating the vanishing point information based on the current frame image in the case where the vanishing point determination information has been outputted by the vanishing point estimation judgment portion.

11. The image processing device according to claim 9, wherein the vanishing point selection portion sets smoothed vanishing point information, in which the vanishing point information of the p past frame images has been smoothed, as the vanishing point information of the current frame image, in the case where the vanishing point determination information has not been outputted by the vanishing point estimation judgment portion, and
wherein the vanishing point estimation portion does not execute the process for estimating the vanishing point information based on the current frame image.

12. The image processing device according to claim 9, wherein the vanishing point estimation judgment portion identifies the past frame image for which square error between the current frame image characteristic amount and the past frame image characteristic amount is minimum as the minimum error past frame image, and outputs vanishing point replacement determination information in the case where the square error between the past frame image characteristic amount of the minimum error past frame image and the current frame image characteristic amount is less than a predetermined value.

13. The image processing device according to claim 12, wherein the image characteristic amount is calculated based on at least one of a brightness contrast amount, a color contrast amount, and an amount based on frequency information calculated per block made up of a plurality of pixels or a plurality of pixel regions.

14. The image processing device according to claim 13, wherein the amount based on the frequency information is a ratio RBi of the high-frequency component sum sumHFreq, which is the sum of frequency components greater than or equal to a predetermined frequency found per block, to an all-frequency component sum sumAllFreq of the block (=sumHFreq/sumAllFreq).

15. The image processing device according to claim 1, wherein the depth correction portion performs at least one of a brightness information correction process, a color information correction process, a border enhancement process, and a smoothing process as the depth correction process.

16. An image processing system comprising:
the image processing device according to claim 1;
a user mode selection portion operable to select a processing mode in accordance with an instruction from a user; and
a display portion operable to display the output from the image processing device as an image.

17. The image processing system according to claim 16, wherein the user mode selection portion selects the processing mode that includes at least information regarding strength of the depth correction process executed by the image processing device.

18. An image processing method comprising:
calculating brightness information of an image signal that can form an image made up of pixels, the calculation being performed per pixel or per pixel region made up of a plurality of pixels;
estimating an interest level indicating the degree to which the pixel or the pixel region is visually focused on in the image, based on the brightness information;
estimating vanishing point information of the image, based on the brightness information;
estimating a degree of depth based on the interest level and the vanishing point information and calculating a correction gain for performing a depth correction process on the image signal based on the degree of depth; and
performing a depth correction process on the image signal based on the correction gain,
wherein the estimating vanishing point information includes:
calculating border information based on the brightness information and extracting characteristic points in portions within the image based on the border information;
converting straight lines in the image that connect the characteristic points into points within a Hough space by performing a Hough transform;
calculating a histogram distribution for the points within the Hough space; and
extracting the vanishing point information of the image based on the histogram distribution for the points in the Hough space.

19. A non-transitory computer-readable storage medium having stored thereon a program, wherein, when executed, the program causes a computer to function as:
a brightness information calculation portion operable to calculate brightness information of an image signal that can form an image made up of pixels, the calculation being performed per pixel or per pixel region made up of a plurality of pixels;
an interest level estimation portion operable to estimate an interest level indicating the degree to which the pixel or the pixel region is visually focused on in the image, based on the brightness information;
a vanishing point estimation portion operable to estimate vanishing point information of the image, based on the brightness information;
a depth estimation portion operable to (i) estimate a degree of depth based on the interest level and the vanishing point information and (ii) calculate a correction gain for performing a depth correction process on the image signal based on the degree of depth;
a depth correction portion operable to perform the depth correction process on the image signal based on the correction gain,
wherein the vanishing point estimation portion includes:
a border calculation portion operable to calculate border information based on the brightness information and extract characteristic points in border portions within the image based on the border information;
a Hough transform portion operable to convert straight lines in the image that connect the characteristic points into points within a Hough space by performing a Hough transform;
a distribution calculation portion operable to calculate a histogram distribution for the points within the Hough space; and
a vanishing point extraction portion operable to extract the vanishing point information of the image based on the histogram distribution for the points in the Hough space.

* * * * *